United States Patent
Mutsuno

(10) Patent No.: US 9,150,371 B2
(45) Date of Patent: Oct. 6, 2015

(54) JOB PROCESSING METHOD AND PRINTING SYSTEM

(75) Inventor: Masahiro Mutsuno, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 834 days.

(21) Appl. No.: 11/962,175

(22) Filed: Dec. 21, 2007

(65) Prior Publication Data

US 2008/0174793 A1    Jul. 24, 2008

(30) Foreign Application Priority Data

Jan. 18, 2007    (JP) .................................. 2007-009588

(51) Int. Cl.
| | |
|---|---|
| *G06F 3/12* | (2006.01) |
| *G06F 15/00* | (2006.01) |
| *G06K 1/00* | (2006.01) |
| *G06K 15/00* | (2006.01) |
| *B65H 43/00* | (2006.01) |
| *B65H 7/00* | (2006.01) |
| *B65H 5/26* | (2006.01) |
| *G03G 15/00* | (2006.01) |

(52) U.S. Cl.
CPC ................. *B65H 5/26* (2013.01); *G03G 15/55* (2013.01); *G03G 15/553* (2013.01); *G03G 15/6558* (2013.01); *B65H 2402/10* (2013.01); *G03G 2215/00548* (2013.01)

(58) Field of Classification Search
USPC ................ 358/1.12–1.15, 405, 406, 498, 1.1; 400/578; 271/256–263, 298, 276, 271/285.01
See application file for complete search history.

(56) References Cited

U.S. PATENT DOCUMENTS

| | | | | | |
|---|---|---|---|---|---|
| 3,997,154 | A | * | 12/1976 | Mol | ............................. 271/215 |
| 4,231,291 | A | * | 11/1980 | Davidson, Jr. | ................ 101/137 |
| 4,786,041 | A | * | 11/1988 | Acquaviva et al. | .......... 271/3.13 |
| 5,105,078 | A | * | 4/1992 | Nochise et al. | ........... 250/223 R |
| 5,253,855 | A | * | 10/1993 | Torisawa et al. | ................ 271/9.1 |

(Continued)

FOREIGN PATENT DOCUMENTS

| | | |
|---|---|---|
| JP | 09-311770 A | 12/1997 |
| JP | 2003-263076 A | 9/2003 |

(Continued)

OTHER PUBLICATIONS

The above reference was cited in a Nov. 27, 2009 Chinese Office Action which is enclosed with English Translation, that issued in Chinese Patent Application No. 200810001298.2.

(Continued)

*Primary Examiner* — Jonathan R Beckley
(74) *Attorney, Agent, or Firm* — Cowan, Liebowitz & Latman, P.C.

(57) ABSTRACT

An object of this invention is to provide a job processing method for a convenient printing system applicable not only to the office environment but also to the POD environment, a storage medium, a program, a printing system, and a printing apparatus. To accomplish this, according to a job processing method for a printing system in which print media detected by a multi feed detection unit for detecting occurrence of multi feed of overlapping print media can be used as print media necessary for a job to be processed by a printing apparatus, when multi feed occurs, the printing system can execute a recovery operation for an unprinted job without outputting multi-fed print media to a print medium discharge destination necessary for the unprinted job in the printing system.

8 Claims, 49 Drawing Sheets

(56) References Cited

U.S. PATENT DOCUMENTS

| | | | |
|---|---|---|---|
| 5,276,628 A * | 1/1994 | Schneiderhan | 700/223 |
| 5,580,046 A * | 12/1996 | Beaufort et al. | 271/3.16 |
| 5,644,494 A * | 7/1997 | Richardson et al. | 700/223 |
| 5,680,742 A * | 10/1997 | Hidding | 53/411 |
| 6,241,243 B1 * | 6/2001 | Ishida et al. | 271/258.01 |
| 6,466,748 B2 * | 10/2002 | Tamai et al. | 399/16 |
| 6,636,703 B2 * | 10/2003 | Deen et al. | 399/17 |
| 7,013,098 B2 * | 3/2006 | Hosoi et al. | 399/87 |
| 7,092,646 B2 * | 8/2006 | Schroath et al. | 399/21 |
| 7,386,964 B2 * | 6/2008 | Kuru et al. | 53/54 |
| 7,547,010 B2 * | 6/2009 | Yokobori et al. | 271/9.01 |
| 7,576,872 B2 * | 8/2009 | Matsui et al. | 358/1.1 |
| 7,651,092 B2 * | 1/2010 | Hirao et al. | 271/298 |
| 7,654,521 B2 * | 2/2010 | Simonis et al. | 271/262 |
| 7,684,064 B2 * | 3/2010 | Kimura et al. | 358/1.14 |
| 7,770,890 B2 * | 8/2010 | Ohnishi et al. | 271/298 |
| 7,916,318 B2 * | 3/2011 | Nakamura et al. | 358/1.14 |
| 2005/0247783 A1 * | 11/2005 | Poulos et al. | 235/386 |
| 2007/0180159 A1 * | 8/2007 | Takahashi | 710/8 |
| 2007/0263242 A1 * | 11/2007 | Takahashi | 358/1.14 |

FOREIGN PATENT DOCUMENTS

| | | |
|---|---|---|
| JP | 2004-310746 | 11/2004 |
| JP | 2004-310747 | 11/2004 |
| JP | 2005-004099 A | 1/2005 |
| JP | 2005-043613 A | 2/2005 |
| JP | 2005-082350 A | 3/2005 |
| JP | 2006-330459 A | 12/2006 |

OTHER PUBLICATIONS

The above references were cited in a Feb. 1, 2013 Japanese Office Action, which is enclosed without English Translation, that issued in Japanese Patent Application No. 2007-009588.

The above references were cited in a Nov. 18, 2011 Japanese Office Action, which is enclosed without an English Translation, that issued in Japanese Patent Application No. 2007-009588.

* cited by examiner

FIG. 15
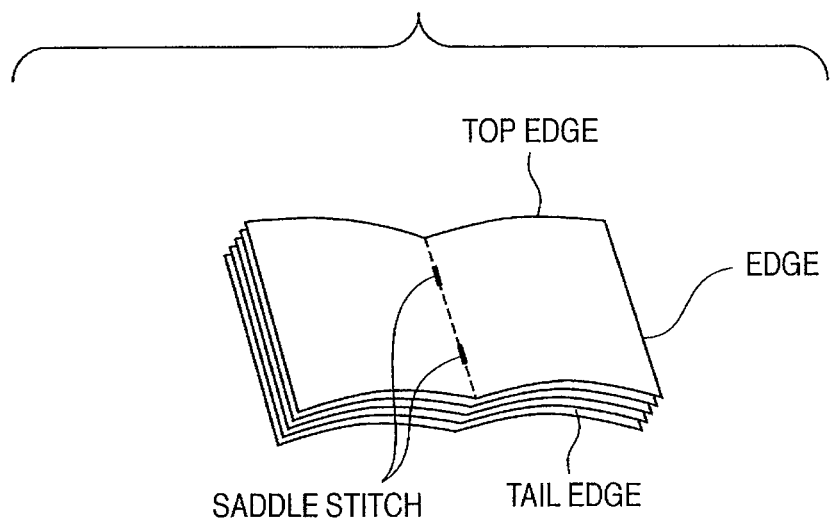
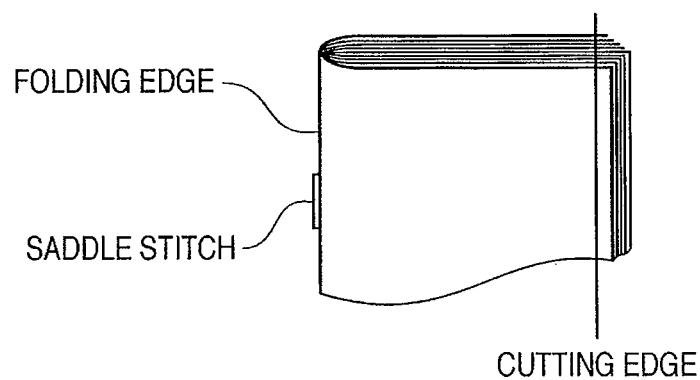

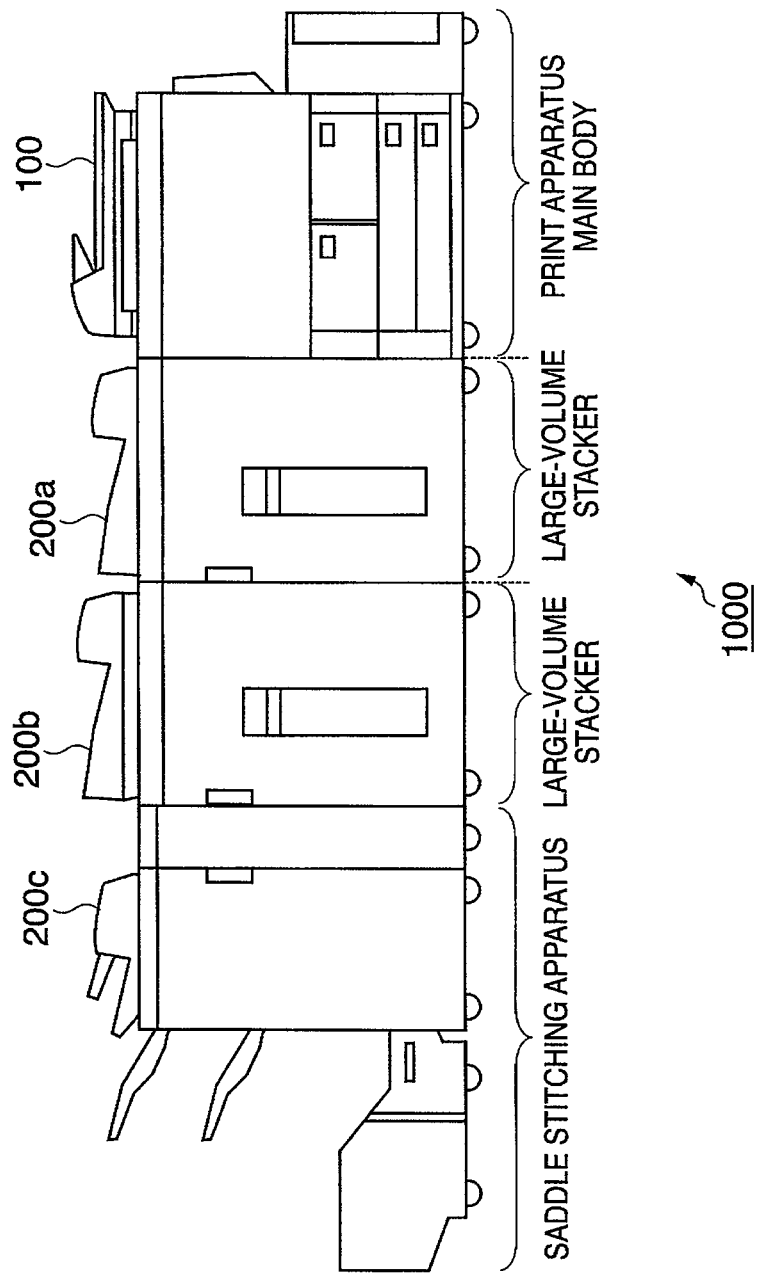

F I G. 25B
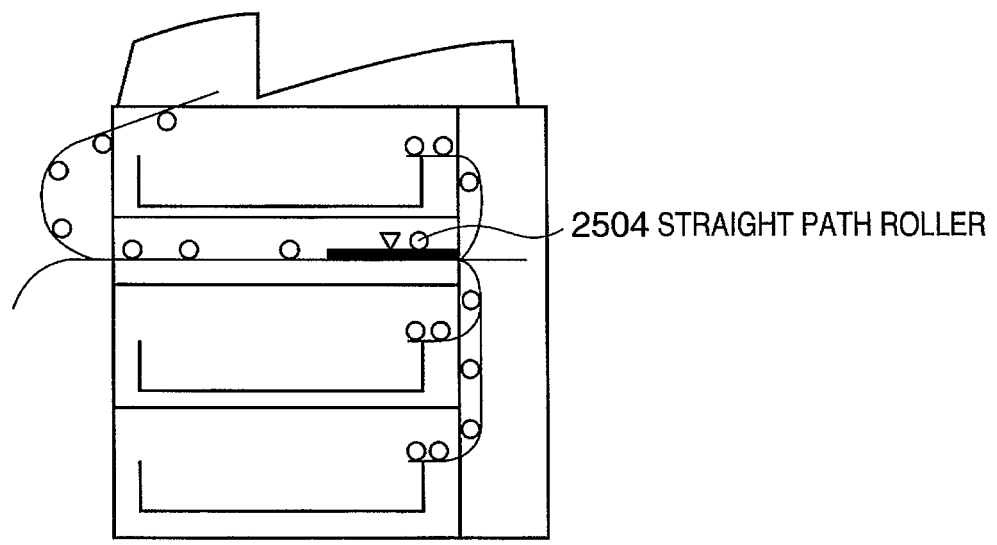

F I G. 25C
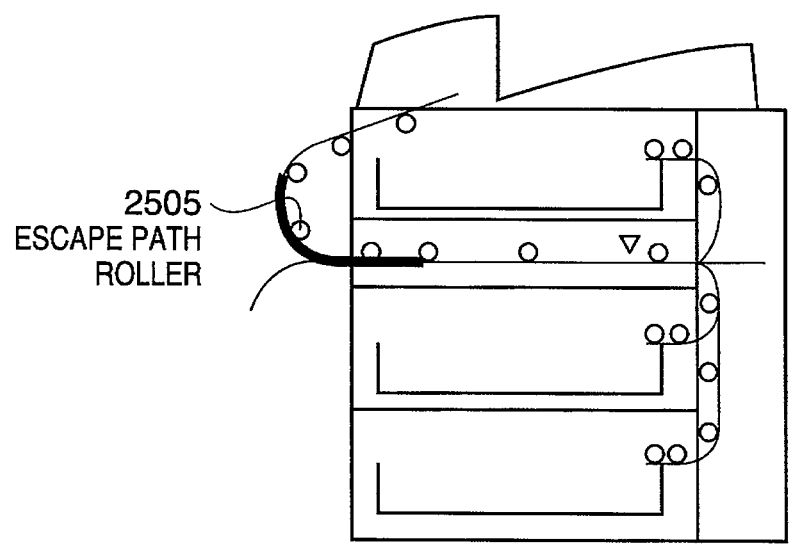

F I G. 30
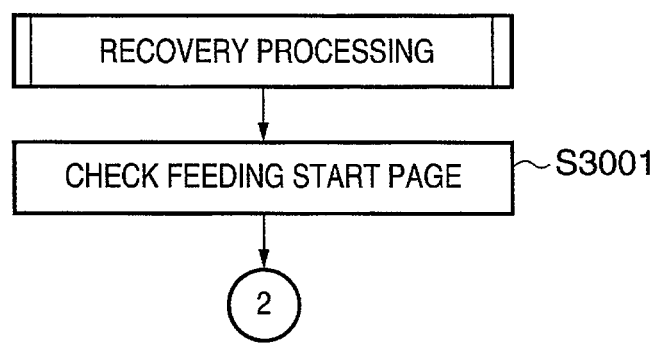

F I G. 34
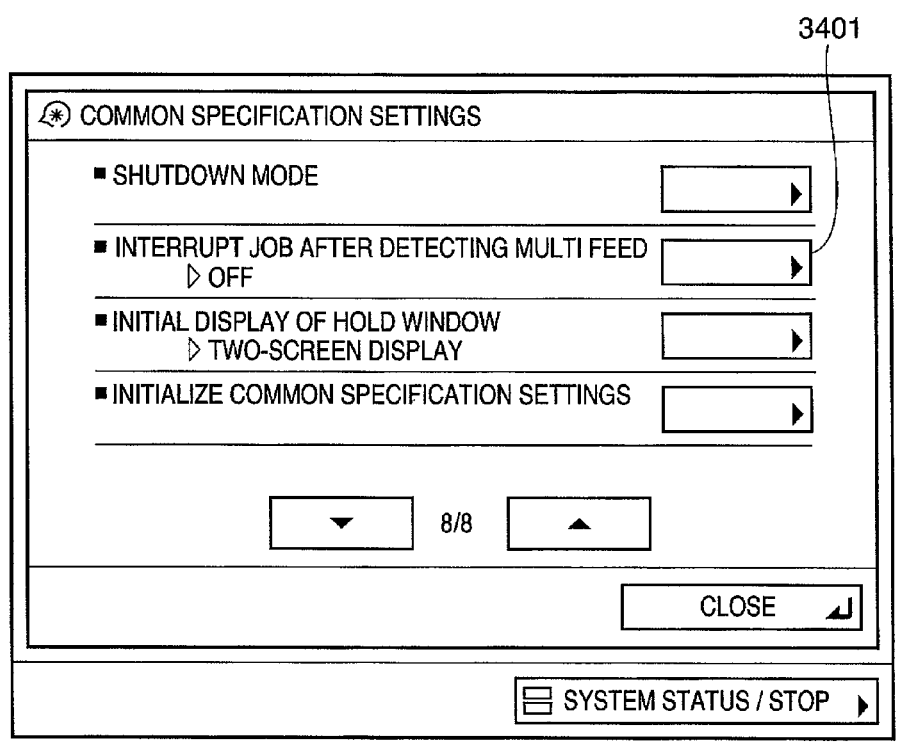

F I G. 35
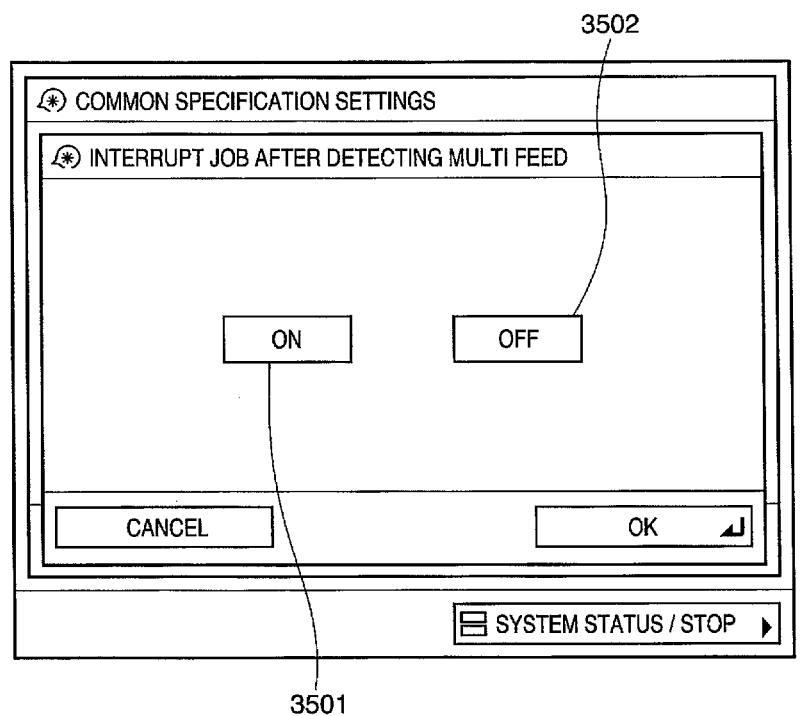

F I G. 36
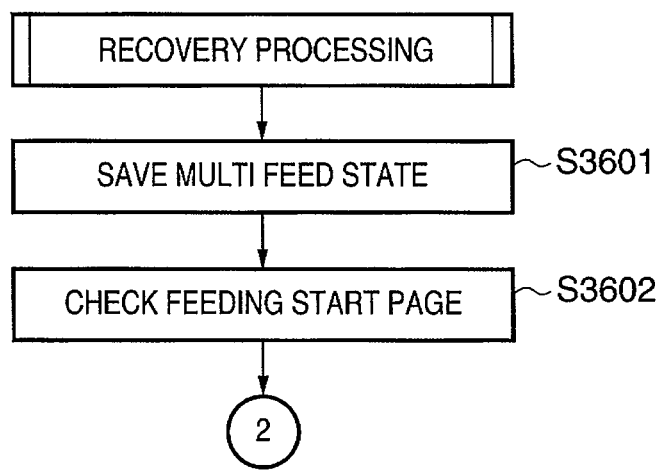

F I G. 37
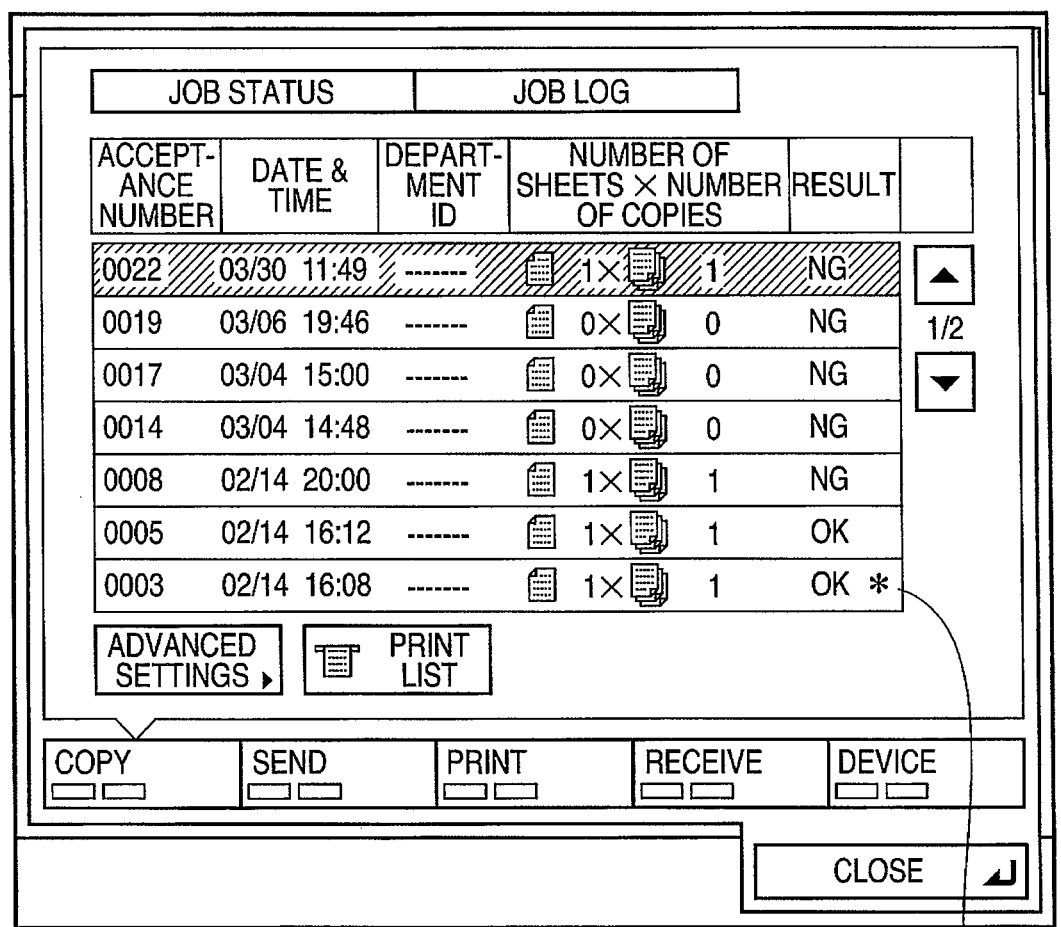

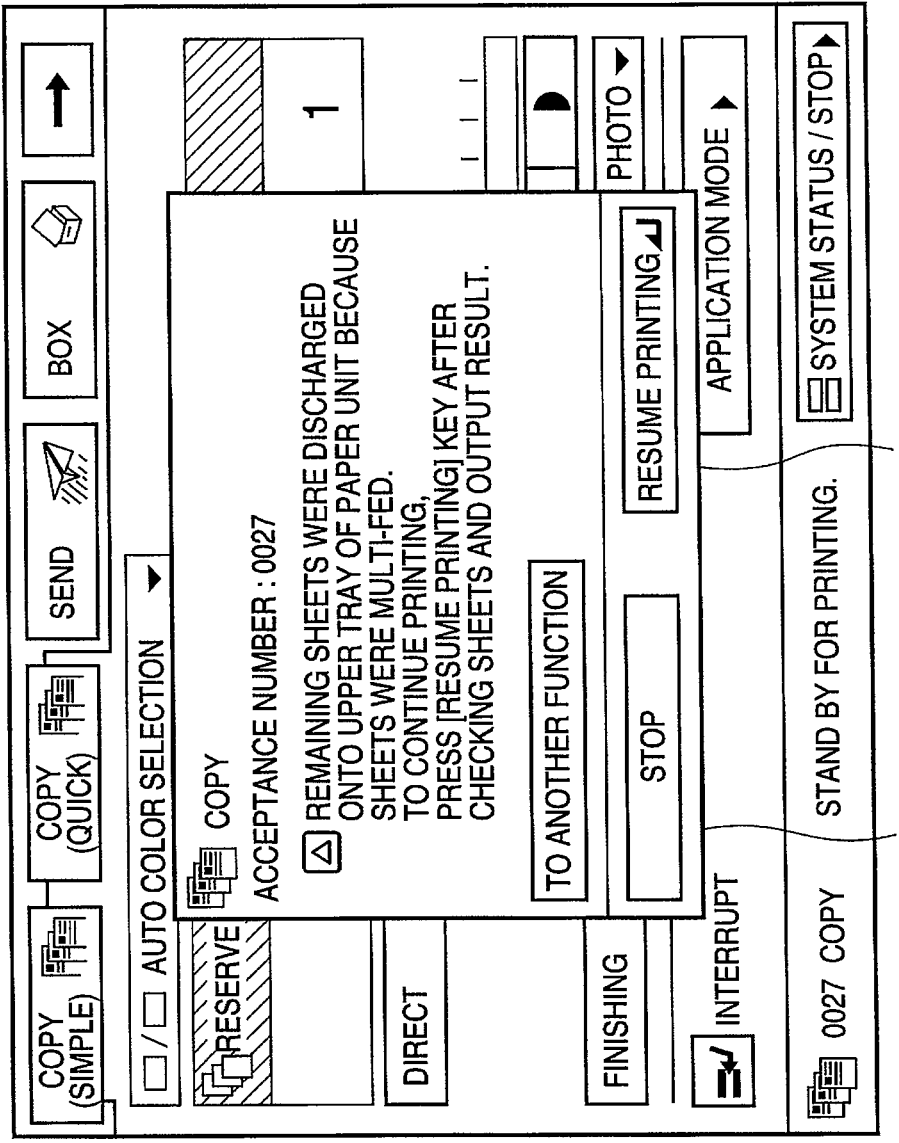

JOB PROCESSING METHOD AND PRINTING SYSTEM

BACKGROUND OF THE INVENTION

1. Field of the Invention

The present invention relates to a job processing method for a printing system capable of accepting a plurality of jobs, and a printing system.

2. Description of the Related Art

In a conventional printing industry, a publication is issued through work steps such as entry of a document, designing of the document, layout editing, comprehensive layout (presentation by printing), proofreading (layout correction and color correction), proof (proof print), block copy preparation, printing, post-processing, and shipping.

In the conventional printing industry, an offset reproduction printing press is often used in the printing step, and the block copy preparation step is inevitable. However, once the block copy is prepared, it is difficult and disadvantageous in cost to correct the block copy. In block copy preparation, therefore, careful proofreading (i.e., careful layout check and color confirmation) is indispensable. Some period of time is generally taken until a publication is issued.

Most apparatuses used in respective work steps are bulky and expensive. A considerable expert knowledge is necessary, and know-how of experts is indispensable.

In this situation, so-called POD (Print On Demand) printing systems using electrophotographic and inkjet printing apparatuses are proposed recently.

(See Japanese Patent Laid-Open Nos. 2004-310746 and 2004-310747).

However, there is room for further study in commercializing a printing system suited even to the POD environment. For example, various types of sheets (e.g., print media to be printed by a printing apparatus) are available on the POD market. "Multi-feed (double feed)" sometimes occurs to simultaneously feed two sheets from a sheet feeder. The multi-feed stops the printing operation of the printing system, decreasing the throughput.

SUMMARY OF THE INVENTION

The present invention enables to provide a job processing method and printing system for increasing the throughput without wastefully stopping the printing operation of the printing system.

According to one aspect of the present invention, the foregoing problem is solved by providing a printing system comprising a discharging controller adapted to cause a discharger to perform a discharging operation for discharging overlapping sheets supplied from a supplier without supplying the overlapping sheets to a printer, presence of the overlapping sheets being checked by a checker while the printer performs a printing operation using non-overlapping sheets supplied from the supplier, and a printing controller adapted to cause the printer to continue the printing operation in response to the discharging operation performed by the discharger.

Further features of the present invention will be apparent from the following description of exemplary embodiments with reference to the attached drawings.

BRIEF DESCRIPTION OF THE DRAWINGS

FIG. 15 is a view for explaining a control example when creating a printed material by the printing system 1000 to be controlled in the embodiment of the present invention;

FIG. 19 is a view showing another system configuration of the printing system 1000 to be controlled in the embodiment of the present invention;

FIG. 25B is a sectional view for explaining the internal structure of the large-volume feeding deck to be controlled in the embodiment of the present invention;

FIG. 25C is a sectional view for explaining the internal structure of the large-volume feeding deck to be controlled in the embodiment of the present invention;

FIG. 30 is a flowchart showing a control example of the printing system 1000 to be controlled in the embodiment of the present invention;

FIG. 34 is a view for explaining a display control example on the UI unit to be controlled in the embodiment of the present invention;

FIG. 35 is a view for explaining a display control example on the UI unit to be controlled in the embodiment of the present invention;

FIG. 36 is a flowchart showing a control example of the printing system 1000 to be controlled in the embodiment of the present invention;

FIG. 37 is a view for explaining a display control example on the UI unit to be controlled in the embodiment of the present invention;

FIG. 41 is a view for explaining a display control example on the UI unit to be controlled in the embodiment of the present invention.

DESCRIPTION OF THE EMBODIMENTS

Figure 1:
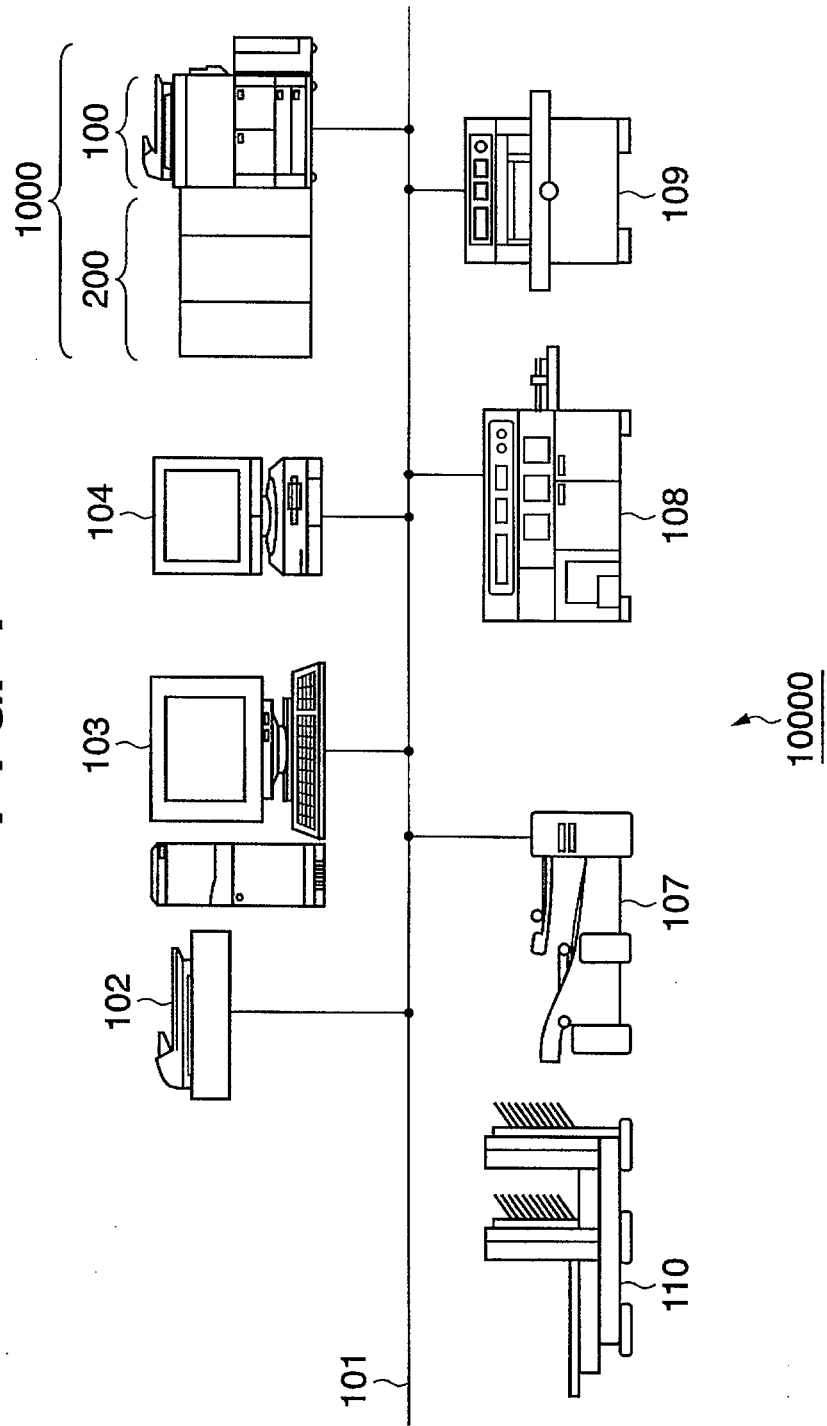
FIG. 1 is a view for explaining an overall configuration of a system including a printing system 1000 to be controlled in an embodiment of the present invention.

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

[Description of System Configuration of Entire Printing Environment 10000 Including Printing System 1000]

The embodiment assumes a printing environment such as the POD environment different from the office environment in order to solve problems described in Description of the Related Art. The embodiment will explain the system environment of an entire POD environment site (printing environment 10000 in FIG. 1) including a printing system 1000.

In the embodiment, the printing environment 10000 where the printing system 1000 is applicable is also suited to the POD environment and is called the POD printing system 10000.

The POD printing system 10000 in FIG. 1 comprises, as building components, the printing system 1000 of the embodiment, and a server computer 103 and client computer 104 (to be referred to as PCs hereinafter). The POD printing system 10000 also comprises a paper folding apparatus 107, cutting apparatus 109, saddle stitching apparatus 110, case binding apparatus 108, scanner 102, and the like. In this manner, a plurality of apparatuses are prepared in the POD printing system 10000.

The printing system 1000 comprises a printing apparatus 100 and sheet processing apparatus 200 as building components. As an example of the printing apparatus 100, the embodiment will explain a multi-function peripheral having a plurality of functions such as the copy function and PC print function. However, the printing apparatus 100 may be a single function type printing apparatus having only the PC function or copy function. The multi-function peripheral will also be called an MFP hereinafter.

The paper folding apparatus 107, cutting apparatus 109, saddle stitching apparatus 110, and case binding apparatus 108 in FIG. 1 are defined as sheet processing apparatuses, similar to the sheet processing apparatus 200 of the printing system 1000. This is because these apparatuses can execute sheet processes for sheets of a job printed by the printing apparatus 100 of the printing system 1000. For example, the paper folding apparatus 107 can fold sheets of a job printed by the printing apparatus 100.

The cutting apparatus 109 can cut a bundle of sheets printed by the printing apparatus 100. The saddle stitching apparatus 110 can saddle-stitch sheets of a job printed by the printing apparatus 100. The case binding apparatus 108 can case-bind sheets of a job printed by the printing apparatus 100. To execute various sheet processes by these sheet processing apparatuses, the operator needs to take out a printed material of a job printed by the printing apparatus 100 from the delivery unit of the printing apparatus 100, and set the printed material in a target sheet processing apparatus.

When using a sheet processing apparatus other than the sheet processing apparatus 200 of the printing system 1000, intervention work by the operator is required after print processing by the printing apparatus 100.

In other words, when the sheet processing apparatus 200 of the printing system 1000 executes sheet processing required for a job printed by the printing apparatus 100, no intervention work by the operator is necessary after the printing apparatus 100 executes print processing. This is because the printing apparatus 100 can directly supply sheets printed by it to the sheet processing apparatus 200. More specifically, the sheet feeding path in the printing apparatus 100 can be coupled to that in the sheet processing apparatus 200. In this manner, the sheet processing apparatus 200 and printing apparatus 100 of the printing system 1000 are physically connected to each other. In addition, the printing apparatus 100 and sheet processing apparatus 200 comprise CPUs and can communicate data. That is, the printing apparatus 100 and sheet processing apparatus 200 are electrically connected to each other.

In the embodiment, the control unit of the printing system comprehensively controls the printing apparatus 100 and sheet processing apparatus 200. For example, a controller 205 in the printing apparatus 100 in FIG. 2 performs comprehensive control. In the embodiment, these sheet processing apparatuses are also called post-processing apparatuses or post-presses.

All these apparatuses in the POD printing system 10000 of FIG. 1 except the saddle stitching apparatus 110 are connected to a network 101 and can communicate data with each other.

For example, the printing apparatus 100 prints print data of a target job whose printing execution request is transmitted via the network 101 from an information processing apparatus serving as an example of external apparatuses such as the PCs 103 and 104.

For example, the server PC 103 manages all jobs to be processed in the POD printing system 10000 by transmitting/receiving data to/from another apparatus by network communication. In other words, the server PC 103 functions as a computer which comprehensively manages a series of workflow steps including a plurality of processing steps. The server PC 103 determines post-processing conditions capable of finishing in the POD printing system 10000 based on a job instruction accepted from an operator. In addition, the server PC 103 designates a post-processing (finishing) step complying with a request from an end user (customer who requests printing in this example). At this time, the server PC 103 uses information exchange tools such as JDF to exchange information with respective post-processing devices using commands and statuses in post-presses.

As a point of the embodiment in the POD printing system 10000 having the above-mentioned building components, the embodiment classifies the above sheet processing apparatuses into three categories and defines them as follows.

[Definition 1] A sheet processing apparatus which satisfies both (condition 1) and (condition 2) listed below is defined as an "inline finisher". The embodiment also refers to an apparatus satisfying this definition as an inline type sheet processing apparatus.

(Condition 1) The paper path (sheet feeding path) of a sheet processing apparatus is physically connected to the printing apparatus 100 so that the sheet processing apparatus can directly receive sheets conveyed from the printing apparatus 100 without any operator intervention.

(Condition 2) A sheet processing apparatus is electrically connected to another apparatus so as to communicate data necessary for an operation instruction, status confirmation, and the like with another apparatus. More specifically, a sheet processing apparatus is electrically connected to the printing apparatus 100 so as to communicate data with it, or electrically connected to an apparatus (e.g., the PC 103 or 104) other than the printing apparatus 100 via the network 101 so as to communicate data with the apparatus. A sheet processing apparatus which satisfies at least either condition meets (condition 2).

More specifically, the sheet processing apparatus 200 of the printing system 1000 corresponds to an "inline finisher". This is because the sheet processing apparatus 200 is physically and electrically connected to the printing apparatus 100, as described above.

[Definition 2] A sheet processing apparatus which satisfies not (condition 1) but (condition 2) out of (condition 1) and (condition 2) listed above is defined as a "near-line finisher". The embodiment also refers to an apparatus satisfying this definition as a near-line type sheet processing apparatus.

For example, the paper path of a sheet processing apparatus is not connected to the printing apparatus 100, and the sheet processing apparatus requires intervention work by an operator such as carrying of a printed material. However, the sheet processing apparatus can electrically exchange information such as an operation instruction and status confirmation via a communication means such as the network 101. A sheet processing apparatus which meets these conditions will be defined as a "near-line finisher".

More specifically, the paper folding apparatus 107, cutting apparatus 109, saddle stitching apparatus 110, and case binding apparatus 108 in FIG. 1 correspond to "near-line finishers". This is because these sheet processing apparatuses are not physically connected to the printing apparatus 100, but are electrically connected to another apparatus such as the PC 103 or 104 via the network 101 so as to communicate data.

[Definition 3] A sheet processing apparatus which satisfies neither (condition 1) nor (condition 2) listed above is defined as an "offline finisher". The embodiment also refers to an apparatus satisfying this definition as an offline type sheet processing apparatus.

For example, the paper path of a sheet processing apparatus is not connected to the printing apparatus 100, and the sheet processing apparatus requires intervention work by an operator such as carrying of a printed material. Further, the sheet processing apparatus does not comprise any communication unit necessary for an operation instruction and status confirmation, and cannot communicate data with another apparatus. Thus, the operator carries an output material, sets it, manually inputs an operation, and manually gives a status report from the device. A sheet processing apparatus which meets these conditions will be defined as an "offline finisher".

More specifically, the saddle stitching apparatus 110 in FIG. 1 corresponds to an "offline finishers". This is because this sheet processing apparatus is not physically connected to the printing apparatus 100, cannot be connected to the network 101, is not electrically connected to another apparatus, and cannot communicate data to another apparatus.

Various sheet processes are executable in the POD printing system 10000 having various sheet processing apparatuses classified into these three categories.

For example, printed media of a job printed by the printing apparatus 100 can undergo various sheet processes such as cutting, saddle stitching, case binding, sheet folding, punching, sealing, and collation. Sheets can be processed in a bookbinding printing style the end user (client) wants.

Near-line finishers and offline finishers managed by the server PC 103 include various finishers such as a dedicated stapler, dedicated puncher, inserter, and collator. The server PC 103 grasps a device status and job status from near-line finishers via the network 101 by sequential polling or the like using a predetermined protocol. In addition, the server PC 103 manages the execution statuses (progresses) of many jobs processed by the POD printing system 10000.

In the embodiment, different sheet processing apparatuses may execute a plurality of types of print sheet processes described above, or one sheet processing apparatus may execute them. The printing system may comprise any of sheet processing apparatuses.

Another point of the embodiment will be explained. The printing system 1000 in FIG. 1 comprises the printing apparatus 100, and the sheet processing apparatus 200 detachable from the printing apparatus 100. The sheet processing apparatus 200 can directly receive, via the sheet feeding path, sheets of a job printed by the printing apparatus 100. The sheet processing apparatus 200 executes sheet processing requested by a user together with a printing execution request via a user interface unit for sheets of a job printed by a printer unit 203 of the printing apparatus 100. This is apparent from the fact that the sheet processing apparatus 200 is an inline type sheet processing apparatus, as described above.

It should be noted that the sheet processing apparatus 200 in the embodiment can also be defined as a group of sheet processing apparatuses 200. This is because in the embodiment, a plurality of sheet processing apparatuses, which are independent housings and independently available, can be coupled to the printing apparatus 100 and used as the sheet processing apparatus 200.

The printing system 1000 in FIG. 1 comprises the printing apparatus 100 and three sheet processing apparatuses. In other words, in the printing system 1000 in FIG. 1, three sheet processing apparatuses are series-connected to the printing apparatus 100. In this case, a configuration in which a plurality of sheet processing apparatuses are connected to the printing apparatus 100 is called cascade connection. The embodiment handles, as inline finishers, all sheet processing apparatuses included in a group of sheet processing apparatuses 200 cascade-connected to the printing apparatus 100. The controller 205 in FIG. 2 serving as an example of the control unit of the printing system 1000 comprehensively controls the printing apparatus 100 and a plurality of inline type sheet processing apparatuses, and executes various control examples to be described below in the embodiment. The embodiment also has this feature. This configuration will be described later with reference to FIG. 3 and the like.

[Internal Configuration (Mainly Software Configuration) of Printing System 1000]

The internal configuration (mainly software configuration) of the printing system 1000 will be explained with reference to the system block diagram of FIG. 2. In this case, the printing apparatus 100 incorporates all the units of the printing system 1000 shown in FIG. 2 except the sheet processing apparatus 200 (strictly speaking, a group of sheet processing apparatuses configurable by a plurality of inline type sheet processing apparatuses). The sheet processing apparatus 200 is detachable from the printing apparatus 100, and is providable as an option of the printing apparatus 100. This configuration aims to provide a necessary number of necessary inline finishers in the POD environment. For this purpose, the printing system 1000 adopts the following configuration.

The printing apparatus 100 incorporates a nonvolatile memory such as a hard disk drive 209 (to be also referred to as an HDD hereinafter) capable of storing a plurality of job data to be processed. The printing apparatus 100 has a copy function of printing, by the printer unit 203 via the HDD 209, job data accepted from a scanner unit 201 of the printing apparatus 100. The printing apparatus 100 also has a print function of printing, by the printer unit 203 via the HDD 209, job data accepted from an external apparatus such as the PC 103 or 104 via an external I/F 202 serving as an example of a communication unit. The printing apparatus 100 is an MFP type printing apparatus (to be also referred to as an image forming apparatus) having a plurality of functions.

The printing apparatus according to the embodiment can take any form such as a color or monochrome printing apparatus as long as it can execute various control examples described in the embodiment.

The printing apparatus 100 according to the embodiment comprises the scanner unit 201 which scans an original document image and processes scanned image data. The printing apparatus 100 also comprises the external I/F 202 which transmits/receives image data to/from a facsimile device, network connection device, or external dedicated device. The printing apparatus 100 comprises the HDD 209 capable of storing image data of jobs to be printed that are accepted from either the scanner unit 201 or external I/F 202. The printing apparatus 100 comprises the printer unit 203 which prints target job data stored in the HDD 209 on a print medium. The printing apparatus 100 further comprises an operation unit 204 which has a display unit and serves as an example of the user interface unit of the printing system 1000. Other examples of the user interface unit provided by the printing system 1000 are the display unit, keyboard, and mouse of an external apparatus such as the PC 103 or 104.

The controller (to be also referred to as a control unit or CPU) 205 serving as an example of the control unit of the printing system 1000 comprehensively controls the processes, operations, and the like of various units of the printing system 1000. A ROM 207 stores various control programs necessary in the embodiment including programs for executing various processes of flowcharts shown in FIGS. 26, 27, 30 and 31 (to be described later) and the like. The ROM 207 also stores a display control program for displaying various UI windows on the display unit of the operation unit 204 including user interface windows (to be referred to as UI windows hereinafter) shown in the drawings.

The controller 205 reads out and executes programs from the ROM 207, and causes the printing apparatus 100 to execute various operations described in the embodiment. The ROM 207 also stores, for example, a program for executing an operation to interpret PDL (Page Description Language) code data received from an external apparatus (e.g., the PC 103 or 104) via the external I/F 202, and rasterize the PDL code data into raster image data (bitmap image data). These programs are processed by software.

The ROM 207 is a read-only memory, and stores programs (e.g., a boot sequence and font information) and various programs (e.g., the above-mentioned programs) in advance. A RAM 208 is a readable/writable memory, and stores image data, various programs, and setting information sent from the scanner unit 201 or external I/F 202 via a memory controller.

The HDD 209 is a large-capacity storage device which stores image data compressed by a compression/decompression unit 210. The HDD 209 can hold a plurality of data such as print data of a job to be processed. The controller 205 controls the printer unit 203 to print, via the HDD 209, target job data which are input via various input units such as the scanner unit 201 and external I/F 202. The controller 205 also controls to transmit job data to an external apparatus via the external I/F 202. In this fashion, the controller 205 controls to execute various output processes for target job data stored in the HDD 209. The compression/decompression unit 210 compresses/decompresses image data and the like stored in the RAM 208 and HDD 209 in accordance with various compression schemes such as JBIG and JPEG.

With the above-described configuration, the controller 205 serving as an example of the control unit of the printing system controls even the operation of the inline type sheet processing apparatus 200, as shown in FIG. 1. The mechanical structure of the printing system 1000 including a description of this operation will be explained with reference to FIG. 3 and the like.

[Apparatus Configuration (Mainly Mechanical Structure) of Printing System 1000]

The configuration (mainly mechanical structure) of the printing system 1000 will be explained with reference to the view of FIG. 3 for explaining the apparatus configuration.

As described above, in the printing system 1000, a plurality of inline type sheet processing apparatuses are cascade-connected to the printing apparatus 100. An arbitrary number of inline type sheet processing apparatuses connectable to the printing apparatus 100 can be installed in accordance with the environment of use in order to enhance the effects of the embodiment under specific limitations.

Figure 2:
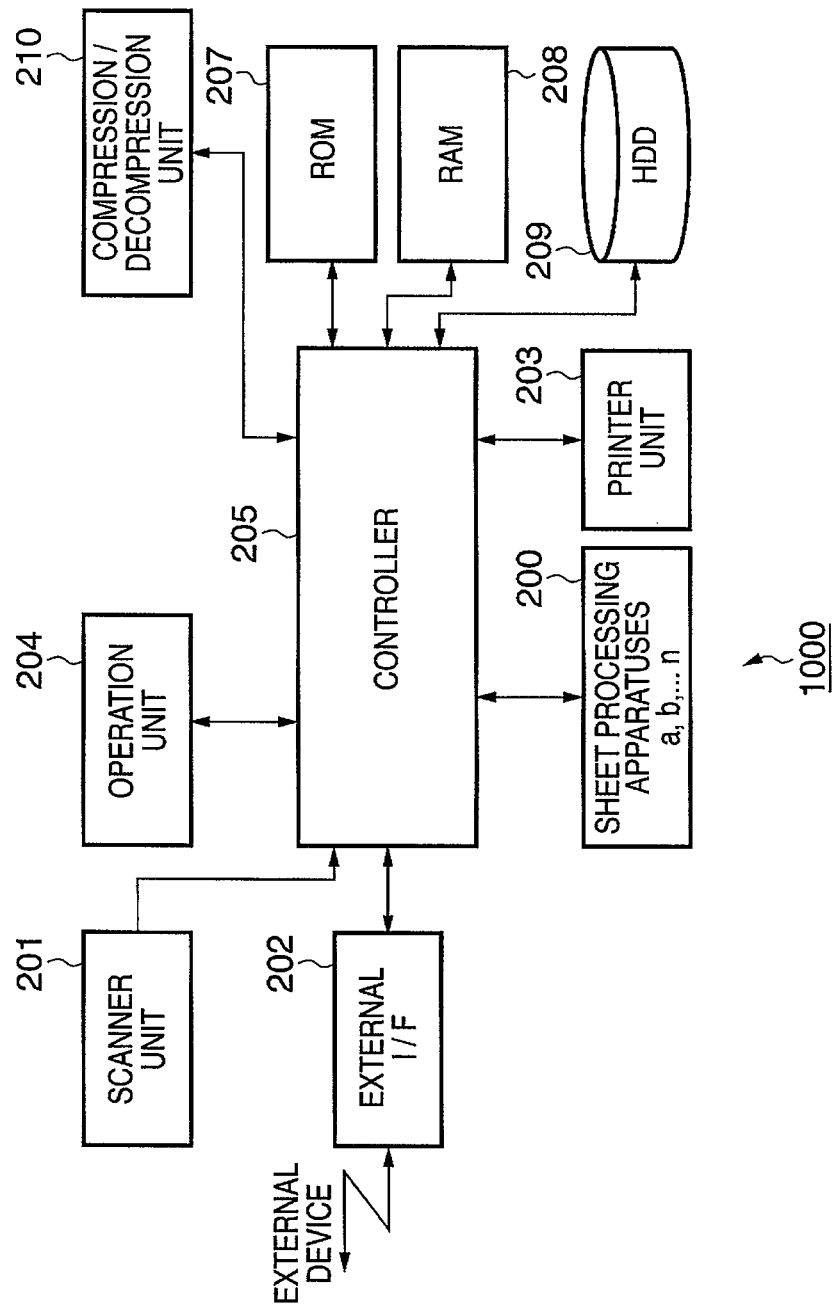
FIG. 2 is a block diagram for explaining a configuration of the printing system 1000 to be controlled in the embodiment of the present invention.
Figure 3:
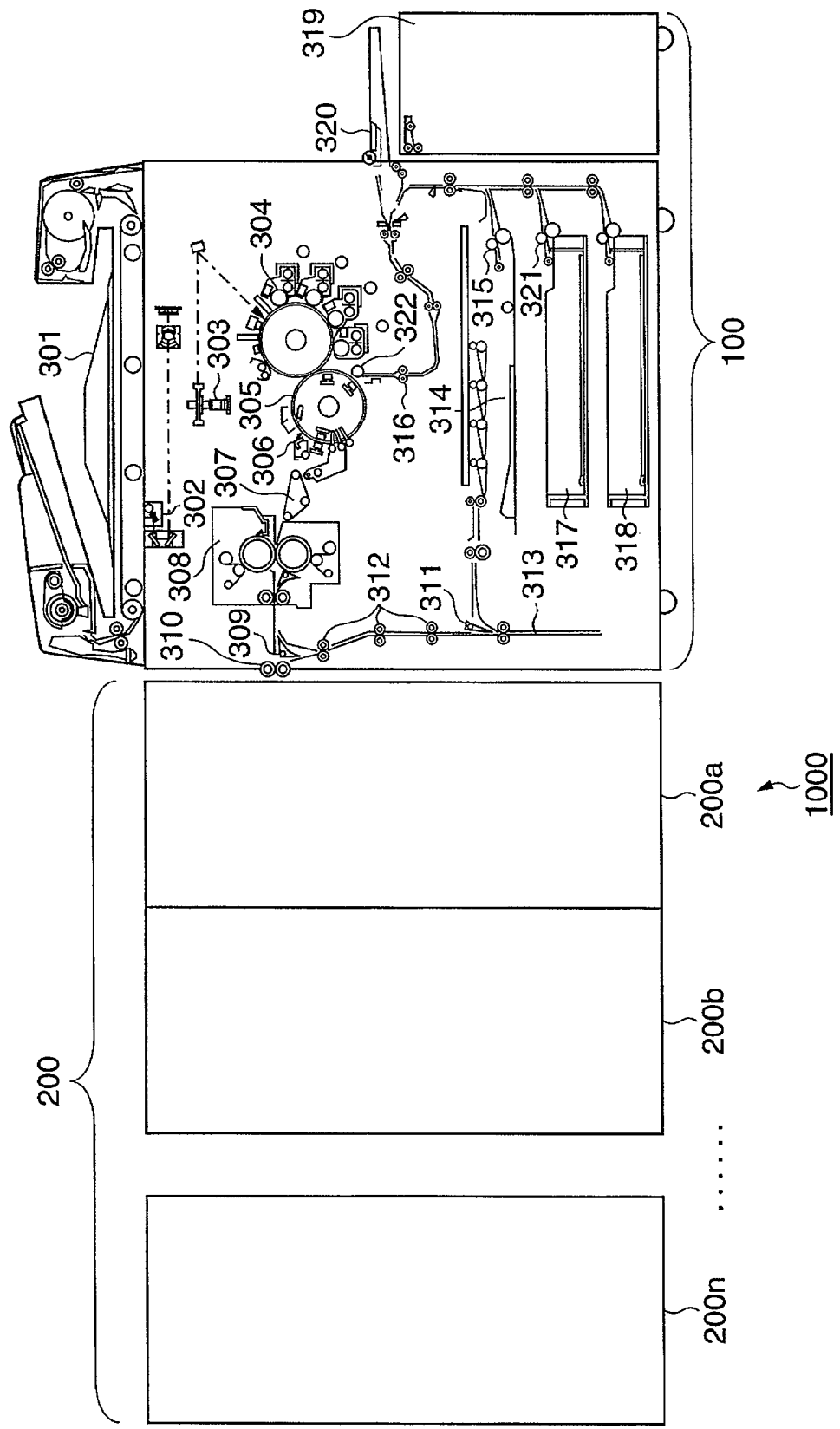
FIG. 3 is a view for explaining a configuration of the printing system 1000 to be controlled in the embodiment of the present invention.

To make the description clearer, N sheet processing apparatuses 200 are connectable as a group of sheet processing apparatuses in FIGS. 2 and 3. Sheet processing apparatuses are defined as sheet processing apparatuses 200a, 200b, . . . sequentially from the first sheet processing apparatus, and the Nth sheet processing apparatus is defined as a sheet processing apparatus 200n. For descriptive convenience, each sheet processing apparatus 200 has a shape as shown in FIGS. 1 to 3, but has an actual appearance to be described later.

A mechanical structure will be explained when the printing apparatus 100 executes print processing corresponding to a step preceding to sheet processes executed by the inline type sheet processing apparatuses 200. A paper handling operation and the like until sheets of a printed job are supplied from the printer unit 203 into the sheet processing apparatus 200 will be explained. The controller (to be also referred to as a control unit or CPU hereinafter) 205 in FIG. 2 causes the printing apparatus 100 to mainly execute the paper handling operation and the like.

Of reference numerals 301 to 322 shown in FIG. 3, reference numeral 301 corresponds to the mechanical structure of the scanner unit 201 in FIG. 2. Reference numerals 302 to 322 correspond to the mechanical structure of the printer unit 203 in FIG. 2. The embodiment will describe the structure of a 1D type color MFP. A 4D type color MFP and monochrome MFP are also examples of the printing apparatus according to the embodiment, but a description thereof will be omitted.

The auto document feeder (ADF) 301 in FIG. 3 separates the first and subsequent original document sheets in the order of pages from an original document bundle set on the support surface of the document tray, and feeds each original document sheet to the document table glass in order to scan the original document sheet by the scanner 302. The scanner 302 scans the image of the original document sheet fed onto the document table glass, and converts the image into image data by a CCD. A light ray (e.g., a laser beam) modulated in accordance with the image data strikes the rotary polygon mirror 303, and irradiates the photosensitive drum 304 as a reflected scan beam via a reflecting mirror. A latent image formed by the laser beam on the photosensitive drum 304 is developed with toner. The toner image is transferred onto a sheet material supported on the transfer drum 305. A series of image forming processes is executed sequentially with yellow (Y), magenta (M), cyan (C), and black (K) toners, forming a full-color image. After four image forming processes, the sheet material bearing the full-color image is separated by the separation gripper 306 from the transfer drum 305, and conveyed to the fixing unit 308 by the pre-fixing conveyor 307.

The fixing unit 308 comprises a combination of rollers and belts, and incorporates a heat source such as a halogen heater. The fixing unit 308 fuses and fixes, by heat and pressure, toner on a sheet material bearing a toner image. The delivery flapper 309 is swingable about the swing shaft, and regulates the sheet material conveyance direction. When the delivery flapper 309 swings clockwise in FIG. 3, a sheet material is conveyed straight, and discharged outside the apparatus by the delivery rollers 310. To form images on the two surfaces of a sheet material, the delivery flapper 309 swings counterclockwise in FIG. 3. The course of the sheet material changes downward to supply the sheet material to the double-sided conveyor. The double-sided conveyor comprises the reverse flapper 311, reverse rollers 312, reverse guide 313, and double-sided tray 314.

The reverse flapper 311 is swingable about the swing shaft, and regulates the sheet material conveyance direction. To process a double-sided print job, the controller 205 controls to swing the reverse flapper 311 counterclockwise in FIG. 3 and supply a sheet having the first surface printed by the printer unit 203 to the reverse guide 313 via the reverse rollers 312. While the reverse rollers 312 clamp the trailing end of the sheet material, the reverse rollers 312 temporarily stop, the reverse flapper 311 swings clockwise in FIG. 3, and the reverse rollers 312 rotate backward. The sheet is switched back to replace its trailing and leading ends, and then the sheet is guided to the double-sided tray 314.

The double-sided tray 314 temporarily supports the sheet material, and the refeed roller 315 supplies the sheet material again to the registration rollers 316. At this time, the sheet material is sent with a surface opposite to the first surface in the transfer step facing the photosensitive drum. The second image is formed on the second surface of the sheet by the same process as that described above. After the images are formed on the two surfaces of the sheet material, the sheet undergoes the fixing step and is discharged from the printing apparatus to outside the apparatus via the delivery rollers 310. The controller 205 executes this double-sided print sequence, and allows the printing apparatus 100 to execute double-sided printing of target job data on the first and second surfaces of a sheet.

The sheet feed/conveyance section comprises the paper cassettes 317 and 318 (each capable of storing, e.g., 500 sheets) as feeding units storing sheets necessary for print processing. The sheet feed/conveyance section also comprises the paper deck 319 (capable of storing, e.g., 5,000 sheets), and the manual feed tray 320. Units for feeding sheets stored in these feeding units are the feeding rollers 321, registration rollers 316, and the like. The paper cassettes 317 and 318 and the paper deck 319 are configured to be able to set sheets of various materials at various sheet sizes in distinction from each other in the feeding units.

The manual feed tray 320 is also configured to be able to set a variety of print media including a special sheet such as an OHP sheet. The paper cassettes 317 and 318, the paper deck 319, and the manual feed tray 320 respectively have the feeding rollers 321, and are configured to be able to successively feed sheets one by one. For example, a pickup roller sequentially picks up stacked sheet materials. A separation roller facing the feeding roller 321 prevents multi feed, and sheet materials are supplied one by one to the conveyance guide. The separation roller receives, via a torque limiter (not shown), a driving force for rotating the separation roller in a direction opposite to the conveyance direction. When only one sheet material enters a nip formed between the separation roller and the feeding roller, the separation roller rotates in the conveyance direction following the sheet material.

If multi feed occurs, the separation roller rotates in the direction opposite to the conveyance direction to set back the multi-fed sheet materials and supply only one top sheet material. The supplied sheet material is guided between the conveyance guides, and conveyed to the registration rollers 316 by a plurality of conveyance rollers. At this time, the registration rollers 316 stand still. The leading end of the sheet material abuts against the nip formed between the pair of registration rollers 316. Then, the sheet material forms a loop to correct skew. The registration rollers 316 start rotating to convey the sheet material in synchronism with the timing of a toner image formed on the photosensitive drum 304 in the image forming section. By the attraction roller 322, the sheet material sent by the registration rollers 316 is electrostatically attracted onto the surface of the transfer drum 305. The sheet material discharged from the fixing unit 308 is introduced into the sheet feeding path in the sheet processing apparatus 200 via the delivery rollers 310.

Through the above-described print process, the controller 205 processes a job to be printed. The controller 205 causes the printer unit 203 by the above-described method to print job print data stored in the HDD 209 from a data generation source on the basis of a printing execution request accepted from a user via the UI unit.

For example, the data generation source of a job whose printing execution request is accepted from the operation unit 204 means the scanner unit 201. The data generation source of a job whose printing execution request is accepted from a host computer means the host computer.

The controller 205 stores print data of a job to be processed sequentially from the start page in the HDD 209, and reads out the print data of the job sequentially from the start page from the HDD 209 to form the image of the print data on a sheet. The controller 205 performs this start page processing. In addition, the controller 205 supplies printed sheets sequentially from the start page to the sheet feeding path in the sheet processing apparatus 200 with the image surfaces of the sheets facing down. For this purpose, immediately before a sheet enters the sheet processing apparatus 200 via the delivery rollers 310, the controller 205 causes the delivery flapper 309, reverse rollers 312, and the like to execute a switchback operation to reverse the sheet traveling from the fixing unit 308. The controller 205 also executes paper handling control for the start page processing.

The arrangement of the inline type sheet processing apparatus 200 of the printing system 1000 also having the printing apparatus 100 will be explained.

As shown in FIG. 3, the printing system 1000 according to the embodiment comprises a total of n inline type sheet processing apparatuses cascade-connectable to the printing apparatus 100. The number of installed inline type sheet processing apparatuses is arbitrary as much as possible. However, the printing system 1000 must utilize at least a sheet processing apparatus which can supply a sheet printed by the printer unit 203 to an internal sheet processing unit without any intervention work by an operator. In other words, the printing system 1000 must utilize a sheet processing apparatus having a sheet feeding path (paper path) capable of conveying, within the apparatus, a print medium discharged from the printer unit 203 via the delivery rollers 310 of the printing apparatus 100. The printing system 1000 is configured to follow this restriction.

However, the printing system 1000 is flexibly configurable as long as it follows this restriction, as one mechanism for enhancing the effects of the embodiment. For example, the number of connected inline type sheet processing apparatuses is arbitrary such as three or five. The embodiment also assumes the POD environment where the administrator determines that no inline type sheet processing apparatus is necessary, in order to increase the use efficiency of an offline type sheet processing apparatus. For example, even when no inline type sheet processing apparatus is used (i.e., the number of inline type sheet processing apparatuses is 0), the printing apparatus 100 of the embodiment is available.

When cascade-connecting a plurality of inline type sheet processing apparatuses to the printing apparatus 100, a specific user (e.g., administrator) can arbitrarily change and determine their connection order under the restriction.

The above-mentioned mechanism aims to improve user friendliness, and is not an indispensable constituent feature. In other words, the present invention is not limited to this configuration. For example, the present invention is applicable to a system configuration which uniformly defines the number of inline type sheet processing apparatuses available in the printing system 1000 and their connection order. The present invention incorporates any system configuration and apparatus configuration as long as at least one of various job control examples (to be described later) is executable.

How many and what kinds of inline type sheet processing apparatuses are connectable to the printing apparatus 100 in the printing system 1000, how to connect them, and what kinds of sheet processes they can execute will be described later.

[Arrangement of Operation Unit 204 as Example of UI Unit of Printing System 1000]

Figure 4:
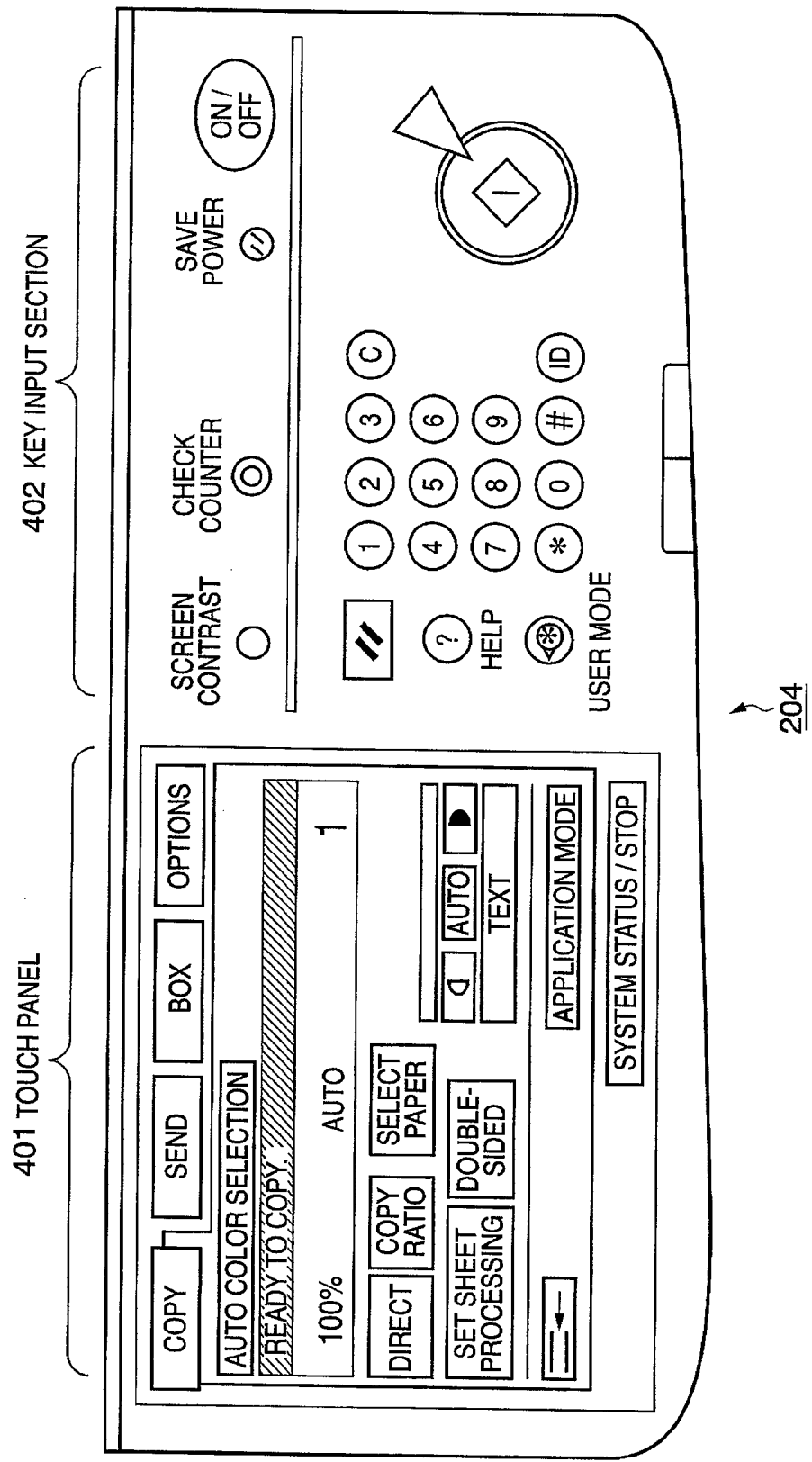
FIG. 4 is a view for explaining an example of a UI unit to be controlled in the embodiment of the present invention.

The operation unit 204 serving as an example of the user interface unit (to be referred to as a UI unit hereinafter) of the printing apparatus 100 in the printing system 1000 will be explained with reference to FIG. 4 and the like.

The operation unit 204 comprises a key input section 402 capable of accepting a user operation with hard keys, and a touch panel 401 serving as an example of a display unit capable of accepting a user operation with soft keys (display keys).

Figure 5:
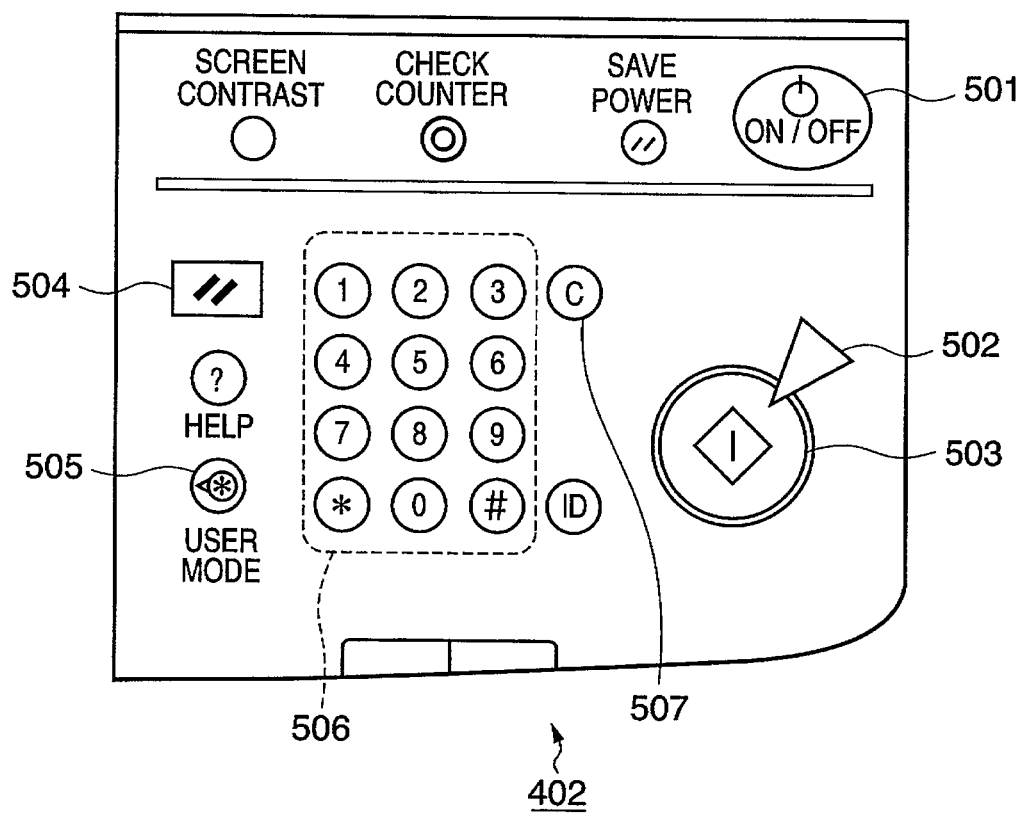
FIG. 5 is a view for explaining an example of the UI unit to be controlled in the embodiment of the present invention.

As shown in FIG. 5, the key input section 402 comprises a power switch 501. In response to an operation to the power switch 501, the controller 205 switches between the standby mode (normal operation state) and the sleep mode (state in which the program stops in wait for an interrupt in preparation for network printing, facsimile transmission, or the like, suppressing power consumption). The controller 205 controls to accept a user operation to the power switch 501 while a main power switch (not shown) for supplying power to the whole system is ON.

A start key 503 allows accepting an instruction from a user to cause the printing apparatus 100 to start a kind of job processing designated by a user, such as copying or transmission of a job to be processed. A stop key 502 allows accepting an instruction from the user to cause the printing apparatus to interrupt the process of an accepted job. A ten-key pad 506 allows the user to set the entries of various settings. A clear key 507 is used to cancel various parameters such as entries set by the user via the ten-key pad 506. A reset key 504 is used to accept an instruction from the user to invalidate various settings made by the user for a job to be processed and restore the setting values to defaults. A user mode key 505 is used to shift to a system setup window for each user.

Figure 6:
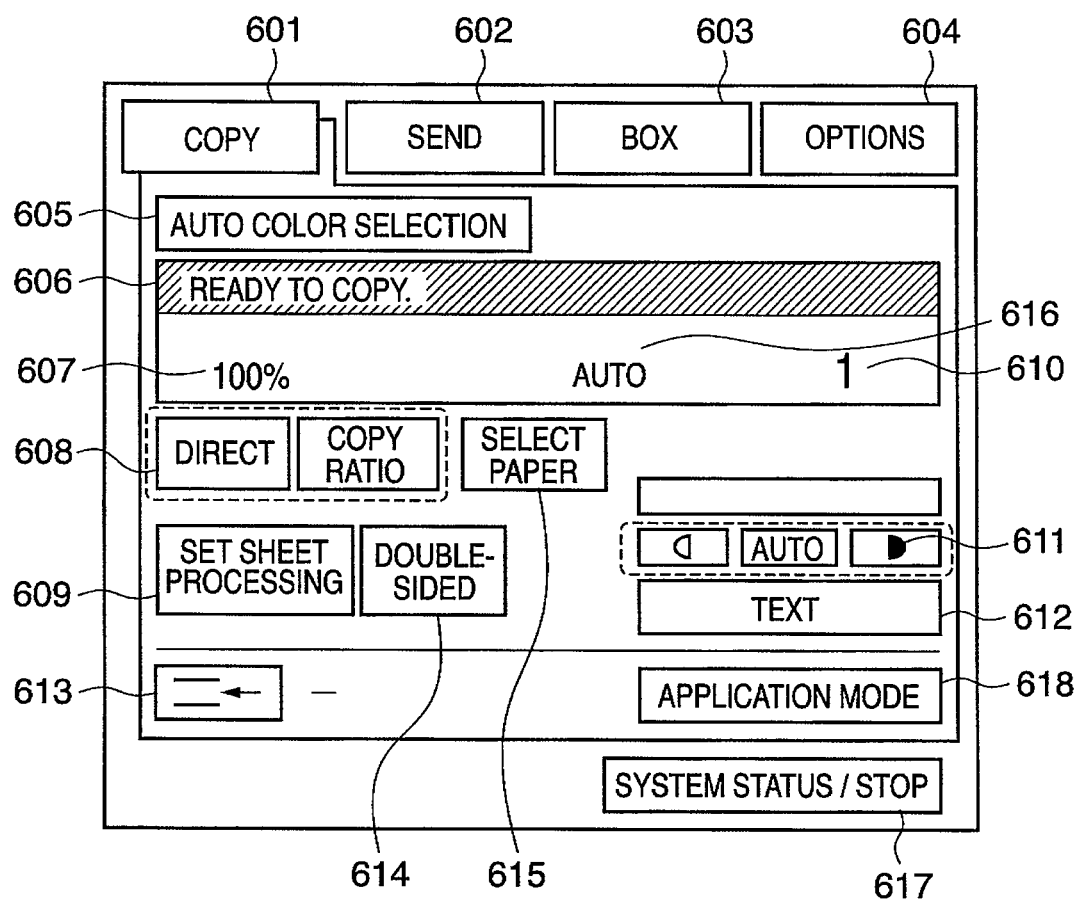
FIG. 6 is a view for explaining an example of display control on the UI unit to be controlled in the embodiment of the present invention.

FIG. 6 is a view for explaining the touch panel (to be also referred to as a display unit) 401 serving as an example of a user interface unit provided by the printing system. The touch panel 401 has an LCD (Liquid Crystal Display), and a touch panel display formed from a transparent electrode adhered onto the LCD. The touch panel 401 has both a function of accepting various settings from an operator and a function of presenting information to the operator. For example, when detecting that the user presses a portion corresponding to a valid display key on the LCD, the controller 205 complies with a display control program stored in advance in the ROM 207. Then, the controller 205 controls the touch panel 401 to display an operation window corresponding to the key operation. FIG. 6 shows an example of an initial window displayed on the touch panel 401 when the printing apparatus 100 is in the standby mode (state in which there is no job to be processed by the printing apparatus 100).

When the user presses a copy tab 601 on the touch panel 401 shown in FIG. 6, the controller 205 causes the touch panel 401 to display the operation window of the copy function provided by the printing apparatus 100. When the user presses a send tab 602, the controller 205 causes the touch panel 401 to display the operation window of the data send function (e.g., FAX transmission or E-mail sending) provided by the printing apparatus 100. When the user presses a box tab 603, the controller 205 causes the touch panel 401 to display the operation window of the box function provided by the printing apparatus 100.

The box function uses a plurality of data storage boxes (to be referred to boxes hereinafter) which are virtually ensured in the HDD 209 in advance and are available distinctively for respective users. With the box function, the controller 205 allows a user to select a desired one of boxes via the user interface unit, and can accept a desired operation from the user. For example, the controller 205 responds to an instruction input from the user via the operation unit 204, and controls the HDD 209 to store, in a box selected by the user, document data of a job accepted from the scanner 201 of the printing apparatus 100.

The controller 205 also allows storing, e.g., text data of a job accepted from an external apparatus (e.g., the PC 103 or 104) via the external I/F 202 in a box designated by the user in accordance with an instruction designated by the user via the user interface unit of the external apparatus. The controller 205 controls, e.g., the printer unit 203 to print job data stored in a box in a desired output form in accordance with a user instruction from the operation unit 204, or controls the external I/F 202 to transmit the job data to an external apparatus the user wants.

To allow a user to execute various box operations, the controller 205 controls the touch panel 401 to display a box function operation window in response to press of the box tab 603 by the user. When the user presses an option tab 604 on the touch panel 401 of FIG. 6, the controller 205 causes the touch panel 401 to display a window for setting optional functions such as scanner setting. When the user presses a system monitor key 617, the controller 205 causes the touch panel 401 to display a display window for notifying the user of the MFP state or status.

A color selection setting key 605 allows the user to select color copying, monochrome copying, or auto selection in advance. A copy ratio setting key 608 causes the touch panel 401 to display a setup window which allows the user to set a copy ratio such as equal magnification, enlargement, or reduction.

When the user presses a double-sided key 614, the controller 205 causes the touch panel 401 to display a window which allows the user to set which of single-sided printing and double-sided printing is executed to print a target job. In response to press of a sheet selection key 615 by the user, the controller 205 causes the touch panel 401 to display a window which allows the user to set a feeding unit, sheet size, and sheet type (medium type) necessary to print a target job. In response to press of a key 612 by the user, the controller 205 causes the touch panel 401 to display a window which allows the user to select an image processing mode (e.g., a text mode or photo mode) suited to an original document image. When the user operates a density setting key 611, the controller 205 allows him to adjust the density of the output image of a job to be printed.

Referring to FIG. 6, the controller 205 causes the touch panel 401 to display, in a status display field 606, the operation state (e.g., standby, warm-up, printing, jam, or error) of an event which occurs in the printing apparatus 100, in order to prompt the user to confirm the event. The controller 205 causes the touch panel 401 to display information in a display field 607 for prompting the user to confirm the copy ratio of a job to be processed. The controller 205 causes the touch panel 401 to display information in a display field 616 for prompting the user to confirm the sheet size and feeding mode of a job to be processed. The controller 205 causes the touch panel 401 to display, in a display field 610, information for prompting the user to confirm the number of copies of a job to be processed, and information for prompting the user to confirm the sheet number during printing. In this manner, the controller 205 causes the touch panel 401 to display various kinds of information to be announced to the user.

When the user presses an interrupt key 613, the controller 205 causes the printing apparatus 100 to stop printing a current job, and execute printing of a job from the user. When the user presses an application mode key 618, the controller 205 causes the touch panel 401 to display a window for setting various image processes and layouts, such as two-page separation, cover sheet/slip sheet setting, reduction layout, and image movement.

Still another point of the embodiment will be described.

As a setting for a job to be processed, the controller 205 causes the UI unit to execute a display for accepting a request from a user to execute sheet processing by the sheet processing unit of the inline type sheet processing apparatus 200 of the printing system 1000. The controller 205 also causes the UI unit to execute a display for accepting an instruction from the user to cause the UI unit to execute this display.

For example, the controller 205 causes the touch panel 401 to display a sheet processing setting key 609 in FIG. 6. Assume that the user presses the sheet processing setting key 609. Then, the controller 205 causes the touch panel 401 to execute a display for allowing the user to specify desired sheet processing among sheet processing selection candidates executable using the inline type sheet processing apparatus of the printing system 1000. The "sheet processing setting key 609" illustrated in the display of FIG. 6 will also be referred to as a "finishing key" in FIG. 17. That is, the "sheet processing setting key 609" and "finishing key" mean the same function button. In the following description, "sheet processing" will also be referred to as "finishing". As for "punching", needs for various punching processes (processes to punch a printed sheet) are assumable in the POD environment.

These processes are executable by the punching unit of the saddle stitching apparatus shown in FIGS. 8A to 10B in correspondence with the above-described configuration. Another apparatus or unit may also execute these punching processes. However, the printing system 1000 is permitted to use an apparatus which satisfies the definition of an inline finisher, and is inhibited from using an apparatus which does not satisfy this definition.

Figure 7:
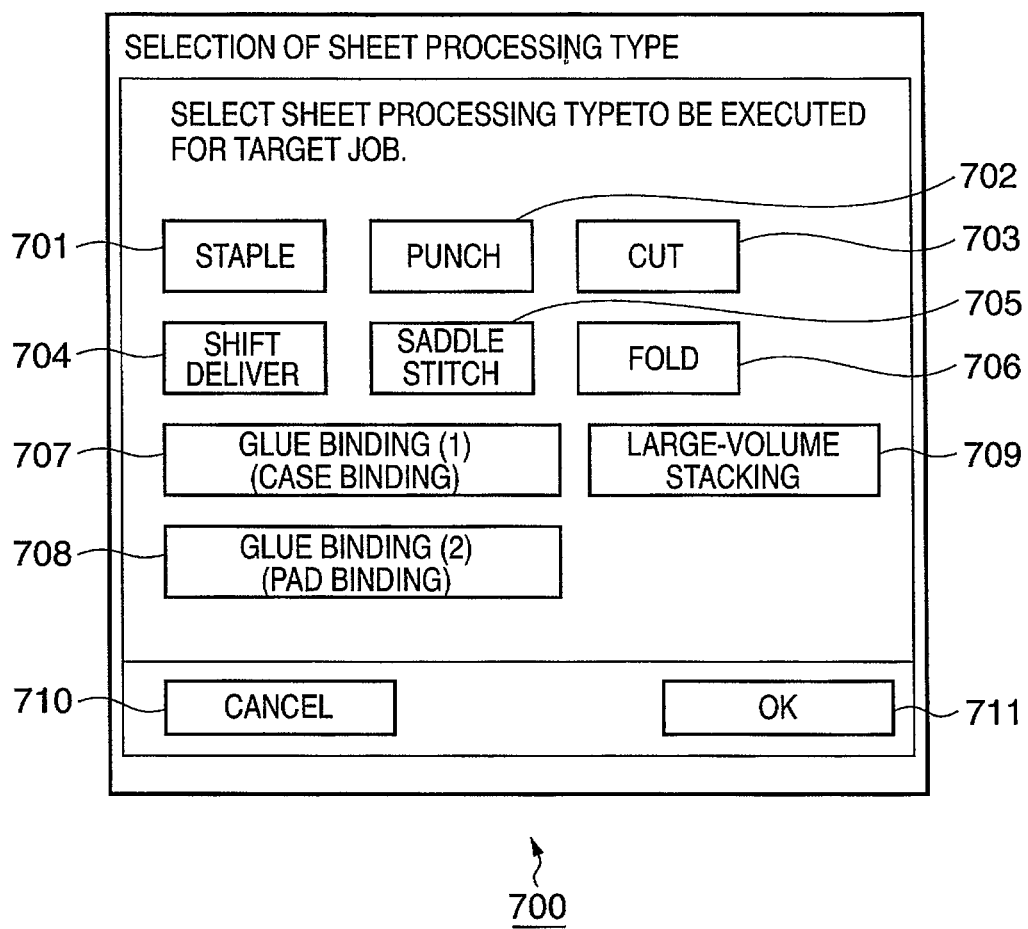
FIG. 7 is a view for explaining an example of display control on the UI unit to be controlled in the embodiment of the present invention.

In this example, the controller 205 causes the touch panel 401 to execute a display in FIG. 7 in response to press of the sheet processing setting key 609 by the user. The controller 205 controls to accept a request via the display of FIG. 7 to execute sheet processing by the inline sheet processing apparatus 200 for a printed sheet of a job to be processed.

The controller 205 determines sheet processing apparatus candidates selectable via the display of FIG. 7 in accordance with the kind of sheet processing apparatus arranged in the printing system 1000 and the installation of the sheet processing apparatus. For example, the display of FIG. 7 permits accepting a request from a user to execute any type of sheet processing among a plurality of types of sheet processes listed below for a sheet printed by the printer unit 203: (1) stapling, (2) punching, (3) folding, (4) shift delivery, (5) cutting, (6) saddle stitching, (7) case binding as an example of glue binding, (8) pad binding as another example of glue binding, and (9) large-volume stacking.

In the UI control example of FIG. 7, the controller 205 controls the operation unit 204 to set these nine sheet processes as selection candidates. This is because the inline type sheet processing apparatuses of the printing system 1000 can be used to selectively execute these nine sheet processes.

In other words, the controller 205 controls the UI unit to exclude a type of sheet processing unexecutable by the printing system 1000 from selection candidates in the display of FIG. 7. For example, when the printing system 1000 does not comprise one sheet processing apparatus capable of selectively executing case binding and pad binding, or this sheet processing apparatus is out of order, the controller 205 controls to invalidate keys 707 and 708. For example, the controller 205 grays out and hatches the keys 707 and 708. With this setting, the controller 205 controls not to accept a request from a user to execute these sheet processes. Further, when the printing system 1000 comprises a sheet processing apparatus capable of executing sheet processing different from the above-mentioned nine candidates, the controller 205 controls the display of FIG. 7 to validate a display key for accepting a request from a user to execute the different sheet processing. With this display key, the controller 205 permits accepting a request from a user to execute the sheet processing. The embodiment prevents any user operation error by executing this display control in addition to job processing control (to be described later).

When executing this control, the controller 205 acquires system configuration information for specifying what kind of sheet processing apparatus the printing system 1000 comprises as the sheet processing apparatus 200. In this control, the controller 205 also uses, e.g., status information for specifying whether an error occurs in the sheet processing apparatus 200. The controller 205 acquires these pieces of information by prompting a user to manually input them via the UI unit, or acquires them automatically on the basis of a signal output from the sheet processing apparatus 200 via a signal line when the sheet processing apparatus 200 is connected to the printing apparatus 100. On the premise of this configuration, the controller 205 causes the touch panel 401 to execute the display of FIG. 7 with display contents based on the acquired information.

The printing system 1000 can accept a request from an external apparatus such as the PC 103 or 104 to print a target job and a request to execute sheet processing necessary for the job. When inputting a job from the external apparatus, the controller 205 controls the display unit of the external apparatus serving as a print data transmission source to display the same functions as those of the display in FIG. 7. For example, the controller 205 causes the display unit of a computer such as the PC 103 or 104 to display a printer driver setup window (to be described later). When the UI of the external apparatus executes the display, the control unit of the external apparatus executes the above-described control. For example, when the display unit of the PC 103 or 104 displays a printer driver UI window (to be described later), the CPU of the PC executes the main control.

[Concrete Example of Configuration of Printing System 1000 to be Controlled in Embodiment]

A system configuration representing how many and what kinds of inline type sheet processing apparatuses are connectable to the printing apparatus 100 in the printing system 1000, how to connect them, and what kinds of sheet processes they can execute will be explained with reference to FIGS. 8A and 8B and the like in association of a feature of the embodiment.

Figure 8A:
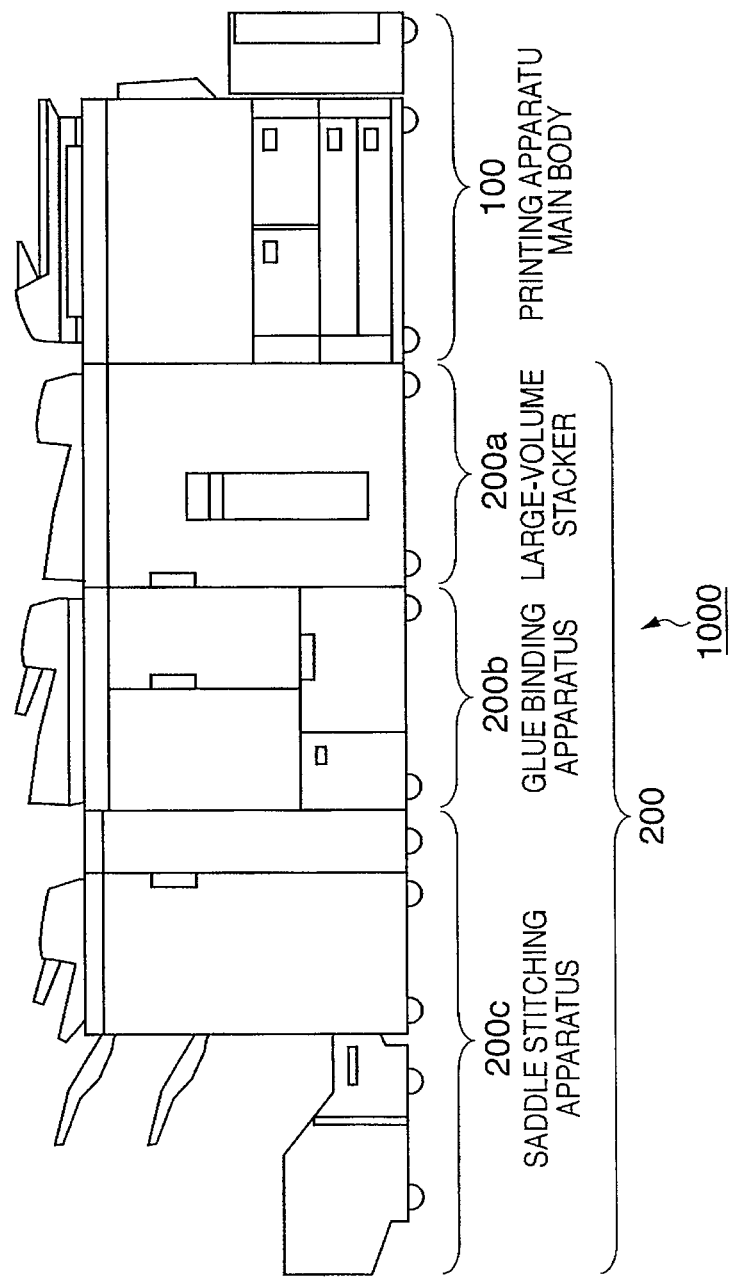
FIG. 8A is a view for explaining a control example of the printing system 1000 to be controlled in the embodiment of the present invention.
Figure 8B:
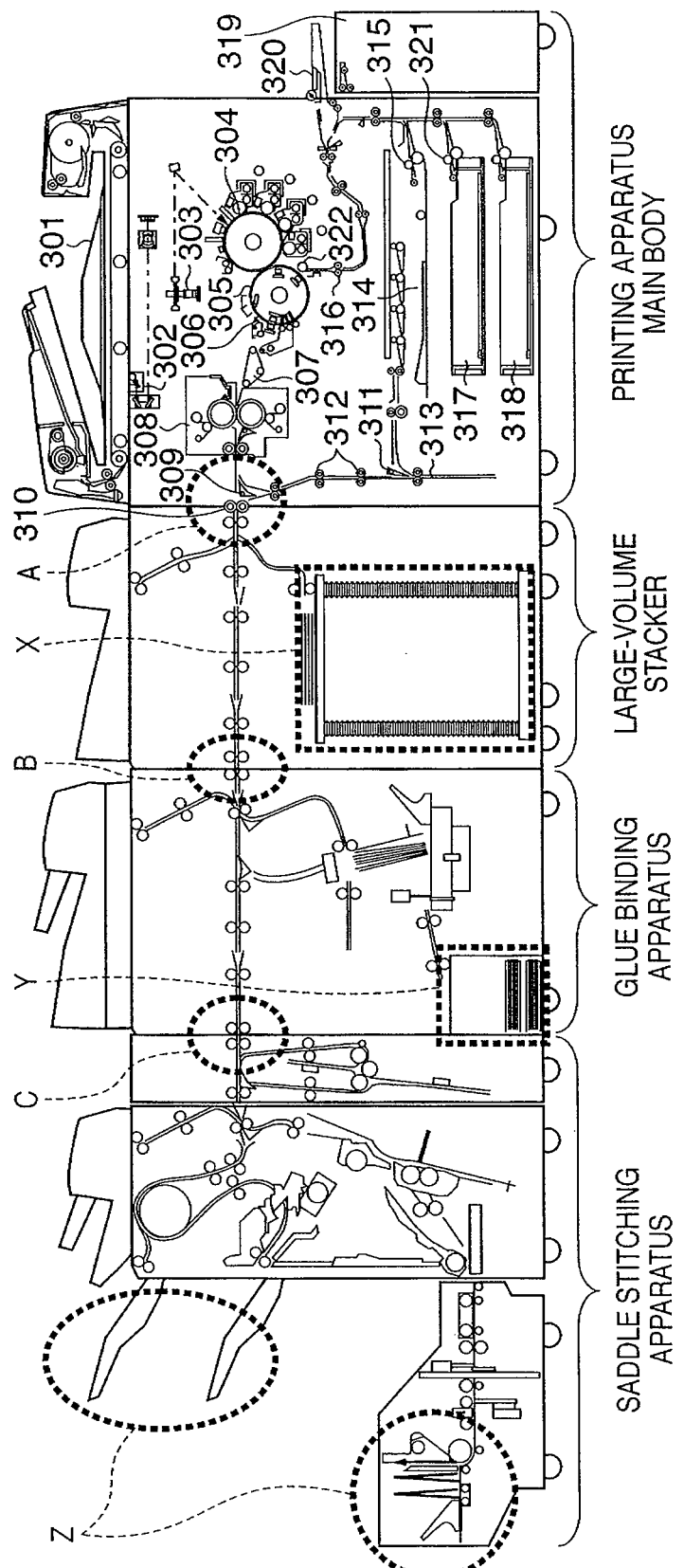
FIG. 8B is a view for explaining the control example of the printing system 1000 to be controlled in the embodiment of the present invention.

The embodiment can implement, for example, a system configuration as shown in FIGS. 8A and 8B as the printing system 1000 shown in FIGS. 1 to 3.

In the system configuration example of FIG. 8A, the printing system 1000 comprises a total of three inline type sheet processing apparatuses, i.e., a large-volume stacker, glue binding apparatus, and saddle stitching apparatus as a group of sheet processing apparatuses 200. In the configuration example of FIG. 8A, the large-volume stacker, glue binding apparatus, and saddle stitching apparatus are connected in the order named to the printing apparatus 100 of the printing system 1000. The controller 205 serving as an example of the control unit of the printing system 1000 comprehensively controls the printing system 1000 having the system configuration as shown in FIGS. 8A and 8B.

In this case, the large-volume stacker is a sheet processing apparatus capable of stacking a large number of (e.g., 5,000) sheets from the printer unit 203.

The glue binding apparatus is a sheet processing apparatus capable of executing case binding requiring sheet gluing when binding a bundle of sheets printed by the printer unit 203 by attaching a cover. The glue binding apparatus can also execute pad binding corresponding to sheet processing to glue and bind a bundle of sheets without attaching any cover. The glue binding apparatus is also called a case binding apparatus because it is a sheet processing apparatus capable of executing at least case binding.

The saddle stitching apparatus is a sheet processing apparatus capable of selectively executing stapling, punching, cutting, shift delivery, saddle stitching, and folding for sheets from the printer unit 203.

In the embodiment, the controller 205 registers, in a specific memory, various kinds of system configuration information on these sheet processing apparatuses as management information necessary for various control examples. For example, when the printing system 1000 has the system configuration as shown in FIG. 8A, the controller 205 registers the following pieces of information in the HDD 209.

(Information 1) Information 1 is apparatus presence/absence information which allows the controller 205 to confirm that the printing system 1000 comprises an inline type sheet processing apparatus. Information 1 corresponds to information which allows the control unit to specify whether the printing system 1000 comprises an inline type sheet processing apparatus.

(Information 2) Information 2 is inline sheet processing apparatus count information which allows the controller 205 to confirm that the printing system 1000 comprises three inline type sheet processing apparatuses 200. Information 2 corresponds to information which allows the control unit to specify the number of inline type sheet processing apparatuses of the printing system 1000.

(Information 3) Information 3 is inline sheet processing apparatus type information which allows the controller 205 to specify that the printing system 1000 comprises the large-volume stacker, glue binding apparatus, and saddle stitching apparatus. Information 3 corresponds to information which allows the control unit to confirm the types of inline type sheet processing apparatuses of the printing system 1000.

(Information 4) Information 4 includes information which allows the controller 205 to confirm that one of the three inline type sheet processing apparatuses is a large-volume stacker capable of stacking sheets from the printer unit 203. Information 4 includes apparatus performance information which allows the controller 205 to confirm that another inline type sheet processing apparatuses is a glue binding apparatus capable of executing glue binding (case binding and/or pad binding) for sheets from the printer unit 203. Information 4 includes information which allows the controller 205 to confirm that the remaining inline type sheet processing apparatuses is a saddle stitching apparatus capable of selectively executing stapling, punching, cutting, shift delivery, saddle stitching, and folding for sheets from the printer unit 203. In other words, information 4 is information which allows the controller 205 to specify that sheet processes executable by the system are a total of nine processes: stapling, punching, cutting, shift delivery, saddle stitching, folding, case binding, pad binding, and large-volume stacking. Information 4 corresponds to information which allows the control unit to confirm performance information of sheet processes executable by the inline type sheet processing apparatuses of the printing system 1000.

(Information 5) Information 5 is information which allows the controller 205 to confirm that the three sheet processing apparatuses are cascade-connected to the printing apparatus 100 in the order of the large-volume stacker, glue binding apparatus, and saddle stitching apparatus. Information 5 corresponds to connection order information of these sheet processing apparatuses in the system when a plurality of inline finishers are connected.

The controller 205 registers, in the HDD 209, various kinds of information as represented by (information 1) to (information 5) as system configuration information necessary for various control examples. The controller 205 utilizes these pieces of information as criterion information necessary for job control (to be described later).

On the premise of this configuration, for example, the printing system 1000 has the system configuration as shown in FIG. 8A. Control executed by the controller 205 in this system configuration will be exemplified.

For example, when the printing system 1000 has the system configuration in FIGS. 8A and 8B, it can execute all the nine sheet processes. The controller 205 recognizes this on the basis of the criteria of (information 1) to (information 5). Based on the recognition result, the controller 205 controls the UI unit to set all the nine sheet processes as selection candidates in the display of FIG. 7. In addition, the controller 205 executes the following control in response to a user operation.

Assume that the controller 205 accepts a stapling execution request from a user via the UI unit for a target job in response to press of a key 701 by the user in the display of FIG. 7 executed by the UI unit under the control of the controller 205. In response to this request, the controller 205 causes the saddle stitching apparatus corresponding to the sheet processing apparatus 200c in FIG. 8A to staple printed sheets of the job.

Assume that the controller 205 accepts a (sheet) punching execution request from a user via the UI unit for a target job in response to press of a key 702 by the user in the display of FIG. 7 executed by the UI unit under the control of the controller 205. In response to this request, the controller 205 causes the saddle stitching apparatus corresponding to the sheet processing apparatus 200c in FIG. 8A to punch printed sheets of the job.

Assume that the controller 205 accepts a cutting execution request from a user via the UI unit for a target job in response to press of a key 703 by the user in the display of FIG. 7 executed by the UI unit under the control of the controller 205. In response to this request, the controller 205 causes the saddle stitching apparatus corresponding to the sheet processing apparatus 200c in FIG. 8A to cut printed sheets of the job.

Assume that the controller 205 accepts a cutting execution request from a user via the UI unit for a target job in response to press of a key 704 by the user in the display of FIG. 7 executed by the UI unit under the control of the controller 205. In response to this request, the controller 205 causes the saddle stitching apparatus corresponding to the sheet processing apparatus 200c in FIG. 8A to cut printed sheets of the job.

Assume that the controller 205 accepts a saddle stitching execution request from a user via the UI unit for a target job in response to press of a key 705 by the user in the display of FIG. 7 executed by the UI unit under the control of the controller 205. In response to this request, the controller 205 causes the saddle stitching apparatus corresponding to the sheet processing apparatus 200c in FIG. 8A to saddle-stitch printed sheets of the job.

Assume that the controller 205 accepts a folding execution request from a user via the UI unit for a target job in response to press of a key 706 by the user in the display of FIG. 7 executed by the UI unit under the control of the controller 205. In response to this request, the controller 205 causes the saddle stitching apparatus corresponding to the sheet processing apparatus 200c in FIG. 8A to fold (e.g., Z-fold) printed sheets of the job.

Assume that the controller 205 accepts a case binding execution request from a user via the UI unit for a target job in response to press of the key 707 by the user in the display of FIG. 7 executed by the UI unit under the control of the controller 205. In response to this request, the controller 205 causes the glue binding apparatus corresponding to the sheet processing apparatus 200b in FIG. 8A to case-bind printed sheets of the job.

Assume that the controller 205 accepts a pad binding execution request from a user via the UI unit for a target job in response to press of the key 708 by the user in the display of FIG. 7 executed by the UI unit under the control of the controller 205. In response to this request, the controller 205 causes the glue binding apparatus corresponding to the sheet processing apparatus 200b in FIG. 8A to pad-bind printed sheets of the job.

Assume that the controller 205 accepts a large-volume stacking execution request from a user via the UI unit for a target job in response to press of a key 709 by the user in the display of FIG. 7 executed by the UI unit under the control of the controller 205. In response to this request, the controller 205 causes the large-volume stacker corresponding to the sheet processing apparatus 200a in FIG. 8A to stack a large number of printed sheets of the job.

As described above, the controller 205 controls to accept, via the UI unit together with a printing execution request, a request to execute sheet processing the user wants among selection candidates corresponding to sheet processes executable by the sheet processing apparatuses of the printing system 1000. In response to accepting a request from the user via the UI unit provided by the embodiment to print a target job, the controller 205 causes the printer unit 203 to execute print processing necessary for the job. Further, the controller 205 causes a sheet processing apparatus of the printing system 1000 to execute sheet processing necessary for printed sheets of the job.

As another feature of the embodiment, the controller 205 executes the following control in the printing system 1000.

Assume that the printing system 1000 has the system configuration as shown in FIG. 8A. In other words, the printing system 1000 is built by connecting the printing apparatus 100→the large-volume stacker→the glue binding apparatus→the saddle stitching apparatus in the order named. The internal system configuration in this case is as shown in FIG. 8B.

FIG. 8B is a sectional view of the apparatuses of the whole printing system 1000 when the printing system 1000 has the system configuration in FIG. 8A. The apparatus configuration in FIG. 8B corresponds to that in FIG. 8A.

When the apparatuses are connected as large-volume stacker to glue binding apparatus to saddle stitching apparatus as shown in FIG. 8B, a control executed by the control unit is follows.

case 1: Target job requires sheet processing (ex. stacking) by large-volume stacker after print processing.
  ⇒ Sheets of job printed by printing apparatus pass through point A, and undergo sheet processing by large-volume stacker. Printed material having undergone sheet processing is held at delivery destination X of large-volume stacker without conveying printed material to another apparatus.

case 2: Target job requires sheet processing (ex. case binding or pad binding) by glue binding apparatus after print processing.
  ⇒ Sheets of job printed by printing apparatus pass through points A and B, and undergo sheet processing by glue binding apparatus. Printed material having undergone sheet processing is held at delivery destination Y of glue binding apparatus without conveying printed material to another apparatus.

case 3: Target job requires sheet processing (ex. saddle stitching, punching, cutting, shift, or folding) by saddle stitching apparatus after print processing.
  ⇒ Sheets of job printed by printing apparatus pass through points A, B, and C, and undergo sheet processing by saddle stitching apparatus. Printed material having undergone sheet processing is held at delivery destination Z of saddle stitching apparatus without conveying printed material to another apparatus.

As is apparent from the internal apparatus configuration in FIG. 8B, a sheet printed by the printer unit 203 of the printing apparatus 100 is suppliable into the respective sheet processing apparatuses. More specifically, as shown in FIG. 8B, the respective sheet processing apparatuses comprise sheet feeding paths capable of feeding a sheet via points A, B, and C in the apparatuses.

Each inline type sheet processing apparatus such as the sheet processing apparatus 200a or 200b in FIG. 8B has a function of receiving a sheet from a preceding apparatus connected to the input side of the sheet processing apparatus even if a target job does not require sheet processing executable by the sheet processing apparatus. Each inline type sheet processing apparatus also has a function of transferring a sheet received from a preceding apparatus to a succeeding apparatus connected to the output side of the sheet processing apparatus.

As described above, in the printing system 1000 of the embodiment, a sheet processing apparatus, which executes sheet processing different from sheet processing necessary for a target job, has a function of conveying sheets of the target job from a preceding apparatus to a succeeding apparatus. This configuration is also a feature of the embodiment.

For example, when the printing system 1000 has the system configuration shown in FIGS. 8A and 8B on the premise of the above-described system configuration, the controller 205 executes the following exemplary control for a job for which the user issues a printing execution request via the UI unit according to the above-described method.

Assume that a target job whose printing execution request is accepted from the user requires sheet processing (e.g., stacking) by the large-volume stacker after print processing in the system configuration of FIGS. 8A and 8B. This job is called a "stacker job".

When processing the stacker job in the system configuration of FIGS. 8A and 8B, the controller 205 makes job sheets printed by the printing apparatus 100 pass through point A in FIG. 8B, and causes the large-volume stacker to execute sheet processing. The controller 205 causes the large-volume stacker to hold, at a delivery destination X inside the large-volume stacker shown in FIG. 8B, the printing result of the stacker job having undergone the sheet processing (e.g., stacking) by the large-volume stacker, without conveying the printing result to another apparatus (e.g., a succeeding apparatus).

The operator can directly take out, from the delivery destination X, the printed material of the stacker job held at the delivery destination X in FIG. 8B. In other words, this configuration can omit a series of apparatus operations and operator operations to convey sheets to a most downstream delivery destination Z in the sheet conveyance direction in FIG. 8B and take out the printed material of the stacker job from the delivery destination Z.

A series of control operations executed by the controller 205 when the printing system 1000 has the system configuration in FIGS. 8A and 8B corresponds to a control example (case 1) in FIG. 8B.

Assume that a target job whose printing execution request is accepted from the user requires sheet processing (e.g., case binding or pad binding) by the glue binding apparatus after print processing in the system configuration of FIGS. 8A and 8B. This job is called a "glue binding job".

When processing the glue binding job in the system configuration of FIGS. 8A and 8B, the controller 205 makes job sheets printed by the printing apparatus 100 pass through points A and B in FIG. 8B, and causes the glue binding apparatus to execute sheet processing. The controller 205 causes the glue binding apparatus to hold, at a delivery destination Y inside the glue binding apparatus shown in FIG. 8B, the printing result of the glue binding job having undergone the sheet processing (e.g., case binding or pad binding) by the glue binding apparatus, without conveying the printing result to another apparatus (e.g., a succeeding apparatus).

The operator can directly take out, from the delivery destination Y, the printed material of the glue binding job held at the delivery destination Y in FIG. 8B. In other words, this configuration can omit a series of apparatus operations and operator operations to convey sheets to the most downstream delivery destination Z in the sheet conveyance direction in FIG. 8B and take out the printed material of the glue binding job from the delivery destination Z.

A series of control operations executed by the controller 205 when the printing system 1000 has the system configuration in FIGS. 8A and 8B corresponds to a control example (case 2) in FIG. 8B.

Assume that a target job whose printing execution request is accepted from the user requires sheet processing by the saddle stitching apparatus after print processing in the system configuration of FIGS. 8A and 8B. This sheet processing is, e.g., saddle stitching, punching, cutting, shift delivery, or folding. This job is called a "saddle stitching job".

When processing the saddle stitching job in the system configuration of FIGS. 8A and 8B, the controller 205 makes job sheets printed by the printing apparatus 100 pass through points A, B, and C in FIG. 8B, and causes the saddle stitching apparatus to execute sheet processing. The controller 205 causes the saddle stitching apparatus to hold, at the delivery destination Z of the saddle stitching apparatus shown in FIG. 8B, the printing result of the saddle stitching job having undergone the sheet processing by the saddle stitching apparatus, without conveying the printing result to another apparatus.

The delivery destination Z in FIG. 8B has a plurality of delivery destination candidates. This is because the saddle stitching apparatus of the embodiment can execute a plurality of types of sheet processes and the delivery destination changes for each sheet process, which will be described with reference to FIG. 13.

A series of control operations executed by the controller 205 when the printing system 1000 has the system configuration in FIGS. 8A and 8B corresponds to a control example (case 3) in FIG. 8B.

As described above, the controller 205 serving as an example of the control unit of the embodiment also executes paper handling control based on system configuration information of the printing system 1000 that is stored in the HDD 209.

Information corresponding to the system configuration information includes information representing whether the system comprises an inline finisher, and when the system comprises an inline finisher, information on the number of inline finishers and their performance information. When the system comprises a plurality of inline finishers, the system configuration information also includes their connection order information.

As shown in FIGS. 1 to 3, 8A, 8B, and the like, the printing system 1000 according to the embodiment is configured to be able to connect a plurality of inline type sheet processing apparatuses to the printing apparatus 100. As is apparent from a comparison between FIGS. 8A and 8B and FIGS. 9A, 9B, 10A, and 10B (to be described later), a plurality of inline type sheet processing apparatuses can be independently connected or disconnected, or a free combination of them can be attached to the printing apparatus 100. The connection order of inline type sheet processing apparatuses is arbitrary as long as they are physically connectable. However, the embodiment imposes restrictions on the system configuration.

For example, an apparatus permitted to be adopted as an inline type sheet processing apparatus in the printing system 1000 has the following constituent features.

That is, a sheet processing apparatus can execute sheet processing for sheets of a job requiring sheet processing executable by the sheet processing apparatus, and has a sheet conveyance function of receiving, from a preceding apparatus, sheets of a job requiring no sheet processing by the sheet processing apparatus and transferring them to a succeeding apparatus. For example, this sheet processing apparatus corresponds to the large-volume stacker and glue binding apparatus shown in the system configuration of FIGS. 8A and 8B and that of FIGS. 9A and 9B (to be described later).

The embodiment also permits the use of a sheet processing apparatus, which does not meet the above configuration, as an inline type sheet processing apparatus in the printing system 1000. For example, this apparatus satisfies the following requirements.

That is, a sheet processing apparatus can execute sheet processing for sheets of a job requiring sheet processing executable by the sheet processing apparatus, but does not have the sheet conveyance function of receiving, from a preceding apparatus, sheets of a job requiring no sheet processing by the sheet processing apparatus and transferring them to a succeeding apparatus. For example, this sheet processing apparatus corresponds to the saddle stitching apparatus shown in the system configuration of FIGS. 8A and 8B, that of FIGS. 9A and 9B, and that of FIGS. 10A and 10B (to be described later). The embodiment imposes restrictions on an apparatus of this type.

For example, when the printing system 1000 employs an inline finisher (e.g., the saddle stitching apparatus in FIGS. 8A and 8B) having no function of conveying sheets to a succeeding apparatus, the number of apparatuses of this type is limited to one. However, it is permitted to simultaneously use inline finishers of other types.

For example, it is permitted to use the large-volume stacker and glue binding apparatus together with the saddle stitching apparatus, as represented by the system configuration of FIGS. 8A and 8B and that of FIGS. 9A and 9B (to be described later). When a plurality of sheet processing apparatuses are cascade-connected and used, an inline type sheet processing apparatus having no function of conveying sheets to a succeeding apparatus is installed at the most downstream position in the sheet conveyance direction.

For example, the saddle stitching apparatus is connected last in the printing system 1000, as represented by the system configuration of FIGS. 8A and 8B and that of FIGS. 9A and 9B (to be described later). In other words, it is inhibited to configure the system by interposing the saddle stitching apparatus between the large-volume stacker and the glue binding apparatus, as a system configuration different from that of FIGS. 8A and 8B and that of FIGS. 9A and 9B (to be described later).

The control unit of the system comprehensively controls the printing system 1000 so as to operate under the above-described restrictions.

For example, if inline type sheet processing apparatuses are connected in a connection order which violates the restrictions, the controller 205 causes the UI unit to display a warning. For example, when the user inputs the connection order of sheet processing apparatuses via the UI unit, as represented by the above-mentioned configuration, the controller 205 controls to invalidate a user setting which violates the restrictions. For example, the controller 205 grays out or hatches the display to inhibit any improper connection setting.

By employing this configuration, any user operation error, apparatus malfunction, and the like can be prevented in the configuration of the embodiment. This configuration further enhances effects described in the embodiment.

On the premise of this configuration, according to the embodiment, the printing system 1000 can be flexibly configured under the restrictions.

For example, the operator of the POD printing system 10000 can arbitrarily determine and change the connection order of inline type sheet processing apparatuses and the number of connected inline type sheet processing apparatuses under the restrictions. The printing system 1000 executes control complying with the system configuration status. An example of this control will be described.

Figure 9A:
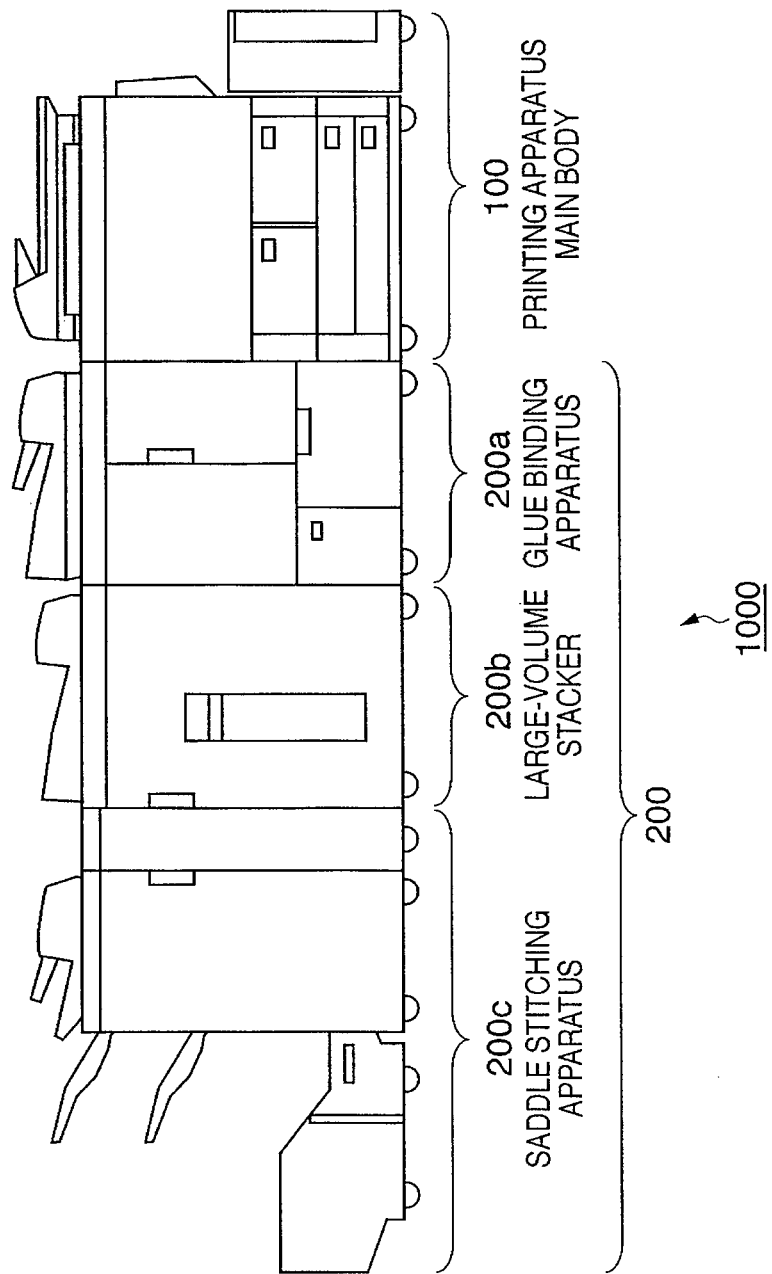
FIG. 9A is a view for explaining a control example of the printing system 1000 to be controlled in the embodiment of the present invention.

The printing system 1000 can also take a system configuration as shown in FIG. 9A, as a system configuration in which the connection order of three inline type sheet processing apparatuses changes from that in the system configuration of FIG. 8A.

The system configuration of FIG. 9A is different from that of FIG. 8A in the connection order of inline sheet processing apparatuses of the printing system 1000. More specifically, the printing system 1000 is built by connecting the printing apparatus 100→the glue binding apparatus→the large-volume stacker→the saddle stitching apparatus in the order named. The internal system configuration in this case is as shown in FIG. 9B.

Figure 9B:
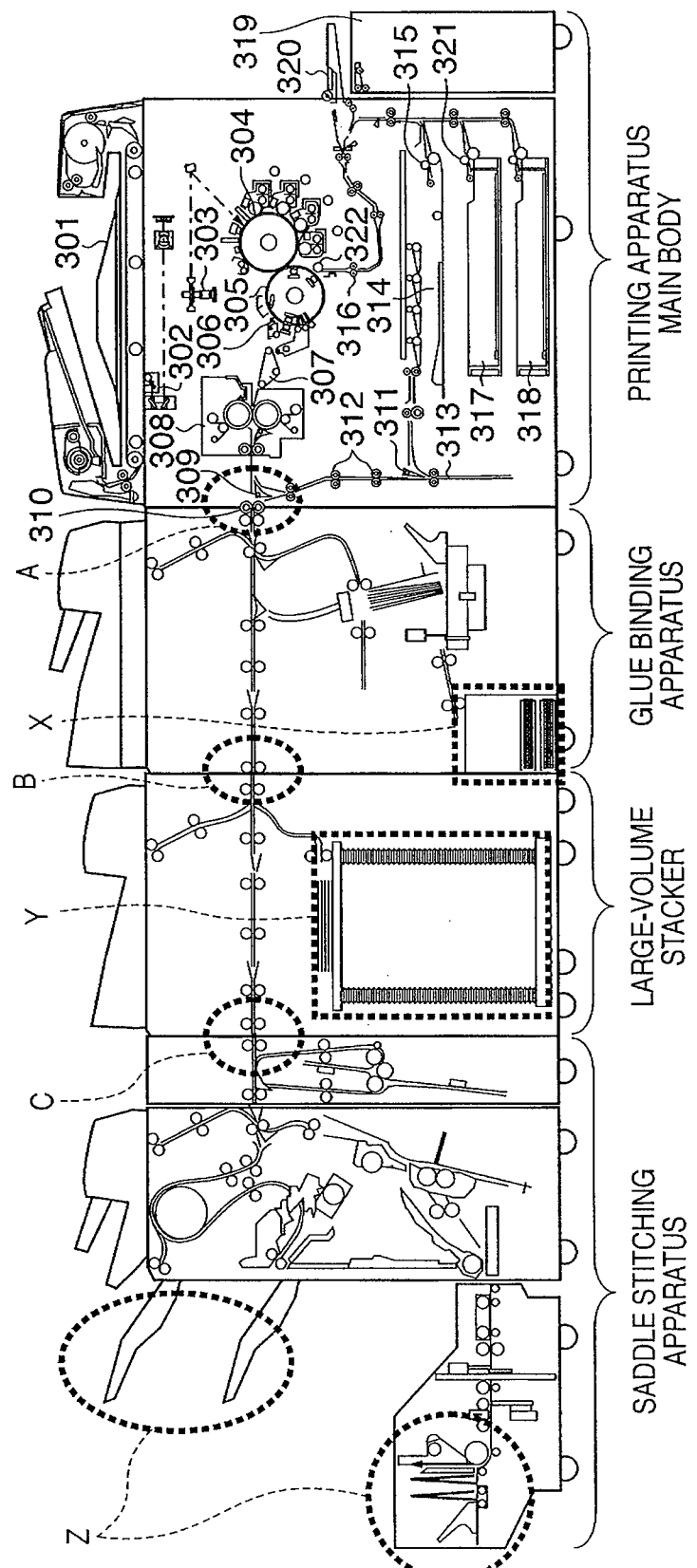
FIG. 9B is a view for explaining the control example of the printing system 1000 to be controlled in the embodiment of the present invention.

FIG. 9B is a sectional view of the apparatuses of the whole printing system 1000 when the printing system 1000 has the system configuration in FIG. 9A. The system configuration in FIG. 9B corresponds to the internal system configuration in FIG. 9A.

Similar to the above-described system configuration example, the internal system configuration in FIG. 9B also allows supplying a sheet printed by the printer unit 203 of the printing apparatus 100 into the respective sheet processing apparatuses. More specifically, as shown in FIG. 9B, the respective sheet processing apparatuses comprise sheet feeding paths capable of feeding a sheet from the printer unit 203 via points A, B, and C in the apparatuses.

The system configuration in FIGS. 9A and 9B also follows the above-mentioned restrictions. For example, the sheet processing apparatuses are cascade-connected to the printing apparatus 100 so as to install the saddle stitching apparatus at the most downstream position in the sheet conveyance direction.

For example, when the printing system 1000 has the system configuration shown in FIGS. 9A and 9B on the premise of the above configuration, the controller 205 executes the following exemplary control for a job for which the user issues a printing execution request via the UI unit according to the above-described method.

Assume that a target job whose printing execution request is accepted from the user requires sheet processing (e.g., stacking) by the large-volume stacker after print processing in the system configuration of FIGS. 9A and 9B. This job is called a "stacker job".

When processing the stacker job in the system configuration of FIGS. 9A and 9B, the controller 205 makes job sheets printed by the printing apparatus 100 pass through points A and B in FIG. 9B, and causes the large-volume stacker to execute sheet processing. The controller 205 causes the large-volume stacker to hold, at the delivery destination Y inside the large-volume stacker shown in FIG. 9B, the printing result of the stacker job having undergone the sheet processing (e.g., stacking) by the large-volume stacker, without conveying the printing result to another apparatus (e.g., a succeeding apparatus).

The operator can directly take out, from the delivery destination Y, the printed material of the stacker job held at the delivery destination Y in FIG. 9B. In other words, this configuration can omit a series of apparatus operations and operator operations to convey sheets to the most downstream delivery destination Z in the sheet conveyance direction in FIG. 9B and take out the printed material of the stacker job from the delivery destination Z.

A series of control operations executed by the controller 205 when the printing system 1000 has the system configuration in FIGS. 9A and 9B corresponds to a control example (case 1) in FIG. 9B.

Assume that a target job whose printing execution request is accepted from the user requires sheet processing (e.g., case binding or pad binding) by the glue binding apparatus after print processing in the system configuration of FIGS. 9A and 9B. This job is called a "glue binding job".

When processing the glue binding job in the system configuration of FIGS. 9A and 9B, the controller 205 makes job sheets printed by the printing apparatus 100 pass through point A in FIG. 9B, and causes the glue binding apparatus to execute sheet processing. The controller 205 causes the glue binding apparatus to hold, at the delivery destination X inside the glue binding apparatus shown in FIG. 9B, the printing result of the glue binding job having undergone the sheet processing (e.g., case binding or pad binding) by the glue binding apparatus, without conveying the printing result to another apparatus (e.g., a succeeding apparatus).

The operator can directly take out, from the delivery destination X, the printed material of the glue binding job held at the delivery destination X in FIG. 9B. In other words, this configuration can omit a series of apparatus operations and operator operations to convey sheets to the most downstream delivery destination Z in the sheet conveyance direction in FIG. 9B and take out the printed material of the glue binding job from the delivery destination Z.

A series of control operations executed by the controller 205 when the printing system 1000 has the system configuration in FIGS. 9A and 9B corresponds to a control example (case 2) in FIG. 9B.

Assume that a target job whose printing execution request is accepted from the user requires sheet processing by the saddle stitching apparatus after print processing in the system configuration of FIGS. 9A and 9B. This sheet processing is, e.g., saddle stitching, punching, cutting, shift delivery, or folding. This job is called a "saddle stitching job".

When processing the saddle stitching job in the system configuration of FIGS. 9A and 9B, the controller 205 makes job sheets printed by the printing apparatus 100 pass through points A, B, and C in FIG. 9B, and causes the saddle stitching apparatus to execute sheet processing. The controller 205 causes the saddle stitching apparatus to hold, at the delivery destination Z of the saddle stitching apparatus shown in FIG. 9B, the printing result of the saddle stitching job having undergone the sheet processing by the saddle stitching apparatus, without conveying the printing result to another apparatus.

The delivery destination Z in FIG. 9B has a plurality of delivery destination candidates. This is because the saddle stitching apparatus of the embodiment can execute a plurality of types of sheet processes and the delivery destination changes for each sheet process, which will be described with reference to FIG. 13.

A series of control operations executed by the controller 205 when the printing system 1000 has the system configuration in FIGS. 9A and 9B corresponds to a control example (case 3) in FIG. 9B.

As illustrated in FIGS. 8A, 8B, 9A, and 9B, the printing system 1000 is configured to be able to flexibly change the connection order of sheet processing apparatuses permitted to be used as inline sheet processing apparatuses under the restrictions. The present invention provides many mechanisms for maximizing the above-described effects of the embodiment.

From this viewpoint, in the embodiment, the printing system 1000 can properly employ a configuration other than the system configurations as shown in FIGS. 8A, 8B, 9A, and 9B. An example of this configuration will be explained below.

For example, the system configurations in FIGS. 8A, 8B, 9A, and 9B each comprise three inline type sheet processing apparatuses. In the embodiment, the user can arbitrarily determine the number of inline type sheet processing apparatuses under the restrictions.

Figure 10A:
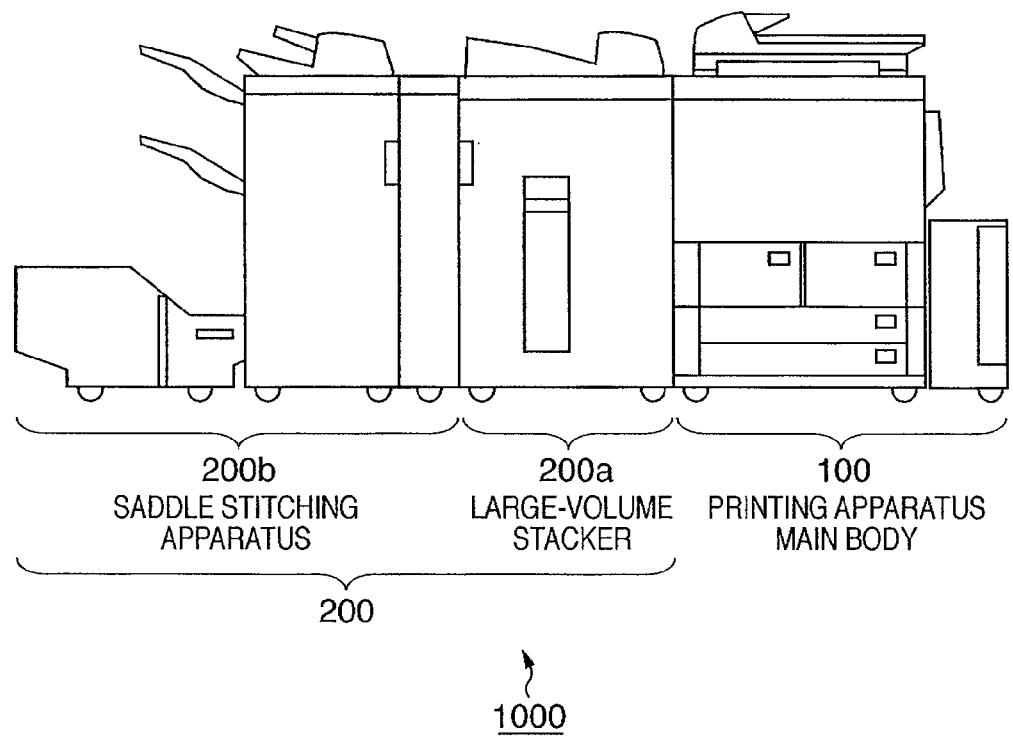
FIG. 10A is a view for explaining a control example of the printing system 1000 to be controlled in the embodiment of the present invention.

For example, the printing system 1000 can also adopt a system configuration as shown in FIG. 10A. The system configuration of FIG. 10A is different from those of FIGS. 8A and 9A in the number of connected sheet processing apparatuses. More specifically, the printing system 1000 is built by connecting two sheet processing apparatuses in the order of the printing apparatus 100→the large-volume stacker→the saddle stitching apparatus. The internal system configuration in this case is as shown in FIG. 10B.

Figure 10B:
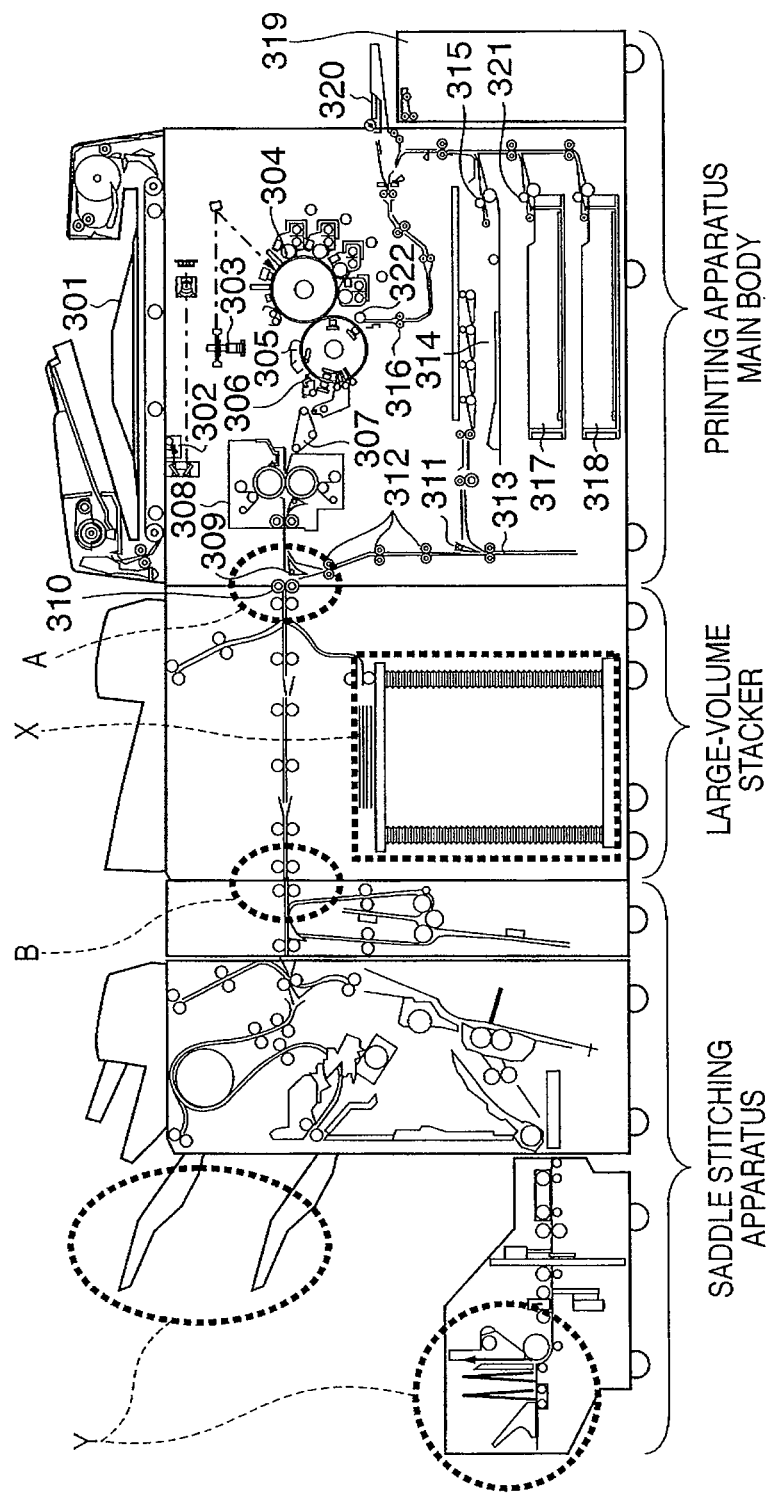
FIG. 10B is a view for explaining the control example of the printing system 1000 to be controlled in the embodiment of the present invention.

FIG. 10B is a sectional view of the system configuration of the overall printing system 1000 when the printing system 1000 has the system configuration in FIG. 10A. The apparatus configuration of FIG. 10B corresponds to that of FIG. 10A.

Similar to the above-described system configuration examples, the internal apparatus configuration in FIG. 10B also allows supplying a sheet printed by the printer unit 203 of the printing apparatus 100 into the respective sheet processing apparatuses. More specifically, as shown in FIG. 10B, the respective sheet processing apparatuses comprise sheet feeding paths capable of feeding a sheet via points A and B in the apparatuses. This system configuration also follows the above-described restrictions. For example, the sheet processing apparatuses are so connected as to install the saddle stitching apparatus at the most downstream position in the sheet conveyance direction.

For example, when the printing system 1000 has the system configuration shown in FIGS. 10A and 10B on the premise of this configuration, the controller 205 executes the following exemplary control for a job for which the user issues a printing execution request via the UI unit according to the above-described method.

Assume that a target job whose printing execution request is accepted from the user requires sheet processing (e.g., stacking) by the large-volume stacker after print processing in the system configuration of FIGS. 10A and 10B. This job is called a "stacker job".

When processing the stacker job in the system configuration of FIGS. 10A and 10B, the controller 205 makes job sheets printed by the printing apparatus 100 pass through point A in FIG. 10B, and causes the large-volume stacker to execute sheet processing. The controller 205 causes the large-volume stacker to hold, at the delivery destination X inside the large-volume stacker shown in FIG. 10B, the printing result of the stacker job having undergone the sheet processing (e.g., stacking) by the large-volume stacker, without conveying the printing result to another apparatus (e.g., a succeeding apparatus).

The operator can directly take out, from the delivery destination X, the printed material of the stacker job held at the delivery destination X in FIG. 10B. In other words, this configuration can omit a series of apparatus operations and operator operations to convey sheets to the most downstream delivery destination Y in the sheet conveyance direction in FIG. 10B and take out the printed material of the stacker job from the delivery destination Y.

A series of control operations executed by the controller 205 when the printing system 1000 has the system configuration in FIGS. 10A and 10B corresponds to a control example (case 1) in FIG. 10B.

Assume that a target job whose printing execution request is accepted from the user requires sheet processing by the saddle stitching apparatus after print processing in the system configuration of FIGS. 10A and 10B. This sheet processing is, e.g., saddle stitching, punching, cutting, shift delivery, or folding. This job is called a "saddle stitching job".

When processing the saddle stitching job in the system configuration of FIGS. 10A and 10B, the controller 205 makes job sheets printed by the printing apparatus 100 pass through points A and B in FIG. 10B, and causes the saddle stitching apparatus to execute sheet processing. The controller 205 causes the saddle stitching apparatus to hold, at the delivery destination Y of the saddle stitching apparatus shown in FIG. 10B, the printing result of the saddle stitching job having undergone the sheet processing by the saddle stitching apparatus, without conveying the printing result to another apparatus.

The delivery destination Y in FIG. 10B has a plurality of delivery destination candidates. This is because the saddle stitching apparatus of the embodiment can execute a plurality of types of sheet processes and the delivery destination changes for each sheet processes, which will be described with reference to FIG. 13.

A series of control operations executed by the controller 205 when the printing system 1000 has the system configuration in FIGS. 10A and 10B corresponds to a control example (case 2) in FIG. 10B.

In the system configuration of FIGS. 10A and 10B, the controller 205 inhibits acceptance of a request from the user to execute sheet processing (e.g., case binding or pad binding) by the glue binding apparatus.

For example, when the printing system has the system configuration as shown in FIGS. 10A and 10B and the UI unit executes the display in FIG. 7, the controller 205 controls to hatch or gray out the keys 707 and 708. In other words, the controller 205 invalidates user operations to the keys 707 and 708.

When the printing system 1000 has the system configuration as shown in FIGS. 10A and 10B, as described above, the controller 205 inhibits the printing system 1000 from executing glue binding. Control executed by the controller 205 when the printing system 1000 has the system configuration in FIGS. 10A and 10B corresponds to (inhibition control) in FIG. 10B.

As described above, the controller 205 executes various control examples depending on the number of connected inline type sheet processing apparatuses in the printing system 1000. That is, the controller 205 executes various control examples corresponding to types of sheet processes executable by the printing system 1000.

As is apparent from the description of FIGS. 8A to 10B and the like, the control unit of the printing system 1000 causes the printing system 1000 to execute various control examples corresponding to the system configuration status (including the number of connected inline sheet processing apparatuses and their connection order) of the printing system 1000.

According to the embodiment, the connection order of inline sheet processing apparatuses and the number of connected inline sheet processing apparatuses in the printing system 1000 can flexibly change to meet user needs because all user merits are considered.

The reason why each inline type sheet processing apparatus permitted to be used in the printing system 1000 is an independent housing and is detachable from the printing apparatus will be described.

As one reason, this mechanism considers, as a POD company to which the printing system 1000 is delivered, a company or the like which does not require case binding but wants to perform large-volume stacking.

In the system use environment, a need to implement all the nine sheet processes by inline sheet processing apparatuses is expected. A need to implement only specific sheet processing by an inline sheet processing apparatus may also arise. The embodiment provides a mechanism coping with various needs from respective POD companies to which the printing system 1000 is delivered.

The reason why inline type sheet processing apparatuses permitted to be used in the printing system 1000 can be arbitrarily changed in connection order and combined under the restrictions will be explained. This reason is also a reason for setting a delivery destination at which the operator can take out a printed material from each inline sheet processing apparatus, as shown in FIGS. 8A, 8B, 9A, and 9B.

As one reason, user friendliness of the printing system 1000 improves by flexibly building the system in accordance with the use frequencies of sheet processes requested in the printing system 1000.

For example, a POD company having the POD printing system 10000 in FIG. 1 tends to receive a relatively large number of print jobs requiring case binding for a user manual, guidebook, and the like, as print form needs from customers. In this use environment, it is convenient to build the printing system 1000 not in the connection order as shown in FIGS. 8A and 8B but in the connection order as shown in FIGS. 9A and 9B.

In other words, it is more convenient to connect the glue binding apparatus at a portion closer to the printing apparatus 100. This is because a shorter sheet conveyance distance in the apparatus necessary to execute case binding for a case binding job is effective.

For example, as the sheet conveyance distance becomes longer, the time taken to complete a printed material as the final product of the job becomes longer. As the sheet conveyance distance becomes longer, the jam generation rate in the apparatus during sheet conveyance is likely to be higher. These are reasons for the flexible connection order.

For a POD company which receives many case binding jobs as user needs, not the system configuration of FIGS. 8A and 8B but that of FIGS. 9A and 9B can shorten the sheet conveyance distance necessary to create the printed material of a case binding job, and allows the operator to quickly take out the printed material.

Assume that another POD company tends to receive many jobs requiring large-volume sheet stacking. For this POD company, not the system configuration of FIGS. 9A and 9B but that of FIGS. 8A and 8B can shorten the sheet conveyance distance necessary to create the printed material of a stacker job, and allows the operator to quickly take out the printed material.

In this fashion, the embodiment pays attention to an increase in the productivity of jobs in the printing system 1000 with an efficient, flexible system configuration suited to the use environment. In addition, the embodiment can provide many mechanisms which pursue friendliness to a user who utilizes the printing system 1000.

Concrete examples of the internal structures of various inline type sheet processing apparatuses available in the printing system 1000 illustrated in FIGS. 8A to 10B will be described for each sheet processing apparatus.

[Internal Structure of Large-Volume Stacker]

Figure 11:
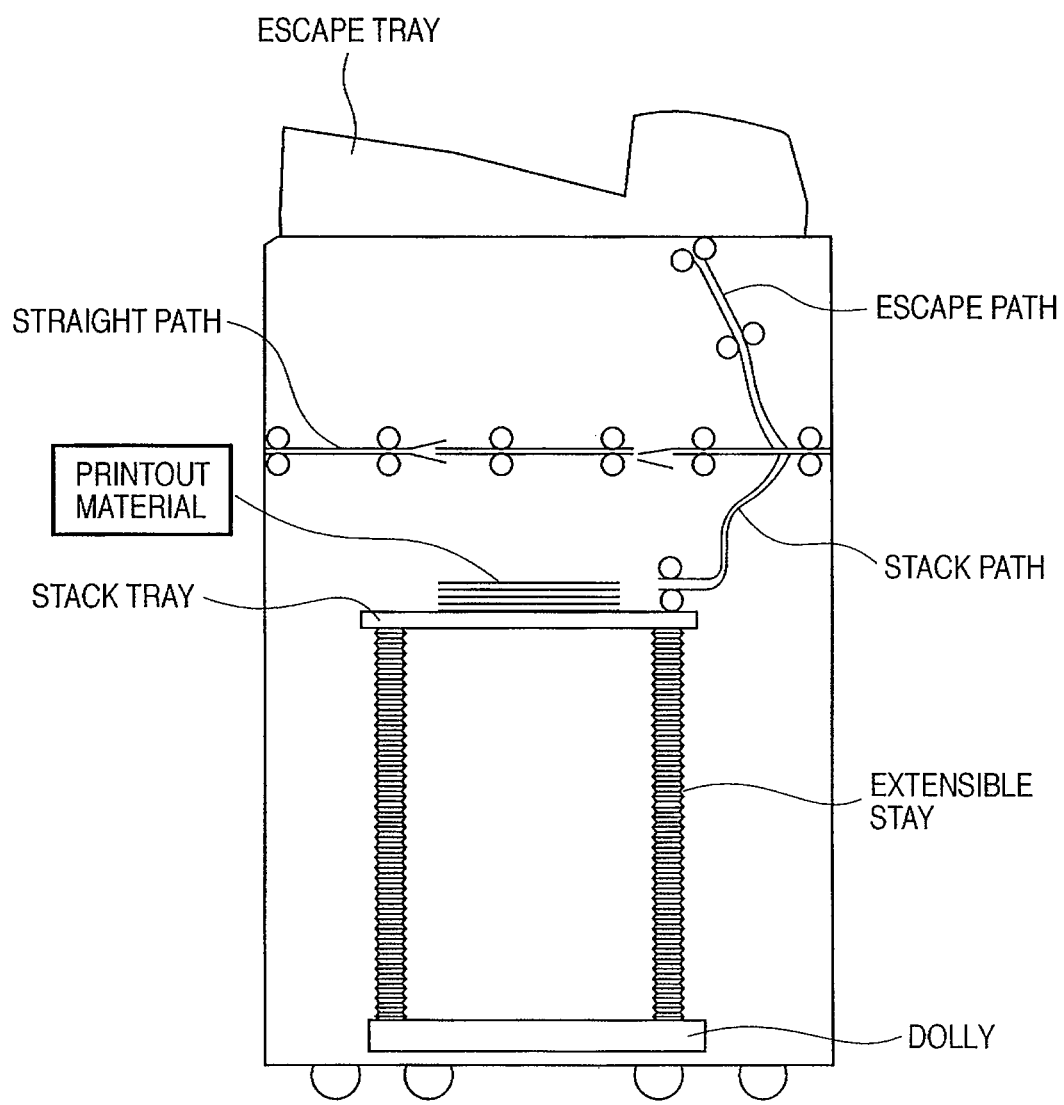
FIG. 11 is a sectional view for explaining an internal structure of an inline finisher to be controlled in the embodiment of the present invention.

FIG. 11 is a sectional view showing an internal structure of the large-volume stacker in FIGS. 8A to 10B to be controlled by the controller 205 in the embodiment.

In the large-volume stacker, the sheet feeding path extending from the printing apparatus 100 is roughly divided into three: a straight path, escape path, and stack path, as shown in FIG. 11. The large-volume stacker incorporates these three sheet feeding paths.

Figure 12:
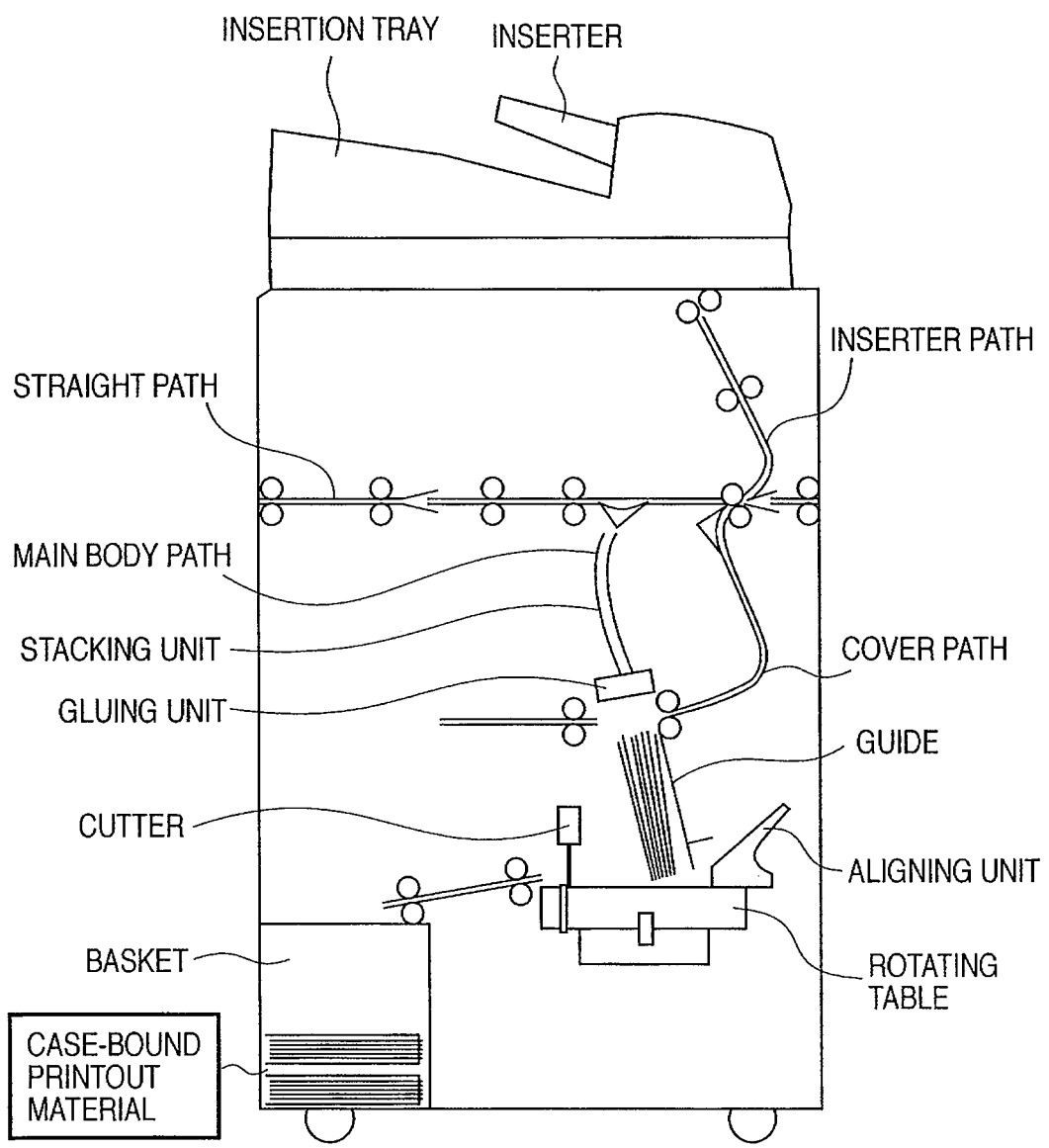
FIG. 12 is a sectional view for explaining an internal structure of an inline finisher to be controlled in the embodiment of the present invention.

The straight path of the large-volume stacker in FIG. 11 and that of the glue binding apparatus in FIG. 12 function to transfer sheets received from a preceding apparatus to a succeeding apparatus, and are also called through paths in inline sheet processing apparatuses in this example.

The straight path in the large-volume stacker is a sheet feeding path for transferring, to a succeeding apparatus, sheets of a job requiring no sheet stacking by the stacking unit of the printing apparatus 100. In other words, the straight path is a unit for conveying sheets of a job requiring no sheet processing by the sheet processing apparatus from an upstream apparatus to a downstream apparatus.

The escape path in the large-volume stacker is used to output sheets without stacking them. For example, when no succeeding sheet processing apparatus is connected, a printed material is conveyed to the escape path and taken out from the stack tray so as to quickly take out the printed material from the stack tray for the purpose of output confirmation work (proof print) or the like.

The sheet feeding path in the large-volume stacker has a plurality of sheet sensors necessary to detect the sheet conveyance status and jam.

The CPU of the large-volume stacker notifies the controller 205 of sheet detection information from each sensor via a signal line (signal line shown in FIG. 2 for electrically connecting the sheet processing apparatus 200 and controller 205) for communicating data with the controller 205. Based on the information from the large-volume stacker, the controller 205 grasps the sheet conveyance status and jam in the large-volume stacker. When the printing system is configured by cascade-connecting another sheet processing apparatus between the large-volume stacker and the printing apparatus 100, the CPU of the large-volume stacker notifies the controller 205 via the CPU of the cascade-connected sheet processing apparatus of sensor information of the large-volume stacker. As described above, the large-volume stacker comprises an arrangement unique to an inline finisher.

The stack path in the large-volume stacker is a sheet feeding path for causing the large-volume stacker to stack sheets of a job requiring sheet stacking by the stacking unit of the stacker.

Assume that the printing system 1000 comprises the large-volume stacker shown in FIGS. 8A to 10B. In this system configuration status, assume that the controller 205 accepts a request from a user via the UI unit by a key operation to the key 709 in the display of FIG. 7 to execute sheet stacking executable by the stacker for a target job. In this case, the controller 205 controls to convey sheets to the stack path of the large-volume stacker. The sheets conveyed to the stack path are delivered to the stack tray.

The stack tray in FIG. 11 is a stacking unit mounted on an extensible stay. A shock absorber or the like is attached to the joint between the stay and the stack tray. The controller 205 controls the large-volume stacker to stack printed sheets of a target job on the stack tray. A dolly supports the extensible stay from below it. When attaching a handle (not shown) to the dolly, the dolly can carry stacked outputs on it to another offline finisher.

When the front door of the stacker unit is kept closed, the extensible stay moves up to a position where outputs are easily stacked. If the operator opens the front door (or issues an opening instruction), the stack tray moves down.

Outputs can be stacked by flat stacking or shift stacking. Flat stacking means always stacking sheets at the same position. Shift stacking means stacking sheets with a shift toward far and near sides every number of copies or jobs so as to divide outputs and easily handle them.

The large-volume stacker permitted to be used as an inline type sheet processing apparatus in the printing system 1000 can execute a plurality of stacking methods when stacking sheets from the printer unit 203. The controller 205 controls various operations for the stacker.

[Internal Structure of Glue Binding Apparatus]

FIG. 12 is a sectional view showing an internal structure of the glue binding apparatus in FIGS. 8A to 10B to be controlled by the controller 205 in the embodiment.

In the glue binding apparatus, the sheet feeding path extending from the printing apparatus 100 is roughly divided into three: a straight path, main body path, and cover path, as shown in FIG. 12. The glue binding apparatus incorporates these three sheet feeding paths.

The straight path (through path) in the glue binding apparatus in FIG. 12 is a sheet feeding path functioning to transfer, to a succeeding apparatus, sheets of a job requiring no sheet glue binding by the glue binding unit of the apparatus. In other words, the straight path is a unit for conveying sheets of a job requiring no sheet processing by the sheet processing apparatus from an upstream apparatus to a downstream apparatus.

The sheet feeding path in the glue binding apparatus has a plurality of sheet sensors necessary to detect the sheet conveyance status and jam.

The CPU (not shown) of the glue binding apparatus notifies the controller 205 of sheet detection information from each sensor via a signal line (signal line shown in FIG. 2 for electrically connecting the sheet processing apparatus 200 and controller 205) for communicating data with the controller 205. Based on the information from the glue binding apparatus, the controller 205 grasps the sheet conveyance status and jam in the glue binding apparatus. When the printing system 1000 is configured by cascade-connecting another sheet processing apparatus between the glue binding apparatus and the printing apparatus 100, the CPU of the glue binding apparatus notifies the controller 205 via the CPU of the cascade-connected sheet processing apparatus of sensor information of the glue binding apparatus. In this manner, the glue binding apparatus comprises an arrangement unique to an inline finisher.

The main body path and cover path in the glue binding apparatus in FIG. 12 are sheet feeding paths for creating a case-bound printed material.

For example, according to the embodiment, the printer unit 203 prints print data of a body by case binding printing. Printed sheets are used as the body of an output material corresponding to a case-bounded printed material of one bundle. In case binding, a sheet bundle of a body on which print data corresponding to the body (contents) is printed is called a "main body" in this example. Processing to wrap the main body with one cover sheet is executed in case binding. The controller 205 executes various sheet conveyance control operations to convey a cover sheet through the cover path, and convey sheets of the main body printed by the printer unit 203 to the main body path.

In this configuration, assume that the controller 205 accepts a request from a user via the UI unit by a key operation to the key 707 in the display of FIG. 7 to execute case binding executable by the glue binding apparatus for a target job. In this case, the controller 205 controls the apparatus as follows.

For example, the controller 205 controls to sequentially stack sheets printed by the printer unit 203 on the stacking unit via the main body path in FIG. 12. After stacking, on the stacking unit, sheets of all pages on which body data necessary for sheets of one bundle in a target job are printed, the controller 205 controls to convey a cover sheet necessary for the job via the cover path.

Case binding has a matter associated with one feature of the embodiment. In case binding as an example of glue binding, the number of sheets processible as one sheet bundle is much larger than the number of sheets processible as one sheet bundle by sheet processing different from glue binding. For example, case binding permits processing a maximum of 200 sheets as one sheet bundle of the body. To the contrary, stapling or the like permits processing a maximum of 20 print sheets as one sheet bundle, and saddle stitching permits processing a maximum of 15 print sheets. The permissible number of print sheets to be processed as one sheet bundle is greatly different between glue binding and other sheet processes.

In the embodiment, the controller 205 can control an inline type sheet processing apparatus to execute case binding as glue binding. Further, the embodiment can provide new finishing which is not requested in the office environment and is executable by an inline type sheet processing apparatus. In other words, this configuration is one mechanism assuming the POD environment, and is associated with control to be described later.

Case binding can target a pre-printed sheet which bears cover data and is conveyed from the inserter tray of the inserter of the glue binding apparatus, as shown in FIG. 12. Case binding can also target a sheet which bears a cover image printed by the printing apparatus 100. Either sheet is conveyed as a cover sheet to the cover path. Conveyance of the cover sheet temporarily stops below the stacking unit.

In parallel with this operation, the glue binding apparatus glues a main body of sheets which bear all the pages of the body and are stacked on the stacking unit. For example, the gluing unit applies a predetermined amount of glue to the lower portion of the main body. After the glue fully spreads, the pasted portion of the main body is attached to the center of the cover, covered, and joined. In joining, the main body is pushed down, and the covered main body slides onto a rotating table along a guide. The guide moves so that the covered main body falls onto the rotating table.

The aligning unit aligns the covered main body laid on the rotating table, and the cutter cuts an edge. The rotating table rotates through 90°, the aligning unit aligns the main body, and the cutter cuts the top edge. The rotating table rotates through 180°, the aligning unit aligns the main body, and the cutter cuts the tail edge.

After cutting, the aligning unit pushes the main body to an inner portion, putting the completed covered main body into a basket.

After the glue is satisfactorily dried in the basket, the operator can take out the completed case-bound bundle.

The glue binding apparatus comprises a gluing unit which executes glue binding for sheets of a target job for which the user issues a glue binding execution request together with a printing execution request via the UI unit.

As described above with reference to the configuration, glue binding executable by an inline type sheet processing apparatus in the embodiment requires many processing steps and many preparations, compared to other types of sheet processes. In other words, the configuration of glue binding is different from those of sheet processes such as stapling and saddle stitching often used in the office environment. The processing time taken to complete requested sheet processing is likely to be longer than those of other finishing processes. The embodiment pays attention to even this point.

The embodiment adopts a mechanism which applies not only to the office environment but also to a new printing environment such as the POD environment, pursues user friendliness and productivity, and aims to commercialize a printing system and product. For example, new functions such as the case binding function and large-volume stacking function which are not supported in the office environment are provided as constituent features available even in the POD environment. As illustrated in FIGS. 8A to 10B, system configurations capable of connecting a plurality of inline type sheet processing apparatuses are also mechanisms for achieving this purpose.

It should be noted that the embodiment not only provides the above-described new functions and system configurations, but also finds out and examines problems to be tackled, such as use cases and user needs assumed in the use of the functions and configurations. One feature is to provide constituent features which are solutions to the problems. According to the embodiment, when an office-equipment maker finds and enters a new market, market demands and the like are found out and examined in advance as problems to newly equipped functions and system configurations, and mechanisms are employed as configurations considering solutions to the problems. This is also one feature of the embodiment. As an example of the constituent features, the controller 205 executes various control examples in the embodiment.

[Internal Structure of Saddle Stitching Apparatus]

Figure 13:
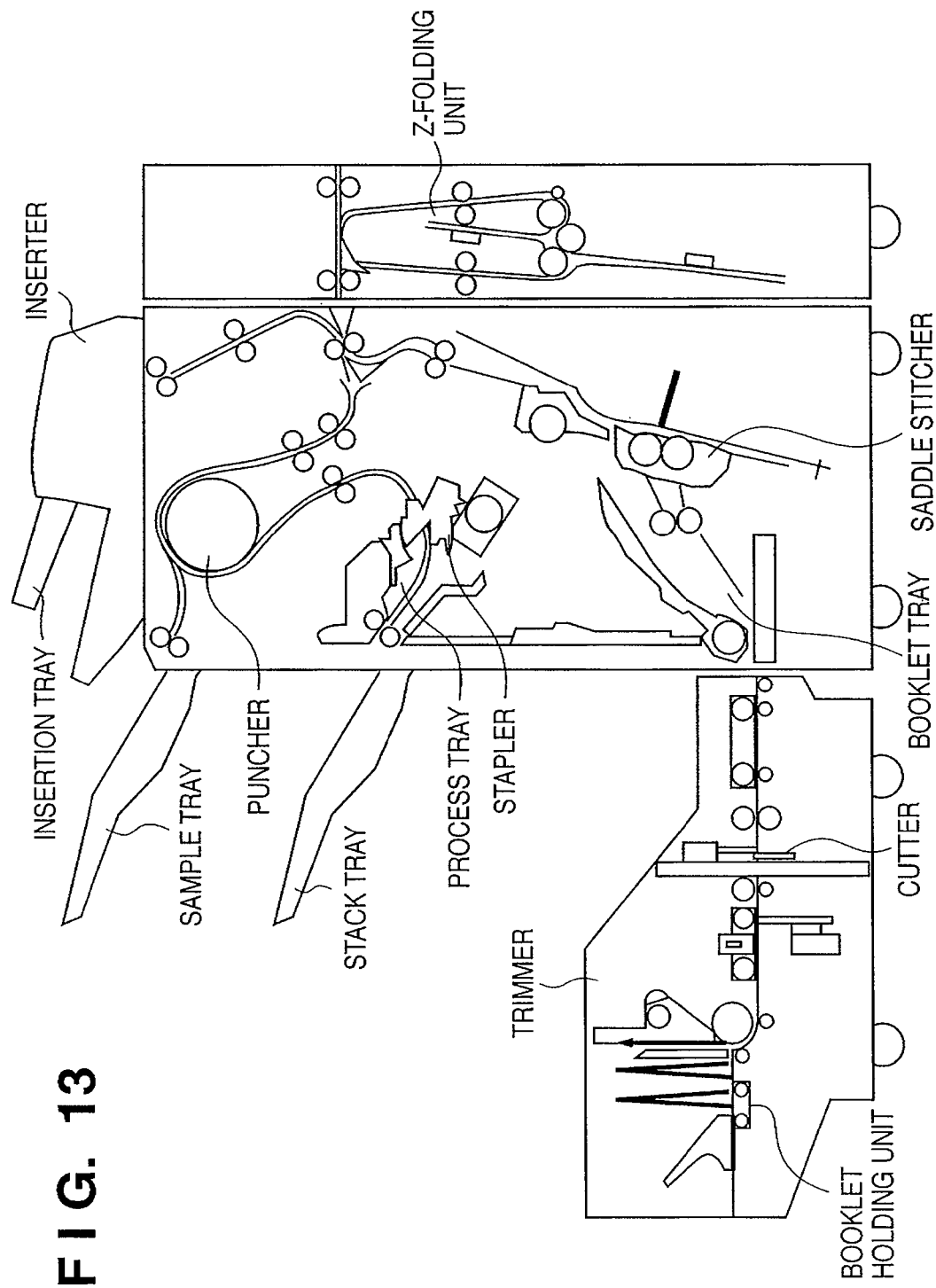
FIG. 13 is a sectional view for explaining an internal structure of an inline finisher to be controlled in the embodiment of the present invention.

FIG. 13 is a sectional view showing an internal structure of the saddle stitching apparatus in FIGS. 8A to 10B to be controlled by the controller 205 in the embodiment.

The saddle stitching apparatus incorporates various units for selectively executing stapling, cutting, punching, folding, shift delivery, and the like for sheets from the printing apparatus 100. As described in the restrictions, the saddle stitching apparatus does not have a through path serving as the function of conveying sheets to a succeeding apparatus.

The sheet feeding path in the saddle stitching apparatus has a plurality of sheet sensors necessary to detect the sheet conveyance status and jam.

The CPU (not shown) of the saddle stitching apparatus notifies the controller 205 of sheet detection information from each sensor via a signal line (signal line shown in FIG. 2 for electrically connecting the sheet processing apparatus 200 and controller 205) for communicating data with the controller 205. Based on the information from the saddle stitching apparatus, the controller 205 grasps the sheet conveyance status and jam in the saddle stitching apparatus. When the printing system is configured by cascade-connecting another sheet processing apparatus between the saddle stitching apparatus and the printing apparatus 100, the CPU of the saddle stitching apparatus notifies the controller 205 via the CPU of the cascade-connected sheet processing apparatus of sensor information of the saddle stitching apparatus. The saddle stitching apparatus comprises an arrangement unique to an inline finisher.

As shown in FIG. 13, the saddle stitching apparatus comprises a sample tray, stack tray, and booklet tray. The controller 205 controls to switch the unit for use in accordance with the job type and the number of discharged print sheets.

Assume that the controller 205 accepts a request from a user via the UI unit by a key operation to the key 701 in the display of FIG. 7 to execute stapling by the saddle stitching apparatus for a target job. In this case, the controller 205 controls to convey sheets from the printer unit 203 to the stack tray. Before discharging print sheets to the stack tray, they are sequentially stacked for each job on the process tray in the saddle stitcher, and bound by a stapler on the process tray. Then, the print sheet bundle is discharged onto the stack tray. According to this method, the controller 205 causes the saddle stitching apparatus to staple sheets printed by the printer unit 203.

The saddle stitching apparatus further comprises a Z-folding unit for folding a sheet in three (Z shape), and a puncher for forming two (or three) holes for filing. The saddle stitching apparatus executes each processing in accordance with each job type. For example, when the user makes a Z-folding setting via the operation unit as a setting associated with print sheet processing for a job to be output, the controller 205 causes the Z-folding unit to fold print sheets of the job. Then, the controller 205 controls to make the print sheets pass through the apparatus, and deliver them onto a discharge tray such as the stack tray or sample tray. For example, when the user makes a punching setting via the operation unit as a setting associated with print sheet processing for a job to be output, the controller 205 causes the puncher to punch print sheets of the job. Then, the controller 205 controls to make the print sheets pass through the apparatus, and deliver them onto a discharge tray such as the stack tray or sample tray.

The saddle stitcher performs saddle stitching to bind print sheets at two center portions, pinch the print sheets at their center by rollers, fold them in half, and create a booklet like a pamphlet.

Print sheets bound by the saddle stitcher are discharged onto the booklet tray. Whether the saddle stitcher can execute print sheet processing such as bookbinding is also based on print sheet processing settings made by the user for a job to be output, as described above.

The inserter sends print sheets set on the inserter tray to a discharge tray such as the stack tray or sample tray without supplying the print sheets to the printer. The inserter can insert a print sheet set on it between print sheets (sheets printed by the printer unit) supplied into the saddle stitcher. The user sets print sheets on the inserter tray of the inserter while the print sheets face up. The pickup roller sequentially feeds print sheets from the top. A print sheet from the inserter is directly conveyed to the stack tray or sample tray, and discharged while facing down. When supplying a print sheet to the saddle stitcher, the print sheet is fed to the puncher once, and then switched back and fed to adjust the face orientation.

Whether the inserter can execute print sheet processing such as print sheet insertion is also based on print sheet processing settings made by the user for a job to be output, as described above.

In the embodiment, the saddle stitching apparatus also incorporates, e.g., a cutter (trimmer), which will be described below.

A (saddle-stitched) booklet output from the saddle stitcher enters the trimmer. At this time, the booklet output is fed by a predetermined length by the roller, and cut by a predetermined length by the cutter, aligning uneven edges between pages of the booklet. The resultant booklet is put in a booklet holding unit. Whether the trimmer can execute print sheet processing such as cutting is also based on print sheet processing settings made by the user for a job to be output, as described above.

As described above, the saddle stitching apparatus comprises a saddle stitcher which executes saddle stitching for sheets of a target job for which the user issues a saddle stitching execution request together with a printing execution request via the UI unit.

Figure 14:
FIG. 14 is a view for explaining an example of display control on the UI unit to be controlled in the embodiment of the present invention.

For example, when the user selects saddle stitching with the key 705 in the display of FIG. 7, the controller 205 causes the UI unit to execute a display in FIG. 14. The controller 205 controls to accept detailed settings of saddle stitching from the user via the display in FIG. 14. For example, the controller 205 allows the user to determine whether to actually saddle-stitch sheets near their center with staples. The controller 205 can also accept a setting such as division bookbinding, change of the saddle stitching position, execution/non-execution of cutting, or change of the cutting width from the user.

Assume that the user sets "saddle-stitch" and "cut" via the display in FIG. 14 executed by the UI unit under the control of the controller 205. In this case, the controller 205 controls the operation of the printing system 1000 to process a target job into a print style as shown in FIG. 15 as a result of saddle stitching printing. Then, saddle stitches are put, and the edge is cut, as represented by the result of saddle stitching printing in FIG. 15. By setting the positions of the saddle stitches and cutting edge in advance, they can be changed to desired positions.

Figure 16:
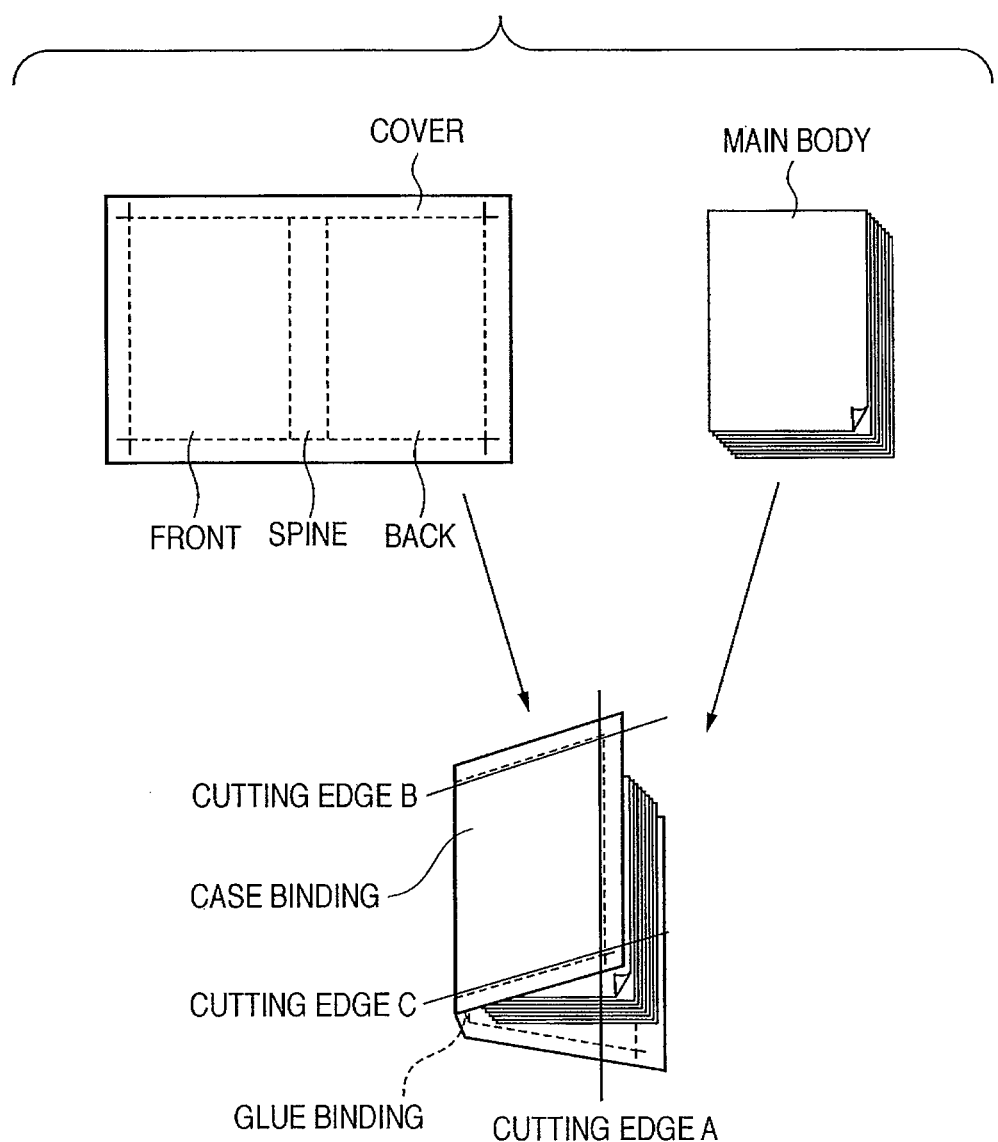
FIG. 16 is a view for explaining a control example when creating a printed material by the printing system 1000 to be controlled in the embodiment of the present invention.

When the user requests execution of case binding with the key 707 in the display of FIG. 7, the controller 205 controls the printing system 1000 to process a target job into a print style as shown in FIG. 16 as a result of case binding printing. The cutting widths of cutting edges A, B, and C of a printed material to be case-bound can be set as shown in the example of FIG. 16.

The printing system 1000 can accept a printing execution request and sheet processing execution request for a target job even from an information processing apparatus serving as an example of an external apparatus. An example when a host computer uses the printing system 1000 will be described.

For example, the printing system 1000 is controlled as follows when operated by a host computer (e.g., the PC 103 or 104 in FIG. 1) which downloads program data for various processes and control examples in the embodiment from a data supply source (e.g., a WEB) or a specific storage medium. Note that the control unit of the PC executes the main control.

Figure 17A:
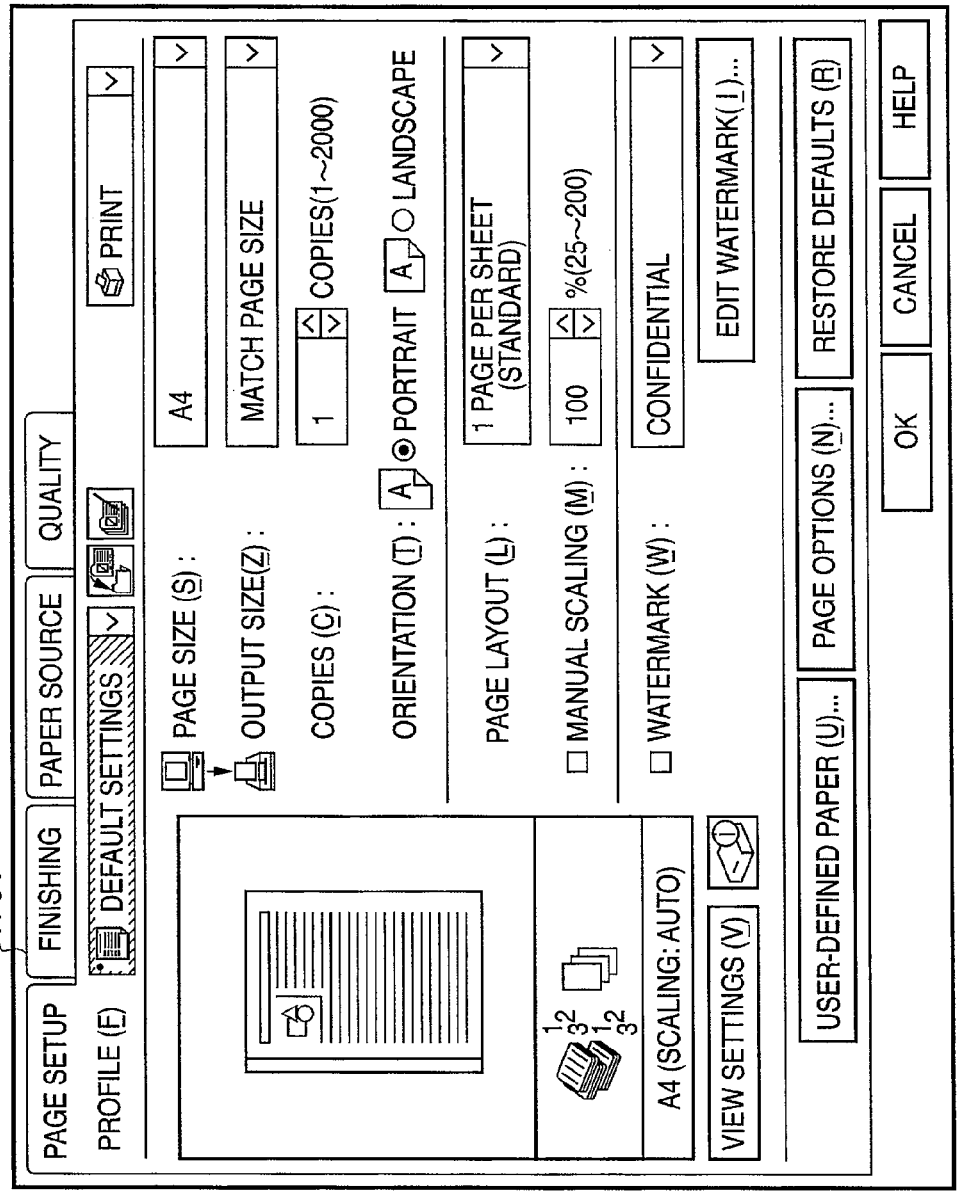
FIG. 17A is a view for explaining an example of display control on the UI unit to be controlled in the embodiment of the present invention.
Figure 17B:
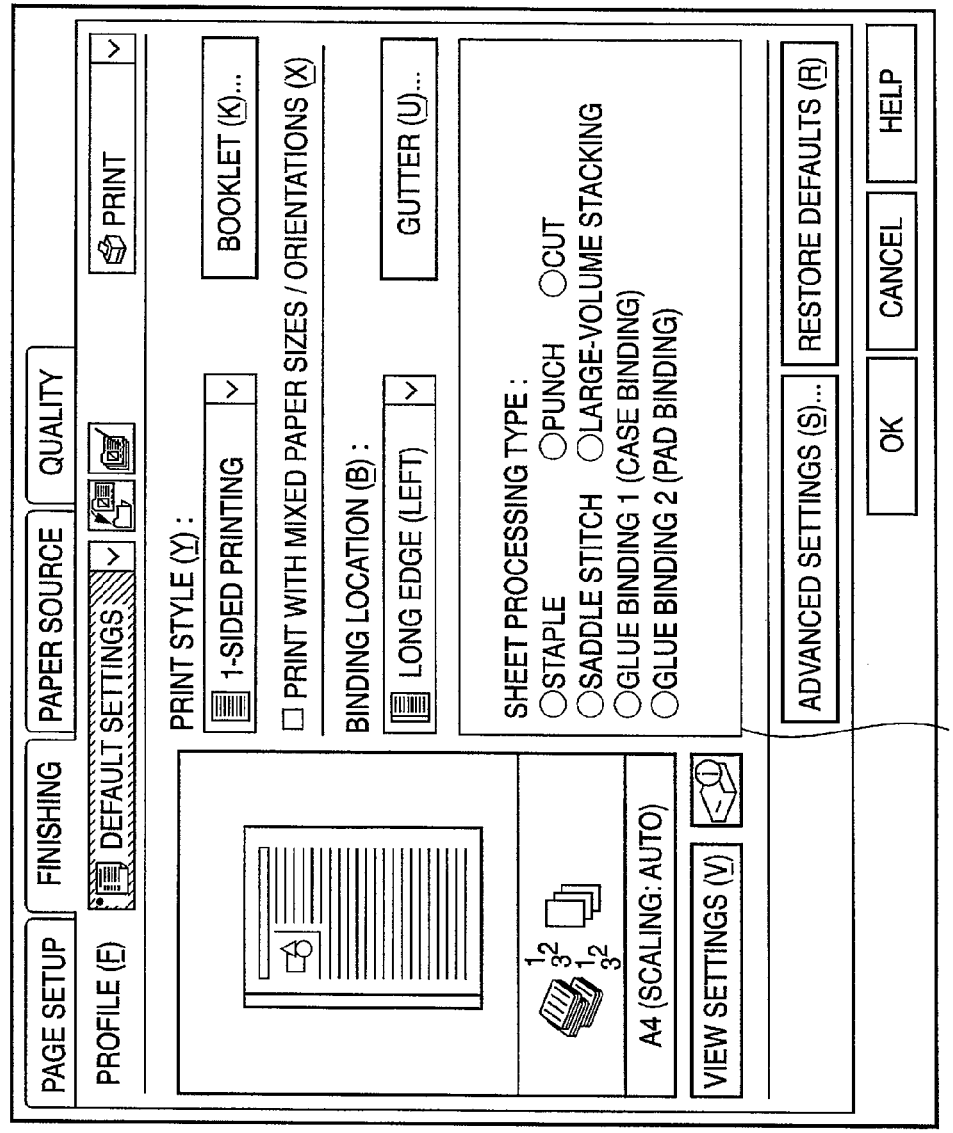
FIG. 17B is a view for explaining an example of display control on the UI unit to be controlled in the embodiment of the present invention.

Assume that an instruction to activate a printer driver for operating the printing apparatus 100 of the printing system 1000 is input in response to a mouse or keyboard operation by a user. In response to the instruction, the CPU of the host computer displays a print setup window shown in FIG. 17A on the display unit of the host computer. FIGS. 17A and 17B are views showing examples of user interface windows controlled in the embodiment.

For example, the user presses a finishing key 1701 with the mouse on the operation window of FIG. 17A or 17B. Then, the CPU of the host computer controls the touch panel to switch the print setup window to one as shown in FIG. 17B.

The CPU of the host computer allows the user to select the type of sheet processing to be executed by the inline type sheet processing apparatus 200 via a sheet processing setting item such as the finishing key 1701 on the window of FIG. 17A or 17B.

Although not shown, the external apparatus including the host computer displays, as windows other than those in FIGS. 17A and 17B, display windows for inputting instructions equivalent to those inputtable via various display windows described in detail in the embodiment. In other words, the external apparatus can execute the same processes and control examples as those described in the embodiment.

Assume that the user selects desired sheet processing via the setting item, returns to the window in FIG. 17A or 17B, and presses the OK key.

In response to this, the CPU of the host computer associates, as one job, commands representing various printing conditions set by the user via the print setup window with a series of data to be printed by the printer unit 203. Then, the host computer transmits the job to the printing system 1000 via the network 101.

After the external I/F 202 of the printing system 1000 receives the job from the host computer, the controller 205 controls the printing system 1000 to process the job on the basis of processing requirements set by the user on the host computer.

The above-described configuration can provide various effects described in the embodiment even for a job from an external apparatus or the like, and can further increase the use efficiency of the printing system 1000.

The control unit of the printing system 1000 according to the embodiment executes various control examples to be described below on the premise of the above-described constituent features.

The configurations described with reference to FIGS. 1 to 17B correspond to constituent features common to all embodiments. For example, various control examples described in the embodiments correspond to constituent features based on these configurations.

As described with reference to FIGS. 1 to 17B, the printing system 1000 according to the embodiment is configured to be able to create a printing environment suitable not only for the office environment but also for the POD environment.

For example, the printing system 1000 employs a mechanism capable of coping with use cases and user needs which are assumed not in the office environment but in the POD environment.

The printing system 1000 is configured to, e.g., allow a POD company to receive orders of various print forms from customers in the POD environment.

More specifically, an inline sheet processing apparatus can execute finishing (e.g., glue binding or large-volume stacking) which is not requested as a user need in the office environment. In other words, the embodiment can deal with even user needs in consideration of the POD environment, in addition to needs (e.g., for stapling) in the office environment. For example, the printing system 1000 can flexibly cope with the business form of a POD company which does business in the POD environment where the printing system 1000 is delivered.

For example, a plurality of inline sheet processing apparatuses are connectable to the printing apparatus 100, and each inline sheet processing apparatus can independently operate as an independent housing, as described above. The number of connected sheet processing apparatuses is arbitrary, and an inline sheet processing apparatus can be flexibly added or changed in the printing system 1000.

The embodiment adopts a design which fully considers the operability of the user of the printing system 1000. For example, the embodiment allows the operator to manually register the system configuration of the printing system 1000 in the HDD 209. This configuration will be exemplified.

Assume that a POD company wants to build the system configuration shown in FIGS. 8A and 8B for the printing system 1000. In this case, the operator of the POD company connects three sheet processing apparatuses in FIGS. 8A and 8B purchased together with the printing apparatus 100 to the printing apparatus in the connection order shown in FIGS. 8A and 8B. Then, the operator presses the user mode key 505 of the operation unit 204. In response to this key operation, the controller 205 causes the touch panel 401 to execute a display in FIG. 18A.

Figure 18A:
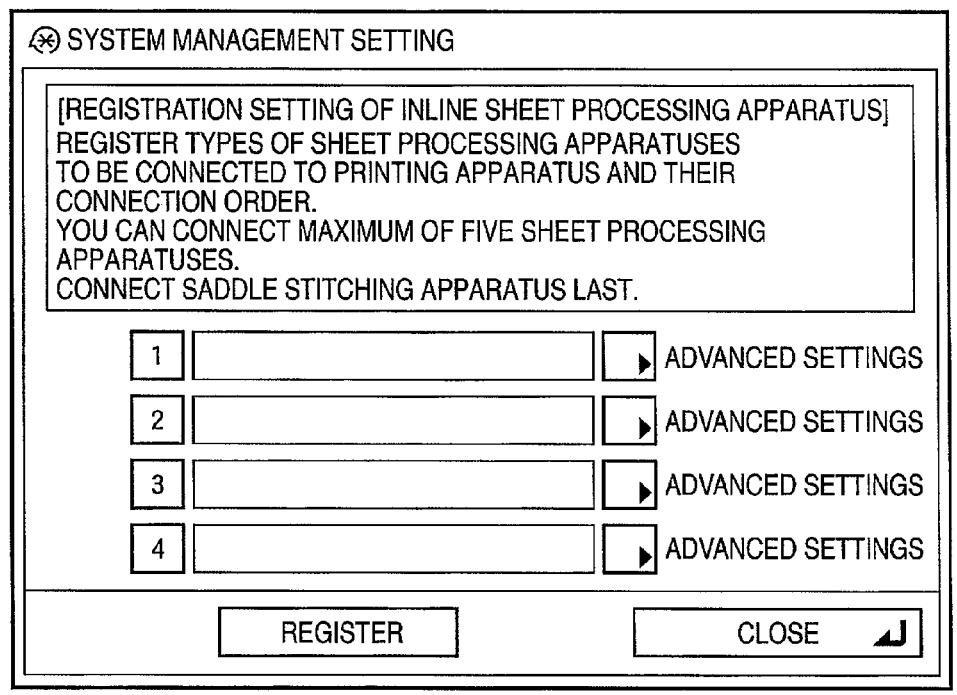
FIG. 18A is a view for explaining an example of display control on the UI unit to be controlled in the embodiment of the present invention.

The display in FIG. 18A allows the operator to manually input system configuration information of the printing system 1000. The controller 205 allows the operator via displays in FIGS. 18A and 18B to determine the types of inline type sheet processing apparatuses to be connected to the printing apparatus 100. In addition, the controller 205 allows the operator via the displays in FIGS. 18A to 18D to determine the connection order of inline type sheet processing apparatuses to be connected to the printing apparatus 100.

If the operator presses an "advanced settings" key provided for each setting item in the display of FIG. 18A, the controller 205 displays a window (not shown). This window enables specifying sheet processing apparatuses used in the printing system one by one. In the embodiment, since the printing system follows the restrictions, as described above, the controller 205 also notifies the operator of this information as guidance information. For example, the controller 205 notifies the operator of a guidance "register the types of sheet processing apparatuses to be connected to the printing apparatus and their connection order. You can connect a maximum of five sheet processing apparatuses. Connect a saddle stitching apparatus last." In this case, the maximum number of connected inline sheet processing apparatuses is five, but is not limited to this.

The controller 205 controls the touch panel 401 so that the operator can determine sheet processing apparatuses for use one by one from the top setting item in FIG. 18A. The controller 205 determines that the setting order itself from the top setting item is an actual apparatus connection order.

Figure 18B:
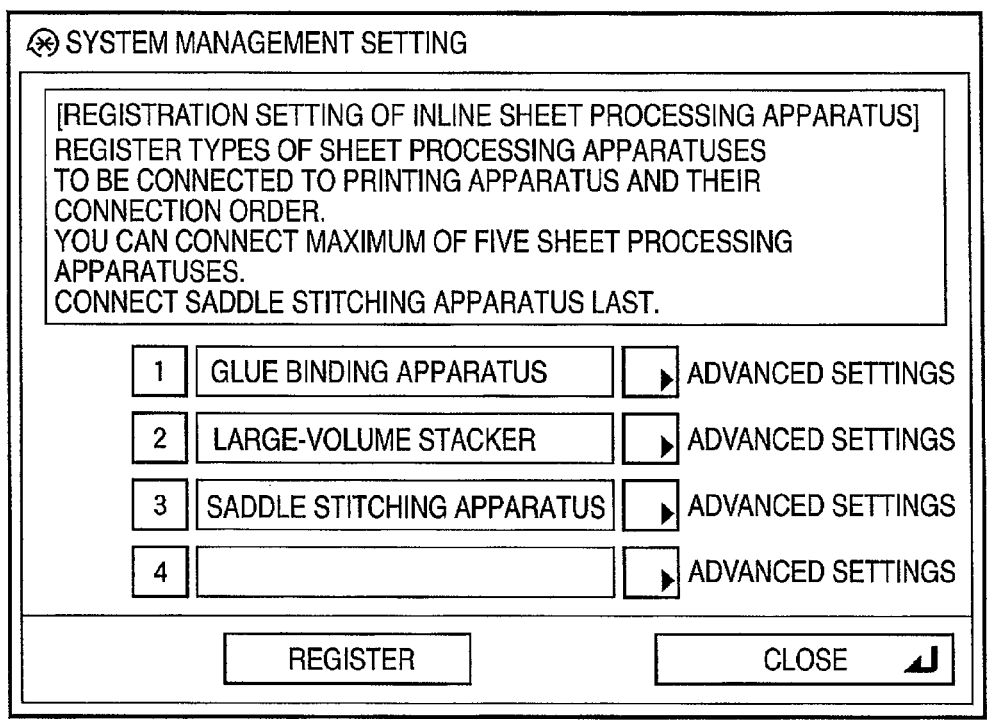
FIG. 18B is a view for explaining an example of display control on the UI unit to be controlled in the embodiment of the present invention.

In this configuration, when the printing system 1000 has the system configuration shown in FIGS. 8A and 8B, the controller 205 prompts the operator to register the types of sheet processing apparatuses and their connection order, like the display in FIG. 18B. More specifically, the controller 205 prompts the operator to set "glue binding apparatus ⇒ large-volume stacker ⇒ saddle stitching apparatus" sequentially from the top setting item, like the display in FIG. 18B. The controller 205 determines that this setting order is an actual connection order, as shown in FIGS. 8A and 8B.

When the printing system 1000 has the system configuration shown in FIGS. 9A and 9B, the controller 205 prompts the operator to register the types of sheet processing apparatuses and their connection order. More specifically, the controller 205 prompts the operator to set "glue binding apparatus ⇒ large-volume stacker ⇒ saddle stitching apparatus" sequentially from the top setting item. The controller 205 determines that this setting order is an actual connection order, as shown in FIGS. 9A and 9B.

When the printing system 1000 has the system configuration shown in FIGS. 10A and 10B, the controller 205 prompts the operator to register the types of sheet processing apparatuses and their connection order. More specifically, the controller 205 prompts the operator to set "large-volume stacker ⇒ saddle stitching apparatus" sequentially from the top setting item. The controller 205 determines that this setting order is an actual connection order, as shown in FIGS. 10A and 10B.

In a system configuration of the printing system 1000 of the embodiment illustrated in FIG. 19, a total of three inline finishers, i.e., two large-volume stackers and one saddle stitching apparatus illustrated in FIG. 11 are connected. In this system configuration, two large-volume stackers are connected as inline finishers of the same type. In this way, the printing system of the embodiment is configured to be able to connect inline finishers of the same type. A configuration in which inline finishers of the same type are cascade-connected as illustrated in FIG. 19 will be called tandem connection. The system configuration illustrated in FIG. 19 assumes a situation in which a printing company, to which this system is delivered, frequently executes large-volume stacking. In the embodiment, a plurality of large-volume stackers can be tandem-connected.

The UI control to improve user friendliness assuming use cases on site is also one feature of the embodiment.

As described with reference to FIGS. 1 to 19, the printing system 1000 comprises various mechanisms toward practical use of a product capable of flexibly coping with various use cases and user needs in the POD environment and the like that are different from use cases and user needs in the office environment.

In addition to providing new functions and new configurations as described above, the printing system 1000 can execute various control examples as follows in order to maximize the effects of the printing system 1000.

For example, the control unit of the printing system causes the printing system 1000 to execute the following control.

Before a description of concrete control, the configuration of the printing system 1000 will be complemented.

A variety of inline finishers such as the large-volume stacker in the embodiment each have an openable/closable door (front door) on the front surface of the housing. The front door allows an operator to remove a jammed sheet from each finisher or take out the printed materials (also called print media) of a job printed by the printer unit 203.

For example, the large-volume stacker in the embodiment comprises a stack tray (also simply called a stacker unit) inside the stacker that can stack many printed materials, as illustrated in the internal structure of FIG. 11. The large-volume stacker also comprises an escape tray (also called a sample tray) outside the stacker (at the top of the stacker). The controller 205 controls to selectively supply the printed materials of a target job to the stack tray inside the large-volume stacker and the escape tray outside it on the basis of various criteria in the embodiment. Each inline finisher such as the large-volume stacker except for the saddle stitching apparatus also has a function of conveying a printed material received from a preceding apparatus into a succeeding inline finisher via the internal through path of the inline finisher. The large-volume stacker in the embodiment is configured such that the stack tray can automatically move down in accordance with the sheet stacking amount of printed materials on the internal stack tray. The large-volume stacker is also configured to be able to align printed materials.

Figure 20:
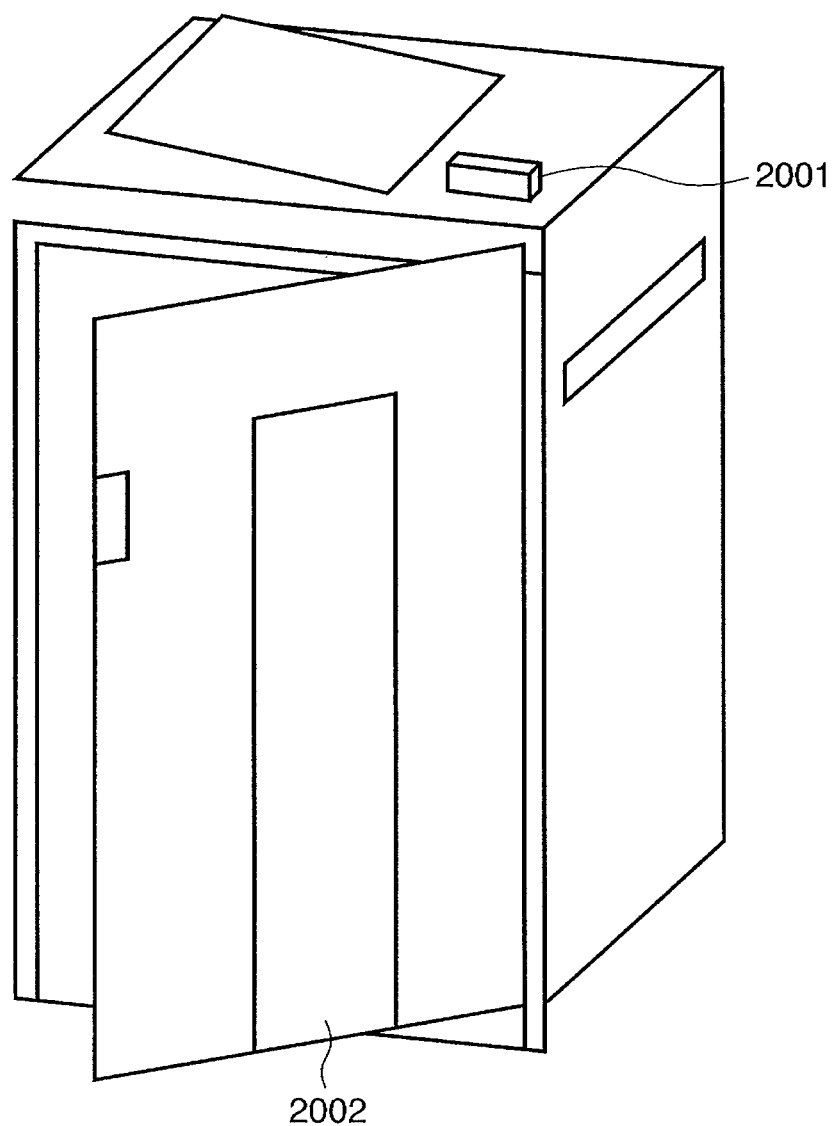
FIG. 20 is a perspective view for explaining control associated with a large-volume stacker in the embodiment.

This structure is as described with reference to FIG. 11. The large-volume stacker has, on its front surface, a front door 2002 which can be opened and closed by an operator, as represented by an outer appearance of the large-volume stacker in FIG. 20. The large-volume stacker also has, at the top of the housing, a switch 2001 for allowing an operator to input an instruction to open the front door 2002. The control unit (not shown) of the large-volume stacker mainly controls various operations in the large-volume stacker. The control unit opens the front door 2002 in accordance with an instruction manually input by the operator via the switch 2001. More specifically, the front door 2002 is locked with a key (not shown) when closed. The operator unlocks the key to open the front door 2002, and can take out printed materials stacked on the stack tray of the large-volume stacker. It is also controlled to automatically open the front door 2002 in accordance with not only an operation via the switch 2001 but also an instruction from the controller 205 of the printing apparatus 100. At this time, the controller 205 transmits a door open signal to the control unit of the large-volume stacker via a signal line inside the printing apparatus 100 shown in FIG. 2. The operator opens the front door 2002 to take out printed materials stacked on the stack tray of the large-volume stacker. The controller 205 of the printing apparatus 100 may also execute these control operations.

In this case, when the operator is to take out the printed materials of a target job from the large-volume stacker, the controller 205 mainly controls the printing system 1000 not to deliver, to the stack tray of the large-volume stacker, the sheets of a subsequent job whose printing execution request is issued after the target job.

In other words, the printing system 1000 controls the sheet processor in the sheet processing apparatus not to deliver the sheets of a subsequent job while the operator takes out the printed materials of a printed job from the sheet processing apparatus.

However, the controller 205 controls to execute, e.g., the following exemplary operations even while the operator takes out printed materials from the stack tray of the large-volume stacker.

For example, the controller 205 controls the printing system 1000 to deliver the printed materials of a subsequent job to the escape tray of the large-volume stacker while, for example, the operator takes out printed materials stacked on the stacker tray and the front door 2002 of the large-volume stacker is open.

Also, while the front door 2002 of the large-volume stacker is open, the printed materials of a subsequent job requiring no stacking by the large-volume stacker and requiring finishing by a succeeding inline finisher may be discharged. In this case, the controller 205 controls the printing system 1000 to be able to convey the printed materials of the subsequent job via the through path of the large-volume stacker.

In this way, the controller 205 permits execution of these exemplary operations in the printing system 1000 even while the front door 2002 is kept open.

To execute these operations, the controller 205 inhibits or permits the start of the printing operation of a subsequent job whose printing execution request is issued after a job whose sheets are taken out by the operator from the sheet processing apparatus. In other words, the controller 205 controls whether to permit/inhibit execution of the printing operation of a subsequent job, and the printing timing of the job.

This configuration is also unique to an inline finisher physically and electrically connected to the printing apparatus.

On the premise of this configuration, the controller 205 serving as an example of the control unit of the printing system 1000 executes the following exemplary control.

Prerequisite constituent features will be complemented before a description of the following exemplary control.

As a premise, the printing system 1000 comprises the printing system 1000 having the printer unit 203 capable of printing data in the HDD 209 capable of storing data of jobs. The printing system 1000 comprises a plurality of sheet processing apparatuses 200a to 200n. The sheet processing apparatuses 200a to 200n can be connected to the printing apparatus 100, and can execute sheet processing (also called finishing or post-processing) for sheets (also called printed materials or print media) of a job printed by the printer unit 203. Each sheet processing apparatus allows an operator to take out a printed material having undergone sheet processing by it. The printing system 1000 can selectively supply sheets of a job printed by the printer unit 203 from the printer unit 203 of the printing apparatus 100 to these sheet processing apparatuses.

The controller 205 serving as an example of the control unit of the embodiment executes the following exemplary control in the printing system 1000 having the system configuration which aims at the POD market.

Figure 21:
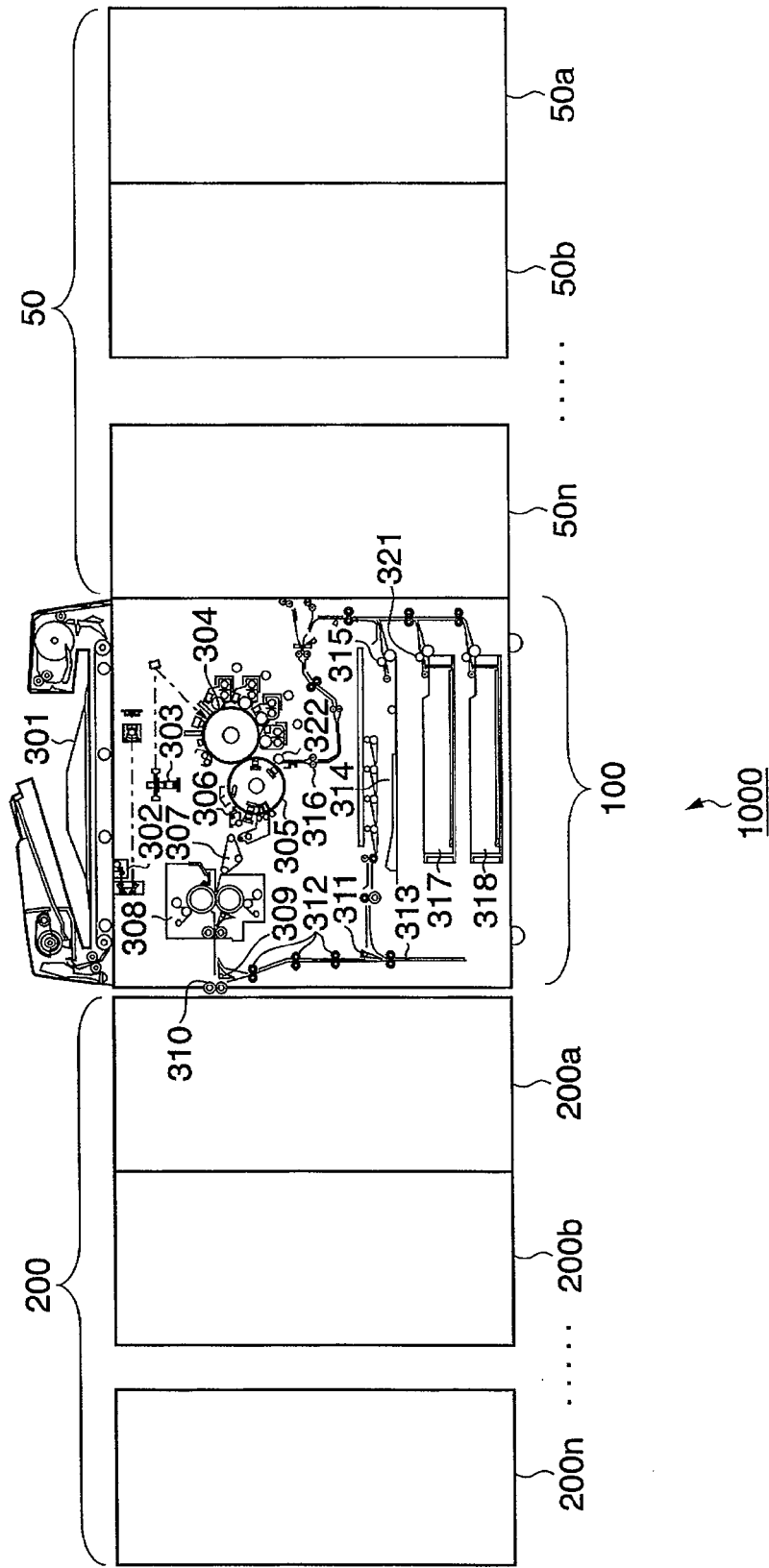
FIG. 21 is a view showing still another system configuration of the printing system 1000 to be controlled in the embodiment of the present invention.

In the printing system 1000, a plurality of sheet feeding apparatuses can be cascade-connected to the printing apparatus 100. An arbitrary number of sheet feeding apparatuses connectable to the printing apparatus 100 can be installed in accordance with the use environment in order to enhance the effects of the embodiment. In FIG. 21, a large-volume feeding apparatus 50 is made up of N sheet feeding apparatuses. The sheet feeding apparatuses are defined as sheet feeding apparatuses 50a, 50b, . . . sequentially from the first sheet feeding apparatus, and the Nth sheet feeding apparatus is defined as a sheet feeding apparatus 50n. For descriptive convenience, the sheet feeding apparatuses 50a to 50n have a shape as shown in FIG. 21, but have an actual appearance to be described later.

Figure 22:
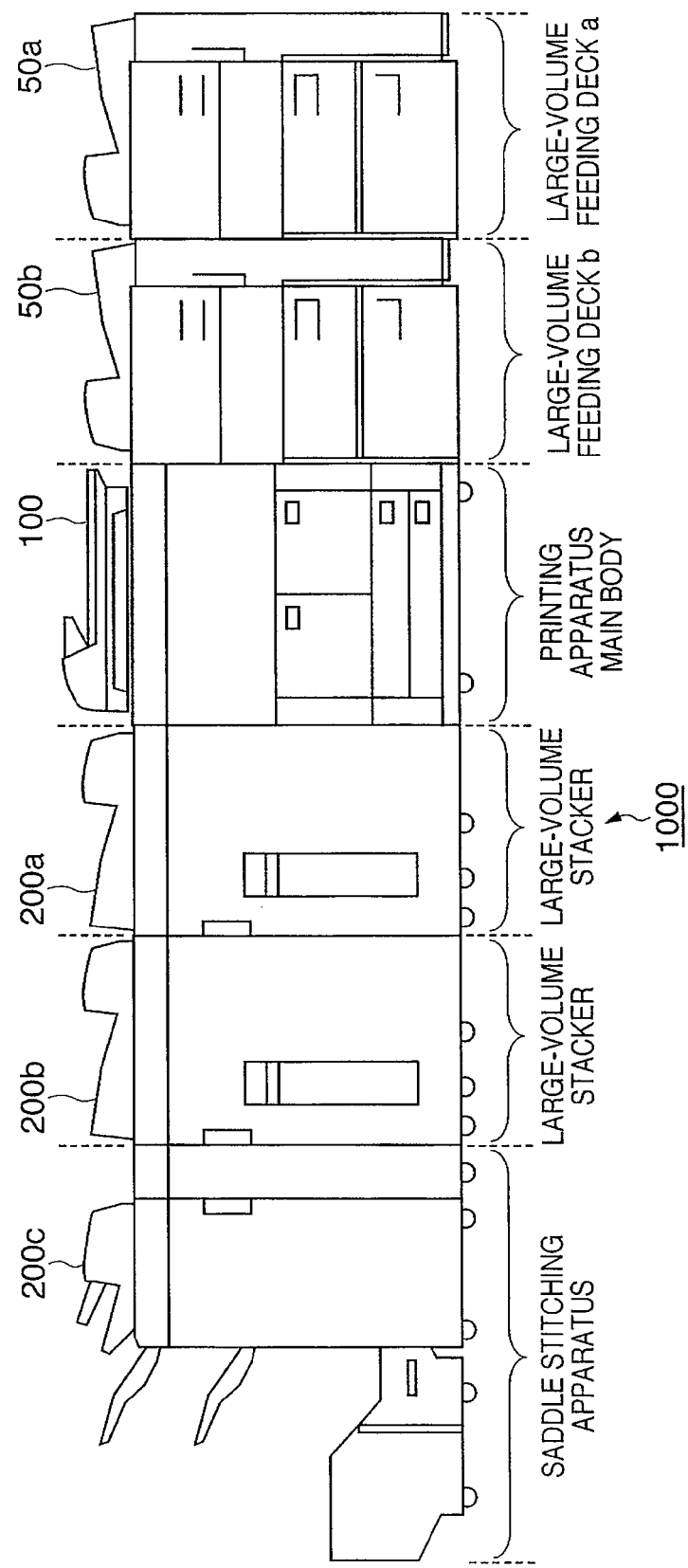
FIG. 22 is a view showing this system configuration of the printing system 1000 to be controlled in the embodiment of the present invention.

The system configuration of FIG. 22 is different from that of FIG. 10A in the number of connected sheet feeding apparatuses in the printing system 1000. More specifically, the printing system 1000 is built by connecting large-volume feeding deck a→large-volume feeding deck b to the printing apparatus 100 in the order named. The internal system configuration in this case is as shown in FIG. 23.

Figure 23:
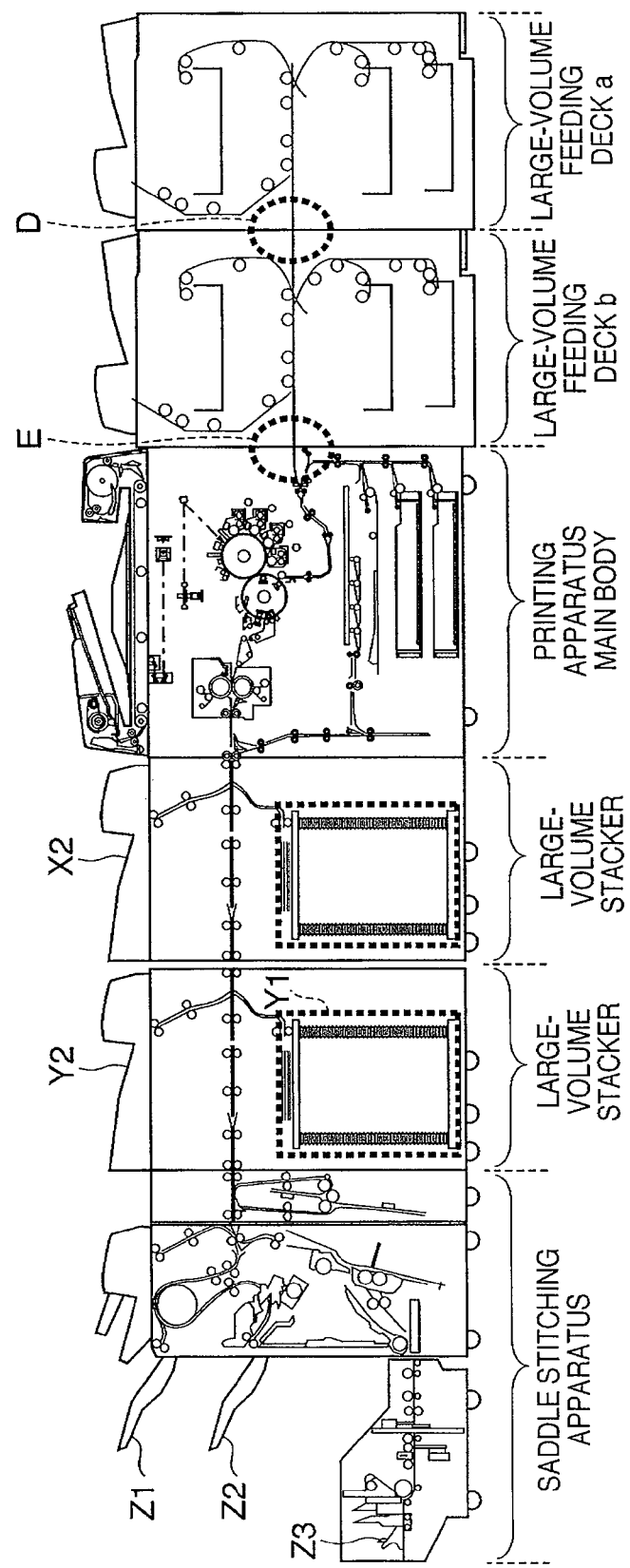
FIG. 23 is a sectional view showing an internal structure of this system configuration of the printing system 1000 to be controlled in the embodiment of the present invention.

FIG. 23 is a sectional view of the apparatuses of the whole printing system 1000 when the printing system 1000 has the system configuration in FIG. 21. The system configuration in FIG. 22 corresponds to the internal system configuration in FIG. 23.

The internal system configuration in FIG. 23 allows supplying a sheet to each sheet feeding apparatus in order to supply it to the printer unit 203 of the printing apparatus 100. More specifically, this internal system configuration has a sheet feeding path capable of conveying a sheet to the printer unit 203 via points D and E, as shown in FIG. 23.

[Internal Structure of Large-Volume Feeding Deck]

Figure 24:
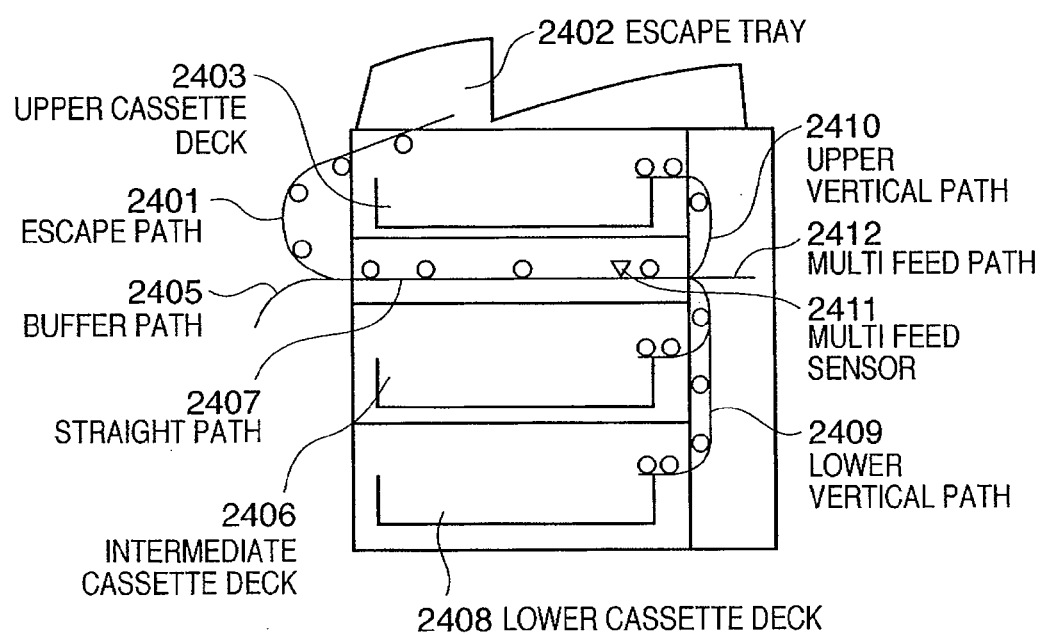
FIG. 24 is a sectional view for explaining an internal structure of a large-volume feeding deck to be controlled in the embodiment of the present invention.

FIG. 24 is a sectional view showing an internal structure of the large-volume feeding deck in FIGS. 22 and 23 to be controlled by the controller 205 in the embodiment.

In the large-volume feeding deck, the sheet feeding paths are roughly classified into five: for example, a buffer path 2405 serving as a feeding path extending to the printing apparatus 100, an escape path 2401, an upper vertical path 2410, a lower vertical path 2409, and a multi feed path 2412. The large-volume feeding deck incorporates these five sheet feeding paths.

The multi feed path 2412 in the large-volume feeding deck of FIG. 24 is a feeding path for receiving sheets from a preceding apparatus.

The upper vertical path 2410 in the large-volume feeding deck is a feeding path for conveying sheets fed from an upper cassette deck 2403. The lower vertical path is a feeding path for conveying sheets fed from an intermediate cassette deck 2406 and lower cassette deck 2408.

A straight path 2407 in the large-volume feeding deck is a sheet feeding path for transferring sheets received from the upper vertical path 2410 and lower vertical path 2409 to a succeeding apparatus. The straight path 2407 is also a unit for conveying, from an upstream apparatus to a downstream apparatus via the multi feed path, a sheet fed from an apparatus other than the sheet processing apparatus.

The escape path 2401 in the large-volume feeding deck is used to output a sheet without conveying it to an upstream apparatus. For example, when a jam occurs in a succeeding sheet processing apparatus or a multi feed sensor 2411 detects multi feed, a sheet is conveyed to the escape path 2401 and discharged from an escape tray 2402.

The sheet feeding path in the large-volume feeding deck has a plurality of sheet sensors necessary to detect the sheet conveyance status, multi feed, and jam.

"Multi feed" in the embodiment means conveying two or more print media (also called sheets) to be processed by the printing system 1000 through the sheet feeding path in the printing system 1000 while the print media at least partially overlap each other.

The CPU in the large-volume feeding deck notifies the controller 205 of sheet detection information from each sensor via a signal line (signal line shown in FIG. 2 for electrically connecting the large-volume feeding apparatus 50 and controller 205) for communicating data with the controller 205. Based on the information from the large-volume feeding deck, the controller 205 grasps the sheet conveyance status and jam in the large-volume feeding deck. When another sheet feeding apparatus is cascade-connected between the large-volume feeding deck and the printing apparatus 100, the CPU of the large-volume feeding deck notifies the controller 205 via the CPU of the cascade-connected sheet feeding apparatus of sensor information of the large-volume feeding deck.

The escape tray 2402 in FIG. 24 is a stacking unit on which sheets conveyed via the escape path 2401 are stacked. The escape tray 2402 has a sheet full load sensor, and the CPU (not shown) in the large-volume feeding deck notifies the controller 205 of information from this sensor. Based on the information from the large-volume feeding deck, the controller 205 grasps stacking information of sheets on the escape tray 2402.

The large-volume feeding deck comprises the upper cassette deck 2403, intermediate cassette deck 2406, and lower cassette deck 2408 (each capable of storing, e.g., 5,000 sheets) as feeding units for storing sheets necessary for print processing. Each feeding unit can store sheets of various materials at various sheet sizes, and has an air heater function and separation fan function. With the air heater function, a heater is attached based on sheet material information and the humidity in the cassette which are notified from the controller 205. With the separation fan function, the air flow of the sheet suction fan is adjusted.

[Feeding Path to Escape Tray]

The feeding path of a sheet from the upper cassette deck to the escape tray will be explained with reference to FIGS. 24 and 25A to 25D.

Figure 25A:
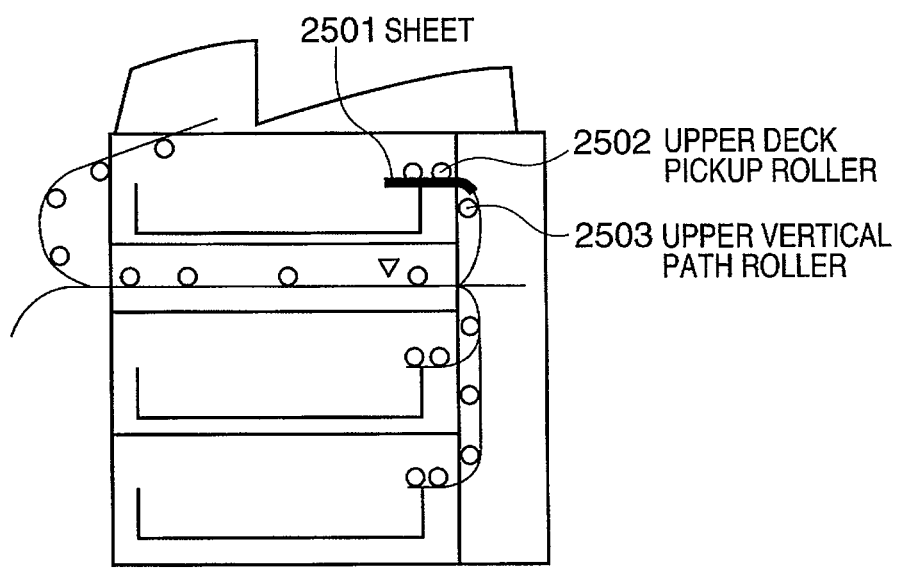
FIG. 25A is a sectional view for explaining the internal structure of the large-volume feeding deck to be controlled in the embodiment of the present invention.

Assume that the controller 205 accepts a request from a user via the UI unit by a key operation to the key 701 in the display of FIG. 7 to execute print processing for sheets from the upper cassette deck. In this case, the controller 205 controls feeding of sheets from the upper cassette deck 2403. The top one of sheets 2501 set in the upper cassette deck 2403 is picked up by an upper deck pickup roller 2502 and conveyed to the upper vertical path 2410 (FIG. 25A). The sheet 2501 conveyed to the upper vertical path 2410 is conveyed by an upper vertical path roller 2503, and guided to the entry of the straight path 2407. Then, multi feed detection processing is executed using the multi feed sensor 2411 in order to detect whether sheets on the straight path 2407 are multi-fed (FIG. 25B).

Figure 25D:
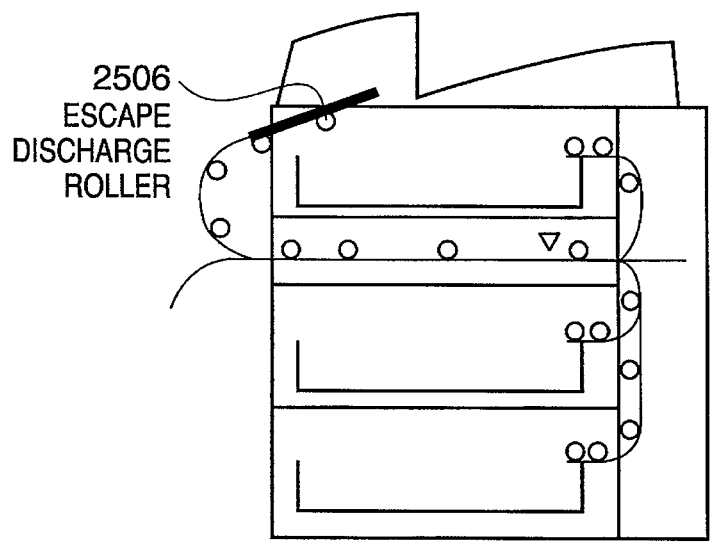
FIG. 25D is a sectional view for explaining the internal structure of the large-volume feeding deck to be controlled in the embodiment of the present invention.

In the multi feed detection processing, the thickness of the sheet 2501 is measured, and whether the sheets 2501 are multi-fed is determined based on the measurement data. In this case, the printing system 1000 adopts a configuration capable of detecting multi feed by the multi feed sensor 2411 by measuring the thickness of the sheet 2501, but may also adopt another multi feed detection means. The sheet 2501 on the straight path 2407 is conveyed by a straight path roller 2504 to the branch point between the escape path 2401 and the buffer path 2405. A conveyance destination is determined based on the result of multi feed detection processing representing whether the sheets 2501 are multi-fed. If it is determined that the sheets 2501 are multi-fed, the sheets 2501 are guided to the escape path 2401 (FIG. 25C). The sheets conveyed to the escape path 2401 are guided to the discharge port of the escape tray 2402 by an escape path roller 2505 (FIG. 25D). The sheets 2501 conveyed to the discharge port of the escape tray 2402 are discharged onto the escape tray 2402 by an escape discharge roller 2506.

Processing when multi feed occurs in a target job whose printing execution request is accepted from a user in the system configuration of FIG. 22 will be described in detail with reference to FIGS. 24 to 30.

The user is prompted to set an output destination from the large-volume feeding apparatus 50 via the operation unit 204 of the printing apparatus 100. After the end of setting, it is determined whether the user has pressed a copy start key (S2601). In S2601, the process waits until the user presses the copy start key.

If the user presses the copy start key, the controller 205 of the printing system 1000 issues a feeding instruction. The controller 205 of the printing system 1000 causes the large-volume feeding apparatus 50 to feed a sheet (S2602). In S2602, the sheet fed from the large-volume feeding apparatus is conveyed to the printer unit 203.

To detect whether sheets are multi-fed in S2602, multi feed detection processing is executed using the multi feed sensor 2411 (S2603). In the multi feed detection processing, the thickness of the sheet is measured, and whether sheets are multi-fed is determined based on the measurement data. At this time, multi feed may be determined by the controller 205 of the printing system 1000 or the CPU (not shown) of the large-volume feeding apparatus.

Based on the result of multi feed detection processing in S2603, it is determined whether sheets are multi-fed (S2604). If it is determined in S2604 that sheets are not multi-fed from the large-volume feeding apparatus 50, the sheet is conveyed to the printer unit 203 (S2605).

The sheet is delivered from the printer unit 203 to the sheet processing apparatus 200.

In S2606, it is determined whether the set job has ended and all sheets have been discharged. If it is determined in S2606 that the set job has not ended, the process returns to S2601. If it is determined in S2606 that the set job has ended, a series of processes ends.

Processing when it is determined in S2604 on the basis of the result of multi feed detection processing in S2603 that sheets are multi-fed will be explained. If multi feed is detected, a feeding operation and image forming operation for sheets fed from the paper cassette of the printer unit 203 and the large-volume feeding apparatus 50 are interrupted. Based on the result of multi feed detection processing representing that sheets are multi-fed, the controller 205 of the printing system 1000 determines whether sheets detected to be multi-fed can be discharged onto the escape tray 2402 (S2701).

If it is determined in S2701 that the multi-fed sheets can be discharged onto the escape tray 2402, multi-fed sheet count determination processing is executed (S2702). If it is determined that the multi-fed sheets cannot be discharged onto the escape tray 2402, the sheets are jammed, and the operation unit 204 displays a warning to remove all sheets from the feeding path in the apparatus (S2709).

After the operation unit 204 executes a predetermined display in S2709, it is determined whether the user has removed all jammed sheets (S2710). If it is determined in S2710 that jam processing has ended, the process proceeds to a resume sequence (S2711).

After the multi-fed sheet count determination processing in S2702, it is checked whether a fed sheet exists (S2703). If no fed sheet exists and the multi-fed sheet count is N as a result of the multi-fed sheet count determination processing, the N multi-fed sheets are discharged onto the escape tray 2402 (S2704). If a fed sheet exists, fed sheet count determination processing is executed (S2706). If the fed sheet count is M as a result of the fed sheet count determination processing, the N multi-fed sheets and the M fed sheets are discharged onto the escape tray (S2707). The discharged sheets may be shifted to allow the user to easily recognize the multi-fed sheets and the fed sheets. After discharging sheets onto the escape tray, the process proceeds to the resume sequence (S2705 and S2708).

The resume sequence (to be referred to as recovery processing hereinafter) is executed based on an instruction from the controller 205. In the recovery processing, sheets detected to be multi-fed in multi feed detection processing are discharged onto the escape tray 2402, and all subsequent sheets fed from the large-volume feeding apparatus 50 are discharged. That is, pages up to one immediately before detecting multi feed are discharged. Page processing upon occurrence of multi feed will be described in detail with reference to FIGS. 28 and 29.

Figure 28:
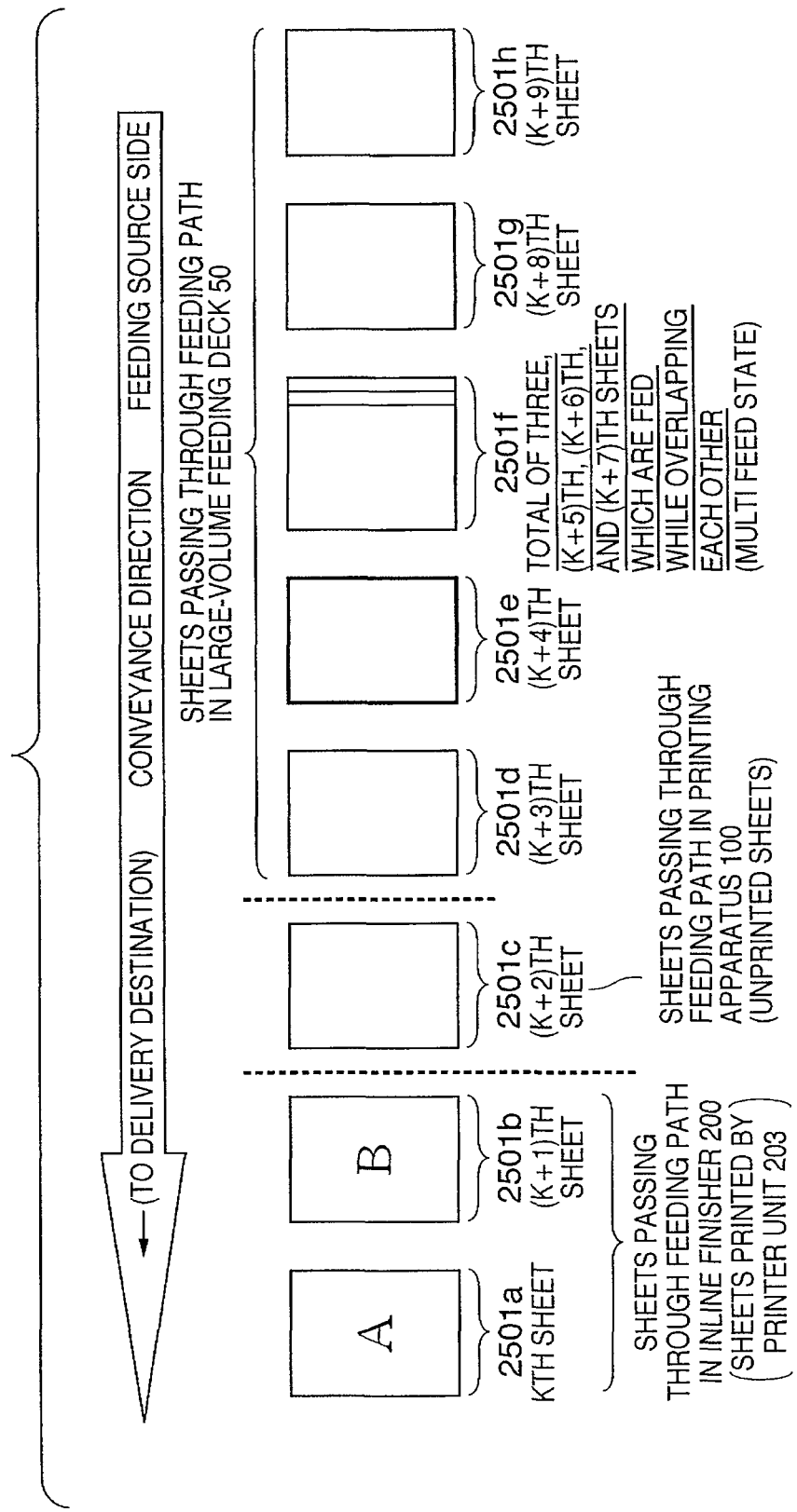
FIG. 28 is a view for explaining sheets on the feeding path in the printing system 1000 to be controlled in the embodiment of the present invention.

FIG. 28 shows an example of sheets on the feeding path when multi feed occurs (but no jam occurs upon occurrence of multi feed) while sheets exist on the feeding path in the printing system 1000. K sheets have already been discharged to the inline finisher, and 10 sheets exist on the feeding path in the printing system 1000. Sheets 2501*a* and 2501*b* are passing through the feeding path in the inline finisher, and have been printed by the printer unit 203. A sheet 2501*c* is passing through the feeding path in the printing apparatus 100, and is not printed. Sheets 2501*d* and 2501*e* are passing through the feeding path in the large-volume feeding apparatus 50. Three sheets 2501*f* are multi-fed on the feeding path in the large-volume feeding apparatus 50. Sheets 2501*g* and 2501*h* are passing through a feeding path on the feeding source side from the multi-fed sheets.

Figure 29:
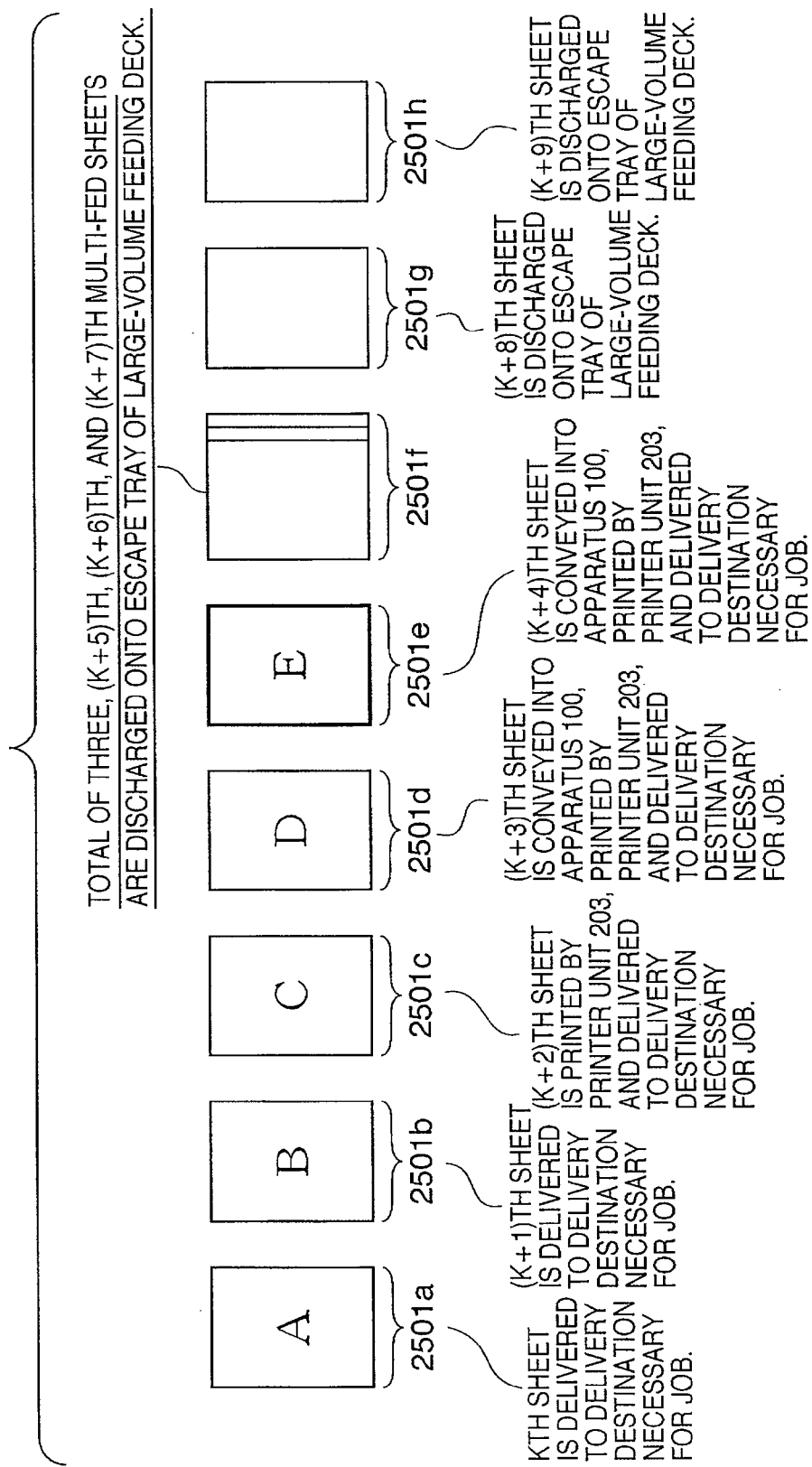
FIG. 29 is a view for explaining sheets on the feeding path in the printing system 1000 to be controlled in the embodiment of the present invention.
Figure 31:
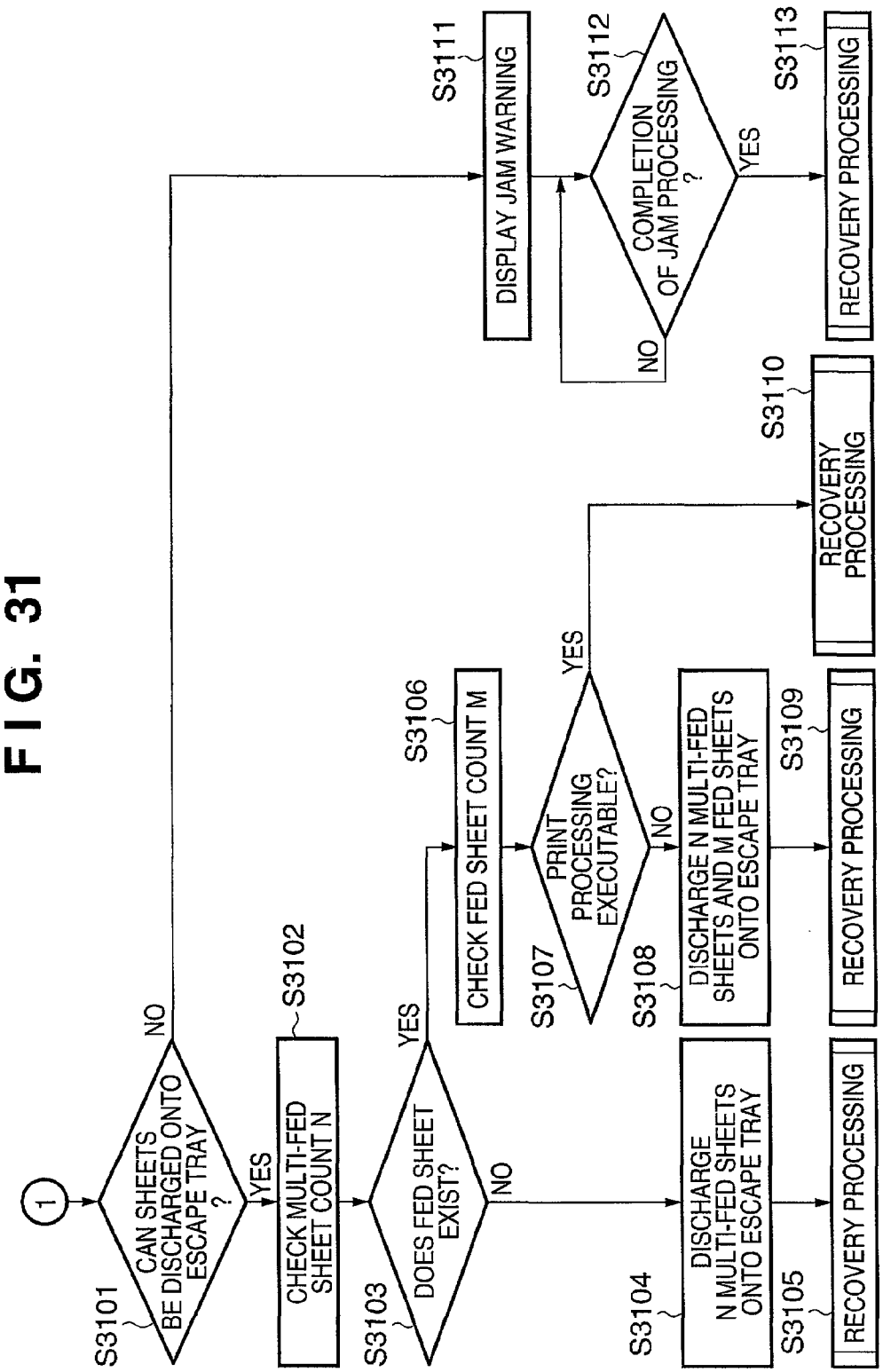
FIG. 31 is a flowchart showing a control example of the printing system 1000 to be controlled in the embodiment of the present invention.

In page processing upon occurrence of multi feed according to the first embodiment, control as shown in FIG. 29 is done in recovery processing. The sheets 2501*a* and 2501*b* are discharged from inside the inline finisher to a discharge destination requested by the job. The sheet 2501*c* is printed by the printer unit 203, and discharged to a discharge destination requested by the job. The sheets 2501*d* and 2501*e* are conveyed into the printing apparatus 100, printed, and discharged to a discharge destination requested by the job. The three sheets 2501*f* are discharged onto the escape tray of the large-volume feeding apparatus 50. The sheets 2501*g* and 2501*h* are discharged onto the escape tray of the large-volume feeding apparatus 50.

By performing this recovery processing, sheets after detecting multi feed are discharged onto the escape tray. The job is newly reproduced from a state before multi feed occurs.

After all sheets are discharged by recovery processing, the printing apparatus 100 prepares for resuming the sheet output operation (S3001). Upon completion of the preparation, the process returns to step S2602.

After the process in S3001 ends, the printer unit 203 resumes its operation to output multi-fed sheets again from it, and executes normal print processing.

When sheets are multi-fed from the large-volume feeding apparatus 50, the operation can be resumed by executing proper recovery processing by the above-described control.

According to the first embodiment, appropriate recovery processing can be achieved when sheets are multi-fed from the large-volume feeding apparatus 50.

Second Embodiment

The configuration and basic control of a printing system 1000 and the like in the second embodiment are the same as those in the first embodiment, and only a difference will be explained.

Figure 26:
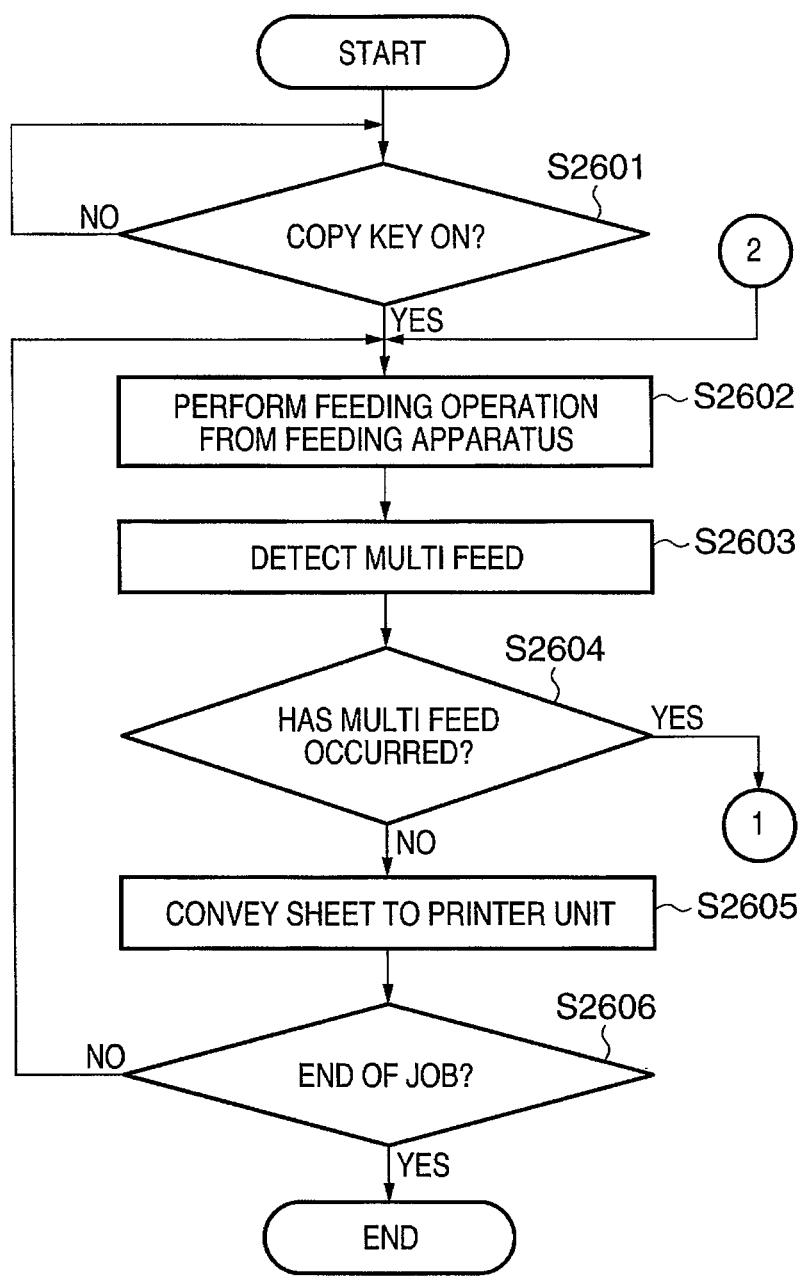
FIG. 26 is a flowchart showing a control example of the printing system 1000 to be controlled in the embodiment of the present invention.
Figure 27:
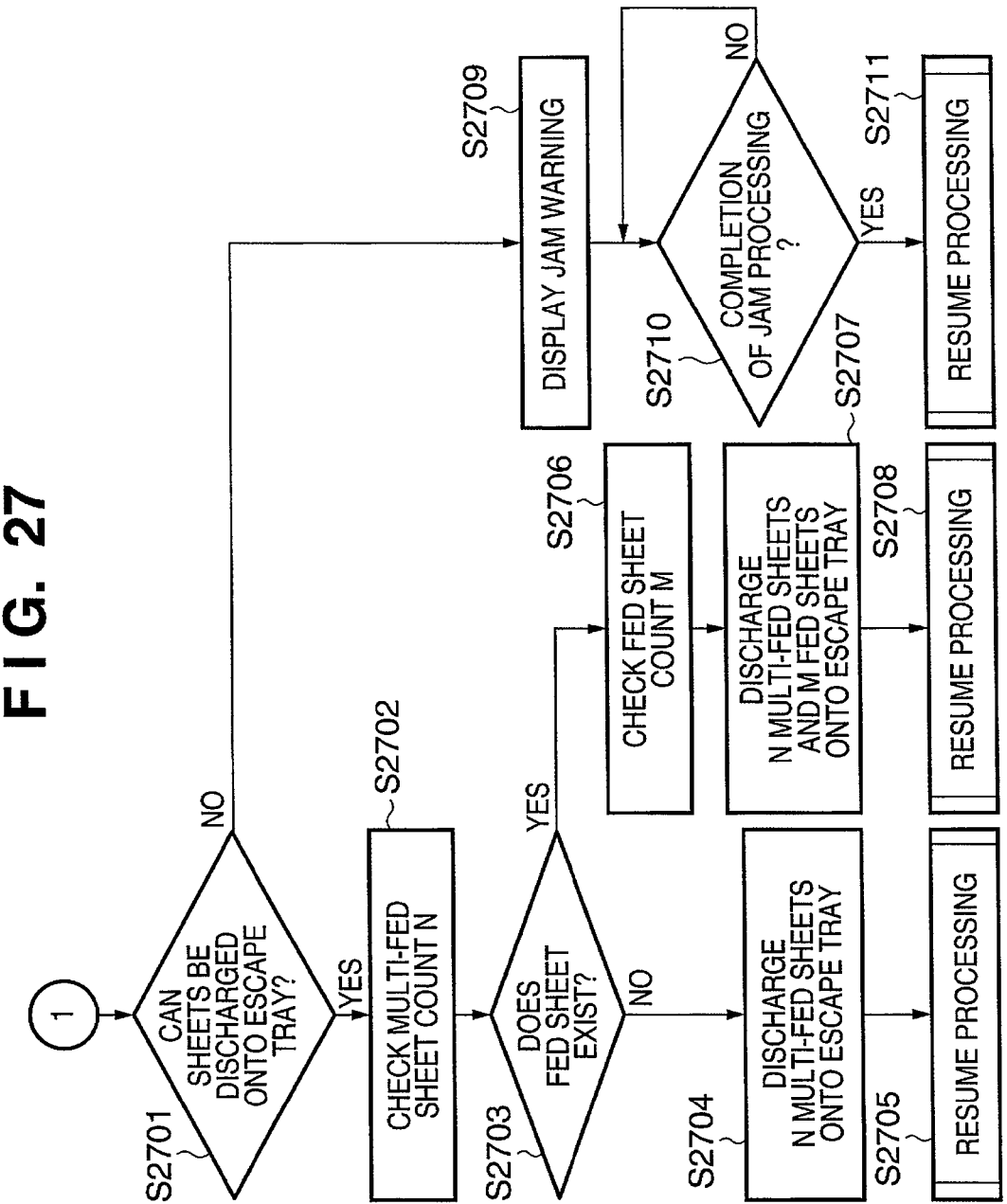
FIG. 27 is a flowchart showing a control example of the printing system 1000 to be controlled in the embodiment of the present invention.

Multi feed detection processing according to the second embodiment will be explained with reference to FIGS. 21 to 25D showing configurations, FIG. 26 showing a flowchart, and a view showing the display window of an operation unit 204.

Processing when it is determined in S2604 on the basis of the result of multi feed detection processing in S2603 that sheets are multi-fed will be explained. When multi feed is detected, a feeding operation and image forming operation for sheets fed from the paper cassette of a printer unit 203 and the large-volume feeding apparatus 50 are interrupted. Based on the result of multi feed detection processing representing that sheets are multi-fed, a controller 205 of the printing system 1000 determines whether sheets detected to be multi-fed can be discharged onto an escape tray 2402 (S3101).

If it is determined in S3101 that the multi-fed sheets can be discharged onto the escape tray 2402, multi-fed sheet count determination processing is executed (S3102). If it is determined that the multi-fed sheets cannot be discharged onto the escape tray 2402, the sheets are jammed, and the operation unit 204 displays a warning to remove all sheets from the feeding path in the apparatus (S3111). While the warning is displayed, a feeding operation and image forming operation for sheets fed from the paper cassette of the printer unit 203 and the large-volume feeding apparatus 50 are interrupted.

After the operation unit 204 executes a predetermined display in S3111, it is determined whether the user has removed all jammed sheets (S3112). If it is determined in S3112 that jam processing has ended, the process proceeds to a resume sequence (S3113).

After the multi-fed sheet count determination processing in S3102, it is checked whether a fed sheet exists (S3103). If no fed sheet exists and the multi-fed sheet count is N as a result of the multi-fed sheet count determination processing, the N multi-fed sheets are discharged onto the escape tray 2402 (S3104). If a fed sheet exists, fed sheet count determination processing is executed (S3106). After the fed sheet count determination processing, it is checked whether a fed sheet can be printed (S3107). This is a case where sheets are formed from the same material with the same size and page numbers can be replaced without any problem when, for example, switching jobs. If no fed sheet can be printed and the fed sheet count is M as a result of the fed sheet count determination processing, the N multi-fed sheets and the M fed sheets are discharged onto the escape tray (S3108). After discharging sheets onto the escape tray, the process proceeds to recovery processing (S3105, S3109, and S3110).

The recovery processing is executed based on an instruction from the controller 205 (S3001). Page processing upon occurrence of multi feed will be described in detail with reference to FIG. 32.

Figure 32:
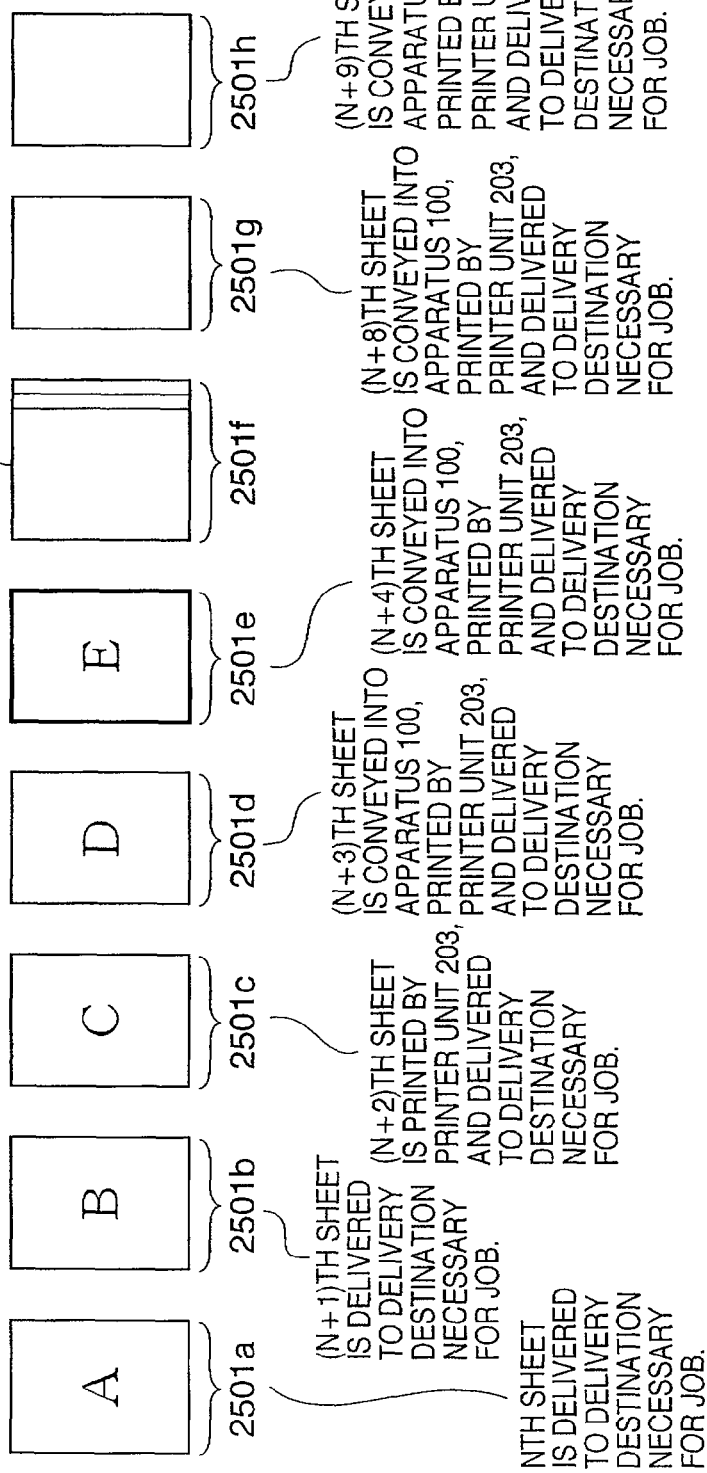
FIG. 32 is a view for explaining sheets on the feeding path in the printing system 1000 to be controlled in the embodiment of the present invention.
Figure 33:
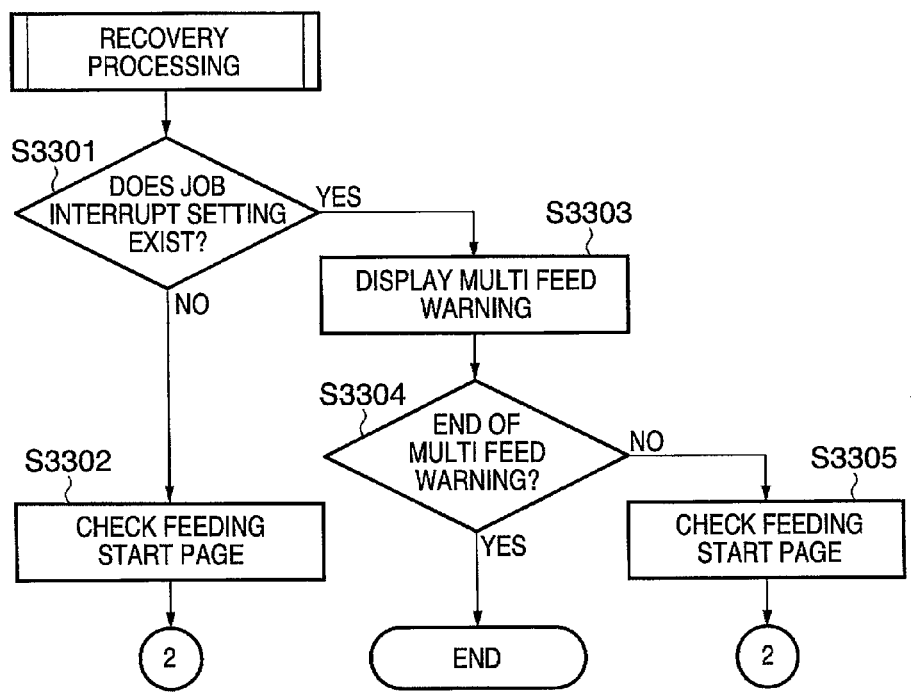
FIG. 33 is a flowchart showing a control example of the printing system 1000 to be controlled in the embodiment of the present invention.

In page processing upon occurrence of multi feed according to the second embodiment, recovery control as shown in FIG. 32 is performed in the example of FIG. 28. Sheets 2501*a* and 2501*b* are discharged from inside an inline finisher to a discharge destination requested by the job. A sheet 2501*c* is printed by the printer unit 203, and discharged to a discharge destination requested by the job. Sheets 2501*d* and 2501*e* are conveyed into a printing apparatus 100, printed, and discharged to a discharge destination requested by the job. Three sheets 2501*f* are discharged onto the escape tray of the large-volume deck. Sheets 2501*g* and 2501*h* are discharged onto the escape tray, then conveyed into the printing apparatus 100, printed, and discharged to a discharge destination requested by the job (the sheets 2501*g* and 2501*h* are printed instead of the (N+5)th and (N+6)th multi-fed sheets). By performing this recovery processing, only sheets detected to be multi-fed are discharged onto the escape tray. The job can resume without reproducing a new job upon occurrence of multi feed.

After all sheets are discharged by recovery processing, the printing apparatus 100 prepares for resuming the sheet output operation (S3001). Upon completion of the preparation, the process returns to step S2602.

After the process in S3001 ends, the printer unit 203 resumes its operation to output multi-fed sheets again from it, and executes normal print processing.

When sheets are multi-fed from the large-volume feeding apparatus 50, the operation can be resumed by executing proper recovery processing by the above-described control.

According to the second embodiment, appropriate recovery processing can be achieved when sheets are multi-fed from the large-volume feeding apparatus 50.

Third Embodiment

The configuration and basic control of a printing system 1000 and the like in the third embodiment are the same as those in the first embodiment, and only a difference will be explained.

Recovery processing according to the third embodiment will be explained with reference to FIGS. 21 to 25D showing apparatus configurations, FIG. 26 showing a flowchart, and a view showing the display window of an operation unit 204.

The third embodiment is characterized by recovery processing after detecting multi feed in the printing system 1000. In recovery processing, a controller 205 of the printing system 1000 determines whether a job interrupt setting exists (S3301). Job interrupt setting information is saved in an HDD 209 or RAM 208.

The job interrupt setting is made via a setting 3401 shown in FIG. 34 in accordance with the user setting of a key on the operation unit 204. The controller 205 saves, in the HDD 209 or RAM, information on an ON key 3501 or OFF key 3502 in FIG. 35 selected by the user.

If it is determined in S3301 that the job interrupt setting exists, the operation unit 204 displays a warning which prompts the user to select whether to interrupt or resume the job (S3303). If no job interrupt setting exists, the process proceeds to a resume sequence (S3302).

After the operation unit 204 executes a predetermined display in S3303, it is determined whether the user has pressed the job resume key (S3304). If it is determined in S3304 that the user has pressed the job resume key, the process proceeds to a resume sequence (S3305). If the user presses not the job resume key but the interrupt key, the job ends. If sheets remain in wait for the resume of the job, all subsequent remaining sheets from the large-volume feeding apparatus 50 are discharged onto an escape tray 2402, like the second embodiment.

In the third embodiment, the operation unit 204 executes the display after recovery processing. However, the timing to execute the display for this processing is arbitrary between detection of multi feed and the start of a job.

According to the third embodiment, the user can select whether to recover a job when sheets are multi-fed from the large-volume feeding apparatus 50.

Fourth Embodiment

The configuration and basic control of a printing system 1000 and the like in the fourth embodiment are the same as those in the first embodiment, and only a difference will be explained.

Recovery processing according to the fourth embodiment will be explained with reference to FIGS. 21 to 25D showing apparatus configurations, FIG. 26 showing a flowchart, and a view showing the display window of an operation unit 204.

The fourth embodiment is characterized by recovery processing after detecting multi feed in the printing system 1000. In recovery processing, after detecting multi feed, a controller 205 of the printing system 1000 saves multi feed detection information in an HDD 209 or RAM 208 (S3601).

After saving the multi feed detection information, the process proceeds to a resume sequence (S3602).

The user can confirm the multi feed state with a system monitor key 617 shown in FIG. 6. When the user presses the system monitor key, the controller 205 causes a touch panel 401 to display the state of a job present in a printing apparatus 100. Based on the information saved in the HDD 209 or RAM 208, the controller 205 causes the operation unit 204 to display information 3701 shown in FIG. 37 from which the user can determine whether multi feed has occurred.

Multi feed detection information can be displayed on the operation unit 204 of the printing apparatus 100, and can also be externally acquired via a network. Information can be acquired and displayed from even an external application and device via a network.

According to the fourth embodiment, when sheets are multi-fed from the large-volume feeding apparatus 50, the user can confirm the multi feed information.

Fifth Embodiment

The above-described embodiments are directed to control examples executed after the controller 205 confirms that no paper jam occurs upon occurrence of multi feed in the printing system 1000.

In the fifth embodiment, a controller 205 controls a printing system 1000 to cope with even a printing interrupt factor which occurs upon occurrence of multi feed in the printing system 1000 and is different from the multi feed.

The printing interrupt factor of a type different from multi feed includes, e.g., a jam of non-multi-fed print media on the sheet feeding path of the printing system 1000. More specifically, assume that multi feed occurs on the feeding path of a large-volume feeding apparatus while print media necessary for print processing of a target job are successively fed from the feeding unit of the large-volume feeding apparatus into the printing apparatus. At this time, non-multi-fed print media may have already been supplied from the feeding apparatus into a printing apparatus 100. In this situation, the non-multi-fed print media may be jammed on a sheet feeding path in an apparatus downstream of the large-volume feeding apparatus. In this case, multi feed occurs in the large-volume feeding apparatus of the printing system 1000, and the occurrence of multi feed causes a jam of non-multi-fed print media in the printing system 1000 at the same time as the occurrence of multi feed. In the fifth embodiment, the controller 205 can execute control dealing with this case.

In the above-described control examples, multi feed occurs in the large-volume feeding apparatus of the printing system 1000 while the printing system 1000 continuously performs the printing operation of a target job by successively feeding print media from the large-volume feeding apparatus. In this case, the controller 205 automatically keeps discharging multi-fed print media to the escape tray outside the large-volume feeding apparatus. The controller 205 controls the printing system 1000 to be able to automatically continue print processing using non-multi-fed print media upon occurrence of multi feed without intervention work by an operator. In this configuration, many multi-fed print media may be automatically kept discharged onto the same escape tray outside the large-volume feeding apparatus. In this case, the escape tray becomes full of multi-fed print media, resulting in overstocking (full tray) of multi-fed print media. In this case, multi feed occurs in the large-volume feeding apparatus of the printing system 1000, and the occurrence of multi feed causes an error (full tray) at the discharge destination of multi-fed print media in the printing system 1000 upon the occurrence of multi feed. In the fifth embodiment, the controller 205 can execute control dealing with this case.

Considering this configuration, a plurality of types of control examples associated with constituent features of the above-described embodiments mean executing control operations corresponding to the following control examples 1 and 2.

Control Example 1

This control example is executed in a case where the following three conditions are satisfied. That is, the controller 205 confirms that multi feed has occurred in the printing system 1000 during printing of a target job. The controller 205 confirms that a printing interrupt factor (e.g., paper jam or full tray) of a type different from multi feed does not occur upon the occurrence of multi feed. The controller 205 confirms that it is set to automatically resume the job (a key 3502 in the display of FIG. 35 has been selected to set OFF the job interrupt setting after multi feed).

Control Example 2

This control example is executed in a case where the following conditions are satisfied. That is, the controller 205 confirms that multi feed has occurred in the printing system 1000 during printing of a target job. The controller 205 confirms that a printing interrupt factor (e.g., paper jam) of a type different from multi feed does not occur in the printing system 1000 upon the occurrence of multi feed. The controller 205 confirms that it is inhibited to automatically resume the job (a key 3501 in the display of FIG. 35 has been selected to set ON the job interrupt setting after multi feed).

In addition to these configurations, the fifth embodiment provides the following configurations as remarkable features. Configuration examples capable of executing even the following control operations by the controller 205 will be explained using the following control examples 3 and 4.

Control Example 3

This control example is executed in a case where the following three conditions are satisfied. That is, the controller 205 confirms that multi feed has occurred in the printing system 1000 during printing of a target job. The controller 205 confirms that a printing interrupt factor (e.g., paper jam) of a type different from multi has occurred in the printing system 1000 upon the occurrence of multi feed. The controller 205 confirms that it is set to automatically resume the job (the key 3502 in the display of FIG. 35 has been selected to set OFF the job interrupt setting after multi feed).

Control Example 4

This control example is executed in a case where the following three conditions are satisfied. That is, the controller 205 confirms that multi feed has occurred in the printing system 1000 during printing of a target job. The controller 205 confirms that a printing interrupt factor (e.g., paper jam) of a type different from multi feed has occurred in the printing system 1000 upon the occurrence of multi feed. The controller 205 confirms that it is inhibited to automatically resume the job (the key 3501 in the display of FIG. 35 has been selected to set ON the job interrupt setting after multi feed).

Figure 38:
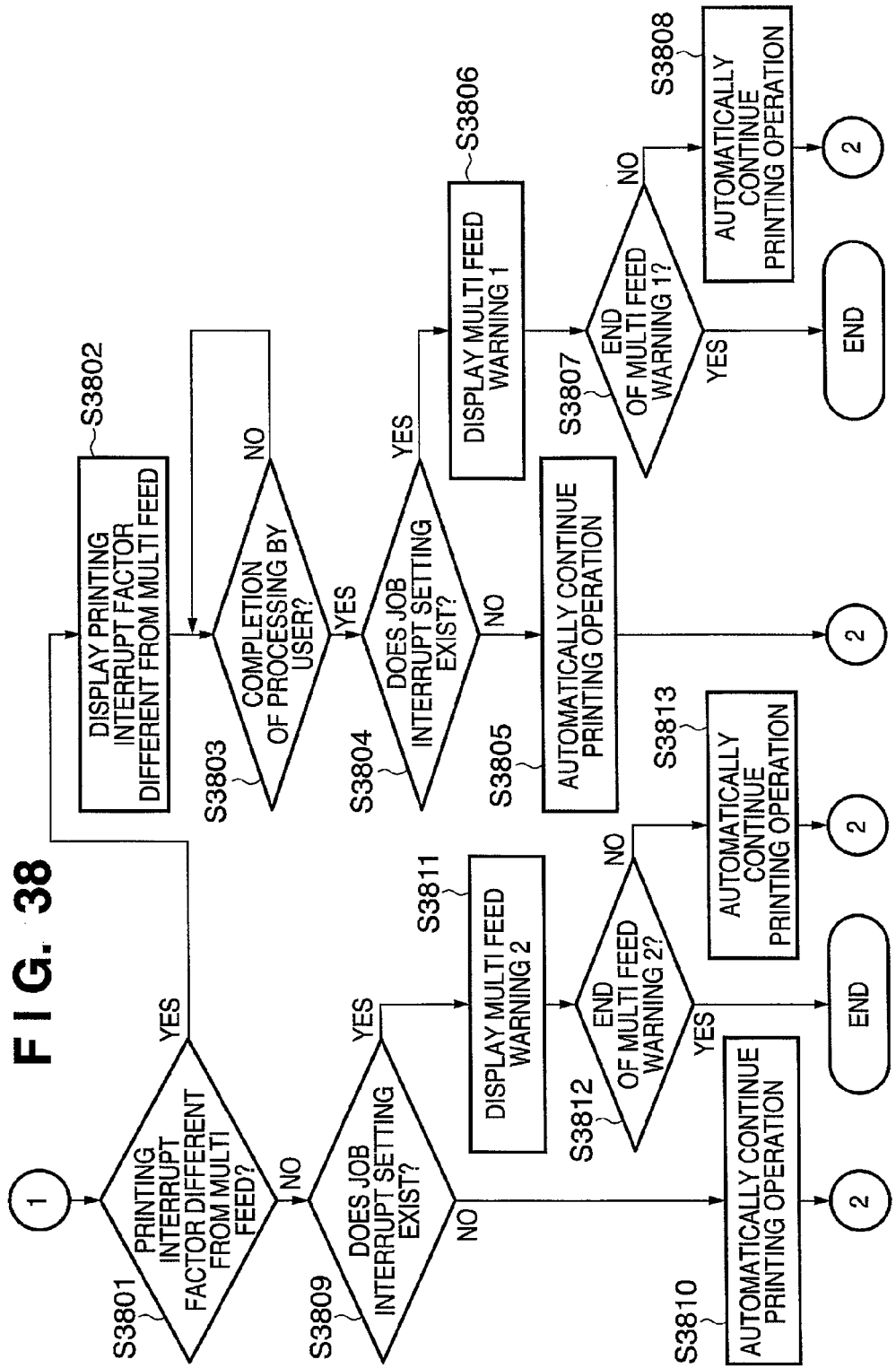
FIG. 38 is a flowchart showing a control example of the printing system 1000 to be controlled in the embodiment of the present invention.

Control examples 1, 2, 3, and 4 in the fifth embodiment will be explained with reference to FIGS. 21 to 25D showing apparatus configurations, FIGS. 26 and 38 showing flowcharts, and a view showing the display window of an operation unit 204.

The fifth embodiment is characterized by processing after multi feed occurs, i.e., by a control example after determination by the controller 205 when multi feed is detected in a sequence typified by FIG. 26. FIG. 38 is a flowchart showing control after confirming multi feed in S2604 of FIG. 26.

As a result of multi feed detection processing in S2604, the printing interrupt factor of a conveyed sheet is checked (S3801). Also when a job is interrupted based on information from a multi feed sensor 2411, multi-fed sheets may be jammed and may not be able to be discharged onto the escape tray. Non-multi-fed sheets may be jammed. Further, the escape tray which receives multi-fed sheets may become full. In this manner, even when a job is interrupted upon occurrence of multi feed, it is confirmed whether the job is interrupted owing to another printing interrupt factor.

Assume that sheets are multi-fed from the large-volume feeding apparatus 50 and are jammed in S3801. However, the printing interrupt factor is not limited as long as it is different from multi feed generated in the printing system 1000. When sheets fed from the large-volume feeding apparatus 50 are jammed, the controller 205 causes the operation unit 204 to display a warning in FIG. 40 to prompt the user to remove all sheets from the feeding path in the apparatus (S3802).

The window displayed on the operation unit 204 represents that the job is interrupted owing to a factor different from multi feed. While the warning is displayed, a feeding operation and image forming operation for sheets fed from the paper cassette of a printer unit 203 and the large-volume feeding apparatus 50 are interrupted. After the end of jam processing by the user (S3803), the controller 205 confirms whether a job interrupt setting upon multi feed exists (S3804).

Figure 40:
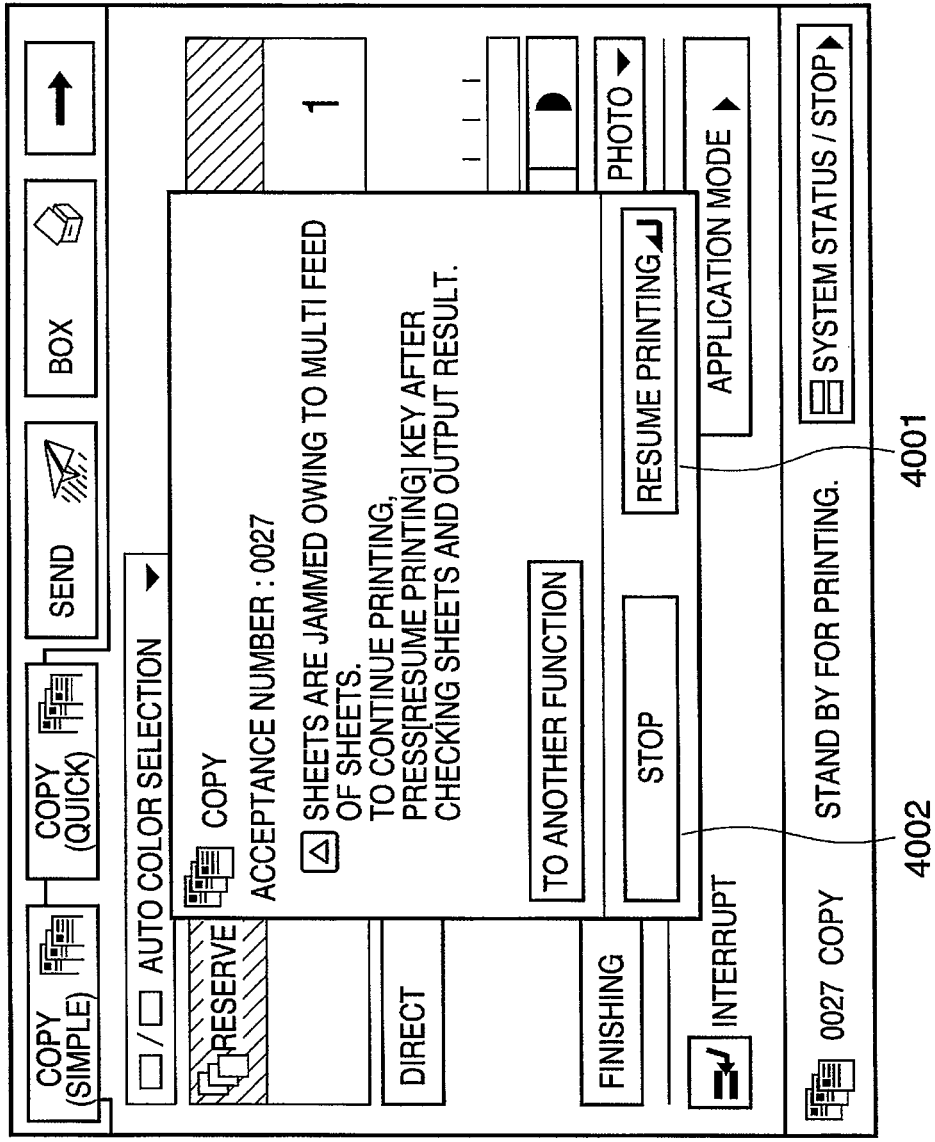
FIG. 40 is a view for explaining a display control example on the UI unit to be controlled in the embodiment of the present invention.

The job interrupt setting is an item for displaying a window for selecting whether to interrupt or resume a job, as described in the third embodiment. If the job interrupt setting exists, the controller 205 causes the operation unit 204 to display a warning which prompts the user to select whether to resume the job (S3806). The operation unit 204 explicitly represents that the job is interrupted owing to multi feed and another printing interrupt factor exists in addition to the multi feed. FIG. 40 shows a window displayed on the operation unit 204 in S3806 after jam processing when the job interrupt setting exists and the controller 205 determines that the job interrupt setting exists. FIG. 40 shows that a paper jam has also occurred upon occurrence of multi feed after detecting multi feed.

If the user presses a key 4001 to resume the job, a printing operation automatically resumes as described in the first and second embodiments, and the process returns to a normal printing sequence (S3808: corresponding to control example 3). If the user presses a key 4002 to stop the job, the printing operation ends (corresponding to control example 4). If no job interrupt setting exists, the printing operation automatically resumes as described in the first and second embodiments, and the process returns to a normal printing sequence (S3805).

Processing when a printing interrupt factor different from multi feed does not occur in S3801 will be explained. In this case, the controller 205 confirms the stop of a job upon multi feed, and another printing interrupt factor does not occur. The controller 205 confirms whether a job interrupt setting upon occurrence of multi feed exists (S3809). The job interrupt setting is an item described in the third embodiment. If the job interrupt setting exists, the controller 205 causes the operation unit 204 to display a warning which prompts the user to select whether to resume the job (S3811). The operation unit 204 represents that the job is interrupted owing to multi feed. A window displayed in S3811 and that displayed in S3806 are different depending on the presence/absence of a printing interrupt factor other than multi feed. FIG. 41 shows a window displayed on the operation unit 204 when the controller 205 determines in S3809 that the job interrupt setting exists. If the user presses a key 4101 to resume the job, a printing operation automatically resumes as described in the first and second embodiments, and the process returns to a normal printing sequence (S3813: corresponding to control example 1). If the user presses a key 4102 to stop the job, the printing operation ends (corresponding to control example 2). If no job interrupt setting exists, the printing operation automatically resumes as described in the first and second embodiments, and the process returns to a normal printing sequence (S3810).

In the configuration of the fifth embodiment, these four types of control are performed: the first control which corresponds to control example 1 and is associated with multi feed, the second control which corresponds to control example 2 and is associated with multi feed, the third control which corresponds to control example 3 and is associated with multi feed, and the fourth control which corresponds to control example 4 and is associated with multi feed. Especially in this configuration, the controller 205 controls the printing system 1000 to allow independently, distinctively, selectively executing these four types of control in the printing system 1000.

Effects obtained by the printing system 1000 described in the fifth embodiment will be exemplified.

For example, the printing system 1000 can cope with problems described in Description of the Related Art. The printing system 1000 can also build a user-friendly, convenient printing environment suited not only to the office environment but also to the POD environment. The printing system 1000 can meet needs on site in the printing environment such as the POD environment, including a need to operate the system at productivity as high as possible, and a need to reduce the work load on an operator as much as possible. The fifth embodiment can provide a printing system, job processing method, storage medium, computer program, and printing apparatus capable of dealing with a variety of use cases and user needs associated with multi feed at high productivity and high operability in consideration of the following printing environment such as the POD environment. For example, the fifth embodiment can build a printing environment where recovery processing proper for an uncompleted job suffering occurrence of multi feed during printing by the printing system 1000 can be executed at high productivity and high operability without any trouble such as an operation error by an operator or a determination error. In this manner, the fifth embodiment can establish a convenient, flexible printing environment capable of coping with various use cases and needs assumable in the POD environment in Description of the Related Art. The fifth embodiment can provide various mechanisms toward commercialization of a product.

Although various configurations have been exemplified, the embodiment includes all constituent features at least configured as follows. The embodiment includes even a configuration corresponding to at least one constituent feature and even a configuration corresponding to a plurality of constituent features.

As a major premise, the printing system 1000 performs the following processing under the control of the controller 205. More specifically, the printing system is configured to be able to use, as print media necessary for a job to be processed by the printing apparatus 100, print media detected by a multi feed sensor for detecting occurrence of multi feed of overlapping print media.

On the premise of this configuration, when multi feed occurs in the printing system 1000, the controller 205 controls the printing system 1000 to be able to execute a recovery operation for the job without outputting multi-fed print media to a print medium discharge destination necessary for the unprinted job.

Further, the printing system 1000 according to the embodiment is configured as follows.

The controller 205 controls the UI unit (including various UI units such as the operation unit 204 described in the embodiment) of the embodiment to allow inputting the first operator request via the UI unit of the embodiment prior to occurrence of multi feed. In the embodiment, the first operator request corresponds to a request input via the key 3502 in the display window shown in FIG. 35. In other words, a request (instruction) via the key 3502 corresponds to an explicit operator request (instruction) to inhibit interruption of a job upon occurrence of multi feed. A request (instruction) input via the key 3501 in the display window shown in FIG. 35 corresponds to an explicit operator request (instruction) to interrupt a job upon occurrence of multi feed. In the embodiment, the controller 205 controls the printing system 1000 to select the key 3502 as the default. When the user selects the key 3501, the controller 205 determines that no first operator request is input. The keys 3501 and 3502 are provided as alternative choices, either of which can be exclusively selected.

On the premise of this configuration, the controller 205 can determine, based on the fact that the key 3502 has already been selected prior to occurrence of multi feed, that the first operator request has been input prior to occurrence of multi feed in the large-volume feeding apparatus of the printing system 1000. In this case, the controller 205 permits the printing system 1000 to execute a recovery operation for an unprinted job without outputting multi-fed print media to a print medium discharge destination necessary for the unprinted job even if no second operator request is input upon occurrence of multi feed.

Based on this premise, the controller 205 can determine, based on the fact that not the key 3502 but the key 3501 has already been selected in advance, that no first operator request has been input prior to occurrence of multi feed in the large-volume feeding deck of the printing system 1000. When no first operator request has been input prior to occurrence of multi feed, the controller 205 inhibits the printing system 1000 from executing a recovery operation for an unprinted job without receiving the second operator request upon occurrence of multi feed.

As the recovery operation for an unprinted job, for example, the controller 205 causes the printing system 1000 to continue a printing operation for a job during printing in the printing system 1000 upon occurrence of multi feed by using non-multi-fed print media different from multi-fed print media.

On the premise of this configuration, for example, when causing the printing system 1000 to execute the recovery operation, the controller 205 inhibits conveyance of multi-fed print media to the printer unit 203 of the printing apparatus 100. The controller 205 controls to convey print media subsequent to multi-fed print media to the printer unit 203 of the printing apparatus 100 as print media necessary for the job subjected to the recovery operation.

For example, when causing the printing system 1000 to execute the recovery operation, the controller 205 causes the printing system 1000 to continue a printing operation for a job. This printing operation uses non-multi-fed print media supplied to the printing apparatus 100 after multi-fed print media are conveyed via a certain feeding path different from a feeding path for conveying print media to the printer unit 203 of the printing apparatus 100.

Also for example, this printing operation uses non-multi-fed print media supplied from a feeding apparatus to the printing apparatus 100 after multi-fed print media are conveyed from the feeding apparatus to a certain discharge destination of the feeding apparatus which supplies print media to the printing apparatus 100.

As an example of the feeding apparatus, the embodiment exemplifies a large-volume feeding apparatus (e.g., large-volume feeding apparatus 50) which is connectable on the upstream side of the printing apparatus 100 and has an escape tray capable of holding multi-fed print media, as illustrated in FIG. 24.

Further, the controller 205 can accept a request via a network from an external apparatus (e.g., a server PC 103, a printing apparatus other than the printing apparatus 100, or a near-line finisher) to acquire status information of the printing system 1000 including occurrence of multi feed. Upon receiving the request, the controller 205 controls the printing apparatus 100 to transmit status information including information on multi feed to the requesting external apparatus.

On the premise of this configuration, in the embodiment, the controller 205 controls the printing apparatus 100 to be able to execute print processing of data in the HDD 209 capable of storing data of jobs. In addition, the controller 205 causes a user interface to display, in distinction from information on other jobs, information on a job corresponding to a job during printing upon occurrence of multi feed among jobs whose print data have been input from the HDD 209 and whose printing execution requests have been issued.

For example, as represented by the display in FIG. 37, the controller 205 controls the touch panel 401 to add "*" to the status line of a job suffering occurrence of multi feed as identification information which allows the operator to specify, among printed jobs, the job suffering occurrence of multi feed during a printing operation. In the embodiment, the controller 205 controls the touch panel 401 not to add "*" in the display of FIG. 37 to the job status line of a job for which the printing operation has been complete without generating multi feed during the printing operation. From the display of "*", the operator can specify a job free from multi feed during the period from the start to completion of printing. At the same time, the operator can specify a job suffering occurrence of multi feed during the period from the start to completion of printing, in distinction from a job free from multi feed. The printing system 1000 has this function.

In addition to this configuration, the controller 205 permits the printing system 1000 to execute a recovery operation for an unprinted job without intervention work by an operator upon occurrence of multi feed when another type of printing interrupt factor does not occur in the printing system 1000 upon the occurrence of multi feed. To the contrary, the controller 205 inhibits the printing system 1000 from executing a recovery operation for an unprinted job without intervention work by an operator upon occurrence of multi feed when another type of printing interrupt factor occurs in the printing system 1000 upon the occurrence of multi feed. The printing system 1000 also has this constituent feature.

Figure 39:
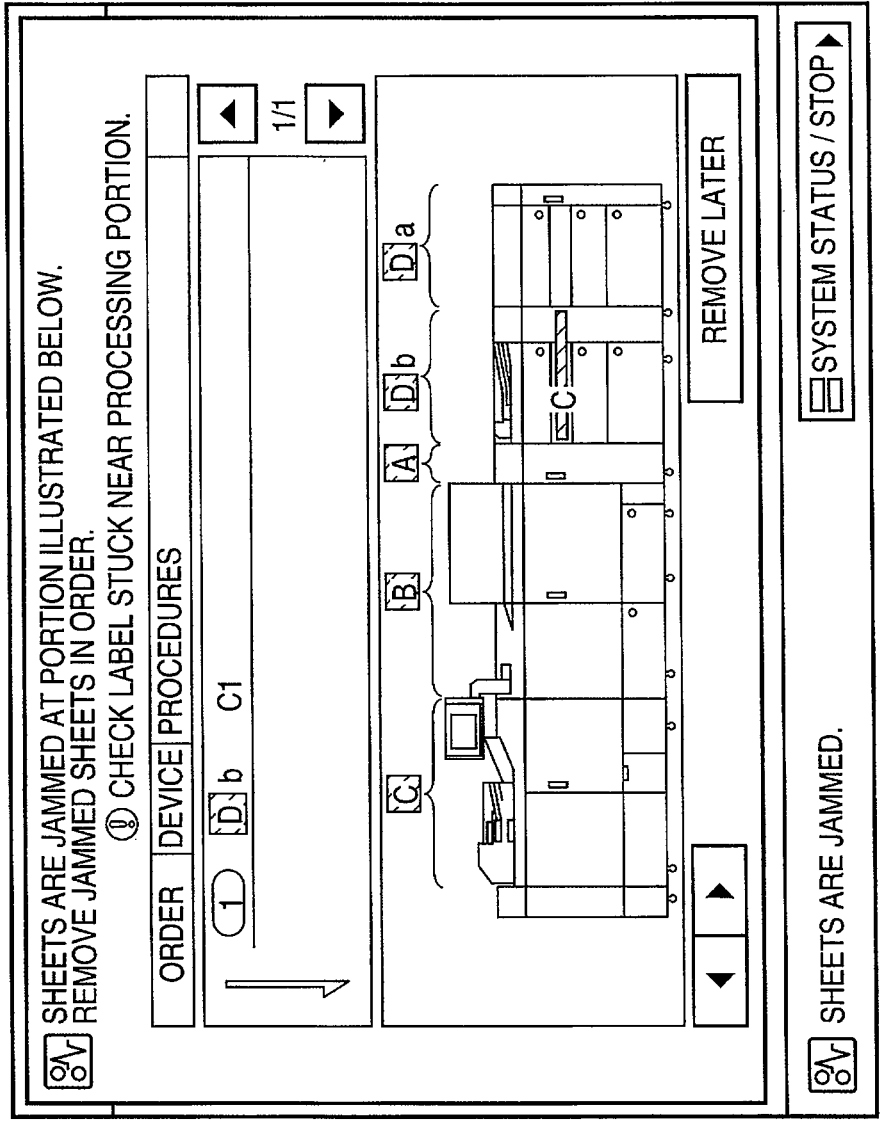
FIG. 39 is a view for explaining a display control example on the UI unit to be controlled in the embodiment of the present invention.

In addition to this configuration, the controller 205 causes the UI unit of the embodiment to display, upon occurrence of multi feed, a guidance capable of notifying the operator of information on a printing interrupt factor when another type of printing interrupt factor occurs in the printing system 1000 upon the occurrence of multi feed. For example, the controller 205 controls the operation unit 204 to be able to execute a display in FIG. 39. On the premise of this configuration, the controller 205 inhibits the UI unit of the embodiment from displaying the guidance upon occurrence of multi feed when another printing interrupt factor does not occur upon the occurrence of multi feed. The printing system 1000 also has this constituent feature.

In addition to this configuration, the controller 205 causes the UI unit to execute the second display after executing the first display capable of notifying the operator of information on another type of printing interrupt factor upon occurrence of multi feed. As represented by the display in FIG. 39, the first display can notify the operator of occurrence of a jam of non-multi-fed print media in the printing system 1000 upon occurrence of multi feed. The first display can also notify the operator of procedures to cancel the printing interrupt factor by him. The embodiment provides a mechanism for obtaining effects of further enhancing the effects capable of increasing the work efficiency of the operator.

The second display corresponds to the display in FIG. 40 having the key 4001 or that in FIG. 41 having the key 4101. In other words, the second display has an operation instruction portion configured to allow the operator to explicitly input an instruction to execute a recovery operation upon occurrence of multi feed for an uncompleted job whose printing operation is interrupted upon the occurrence of multi feed in the printing system 1000.

On the premise of this configuration, the controller 205 can determine, based on an input from the key 4001 or 4101, that an operator request concerning a recovery operation has been input via the second display executed by the UI unit after the UI unit executes the first display. In this case, the controller 205 causes the printing system 1000 to execute a recovery operation for an unprinted job.

Moreover, a printing interrupt factor of a type different from multi feed does not occur in the printing system 1000 upon occurrence of multi feed, the controller 205 allows the operator to input an operator request via the second display without executing the first display by the UI unit.

These constituent features provide an effect of reducing wasteful processes as much as possible in the printing system 1000. These constituent features also provide an effect of suppressing presentation of information more than necessary to the operator, and an effect of suppressing an operation error by the operator or an extra burden on him which are caused by notification of unnecessary information. The configurations of the embodiment can achieve these effects while obtaining other effects described in the embodiment. The embodiment employs the above-described configurations as mechanisms for implementing these effects.

In other words, the constituent features of some of various control examples described above mean the following configuration of the printing system 1000 in the embodiment.

The controller 205 acquires the first determination information representing whether a specific operator request concerning the recovery operation has been input via the UI unit of the embodiment prior to occurrence of multi feed. For example, the controller 205 acquires, from the operation unit 204, information representing whether the key 3502 in the display of FIG. 35 has been selected in advance as a device setting of the printing system 1000 before the printing system 1000 accepts a request from the operator to print a target job. In addition, the controller 205 acquires the second determination information representing whether a printing interrupt factor of a type different from multi feed has occurred in the printing system 1000 upon occurrence of multi feed. The controller 205 acquires this information from various kinds of sensor information from the sensor unit of the printer unit 203 of the printing apparatus 100, that of the inline finisher of the printing system 1000, and that of the large-volume feeding apparatus of the printing system 1000.

After acquiring the first determination information and second determination information, the controller 205 inhibits the printing system 1000 on the basis of at least these two types of information from automatically executing a recovery operation for an unprinted job upon occurrence of multi feed. For example, immediately after confirming that print media are multi-fed from the large-volume feeding apparatus of the printing system 1000 during the printing operation of a target job, the controller 205 discharges all the multi-fed print media onto the escape tray of the large-volume feeding apparatus. Then, the controller 205 allows automatically continuing the printing operation using non-multi-fed print media fed again from the same large-volume feeding apparatus without any intervention operation by the operator. The intervention operation includes intervention work by the operator such as an operator operation from the operation unit 204, and confirmation and removal of print media by the operator. The controller 205 controls the printing system 1000 to be able to automatically continue (resume) processing of a job suffering occurrence of multi feed during the printing operation without interrupting the processing as much as possible. An instruction to determine a measure against occurrence of multi feed by the operator in advance includes an instruction issued by selecting the key 3501 in the display of FIG. 35 to interrupt a job suffering occurrence of multi feed when multi feed has occurred (instruction to inhibit the automatic recovery operation). When the operator has explicitly input this instruction, the controller 205 inhibits the printing system 1000 from automatically executing the multi feed recovery operation upon occurrence of multi feed for a job suffering the occurrence of multi feed during printing.

In some cases, the operator has not selected the key 3501 in the display of FIG. 35 in advance, and multi feed occurs in the printing system 1000 while the key 3502 is selected. Assume that an error such as a jam of non-multi-fed print media which have already been fed from the large-volume feeding apparatus before multi-fed print media occurs on a sheet feeding path in a downstream apparatus of the printing system 1000 owing to occurrence of multi feed. This sheet feeding path is, e.g., a sheet feeding path in the printing apparatus 100, or a sheet feeding path in a succeeding inline finisher.

In this case, even while the key 3502 is selected, the controller 205 inhibits the printing system 1000 from automatically executing a recovery operation for a job suffering multi feed without intervention work by the operator upon occurrence of multi feed. In this case, the controller 205 controls the printing system 1000 to temporarily stop (interrupt) the printing operation of a job suffering occurrence of multi feed and also suffering occurrence of a printing interrupt factor of a type different from multi feed upon the occurrence of multi feed.

Before interrupting the job, the controller 205 controls the printing system 1000 to discharge at least all multi-fed print media onto, e.g., the escape tray of the large-volume feeding apparatus. Simultaneously when interrupting the job, the controller 205 causes the UI unit of the embodiment to execute a display for notifying the operator that the printing interrupt factor of a type different from multi feed has occurred, and a display for notifying the operator how to cancel the interrupt factor. For example, the controller 205 causes the operation unit 204 to execute the display in FIG. 39. Thereafter, the controller 205 determines, based on pieces of information from various sensors of the printing system 1000, that the printing interrupt factor of a type different from multi feed has been canceled in the printing system 1000. Then, the controller 205 causes the printing system 1000 to execute a recovery operation for the job suffering occurrence of multi feed and occurrence of the printing interrupt factor of a type different from multi feed.

When executing this control, if the controller 205 confirms that, for example, the interrupt factor has been canceled, it inhibits the UI unit from executing the display as shown in FIG. 40 or 41 which allows the operator to explicitly input a recovery operation for the job upon occurrence of multi feed. Instead, the controller 205 causes the printing system 1000 to automatically execute the recovery operation for the job in response to cancellation of the interrupt factor. In these two ways, the controller 205 processes an uncompleted job suffering occurrence of multi feed during printing. That is, the printing system 1000 executes different control operations for an uncompleted job of the first type in which multi feed has occurred but a printing interrupt factor of a type different from multi feed has not occurred, and an uncompleted job of the second type in which multi feed has occurred and a printing interrupt factor of a type different from multi feed has also occurred. This fine control can further enhance effects described in the embodiment.

In short, this configuration means that the embodiment provides at least the following exemplary configuration.

For example, the embodiment assumes the first case where a specific operator request concerning a multi feed recovery operation has been input via the UI unit (the key 3502 in FIG. 35 is selected) prior to occurrence of multi feed, and a printing interrupt factor of a type different from multi feed has occurred in the printing system 1000 upon occurrence of multi feed. The controller 205 executes recovery control corresponding to the first case for an uncompleted job suffering multi feed. As an example of this control, the embodiment discloses the above-described configuration (control example 1).

The embodiment also assumes the second case where a specific operator request has not been input via the UI unit (not the key 3502 but the key 3501 in FIG. 35 is selected) prior to occurrence of multi feed, and a printing interrupt factor of a type different from multi feed has not occurred in the printing system 1000 upon occurrence of multi feed. The controller 205 executes recovery control corresponding to the second case for an uncompleted job suffering multi feed. As an example of this control, the embodiment discloses the above-described configuration (control example 2).

The embodiment also assumes the third case where a specific operator request has been input via the user interface unit (the key 3502 in the display of FIG. 35 is selected) prior to occurrence of multi feed, and another type of printing interrupt factor has occurred in the printing system 1000 upon occurrence of multi feed. The controller 205 executes recovery control corresponding to the third case for an uncompleted job suffering multi feed. As an example of this control, the embodiment discloses the above-described configuration (control example 3).

The embodiment also assumes the fourth case where a specific operator request has not been input via the user interface unit (not the key 3502 but the key 3501 in FIG. 35 is selected) prior to occurrence of multi feed, and a printing interrupt factor has occurred in the printing system 1000 upon occurrence of multi feed. The controller 205 executes recovery control corresponding to the fourth case for an uncompleted job suffering multi feed. As an example of this control, the embodiment discloses the above-described configuration (control example 4).

On the premise of these configurations, the controller 205 controls the printing system 1000 to change, between these four cases, the condition to permit the printing system 1000 to execute a recovery operation for an uncompleted job.

These fine configurations can further enhance effects described in the embodiment.

In addition to these configurations, the printing system 1000 also comprises the following constituent features in the embodiment.

As a major premise, the printing system 1000 supplies, to the printing apparatus 100, print media stored in a certain type of feeding apparatus such as the large-volume feeding apparatus 50 in FIG. 24. Further, the printing system 1000 supplies print media to a plurality of output destinations (see the description of FIGS. 8B, 9B, and 10B) in a plurality of types of post-processing apparatuses (e.g., various inline finishers illustrated in FIGS. 8A to 10B). At this time, print media can be selectively supplied for a target job on the basis of a job processing condition set by the operator via the UI unit of the embodiment.

In this configuration, based on the system configuration status of the printing system 1000, the controller 205 determines whether to permit/inhibit execution of the recovery operation by the printing system 1000 for an uncompleted job suffering occurrence of multi feed during printing. For example, based on configuration information described at the beginning of DESCRIPTION OF THE EMBODIMENTS that is held in the HDD 209, the controller 205 confirms that the printing system 1000 has the system configuration in FIG. 8B, 9B, or 10B. When no large-volume feeding apparatus is connected to the upstream side of the printing apparatus 100, as shown in FIG. 3, the controller 205 inhibits the printing system 1000 from executing the recovery operation for an uncompleted job suffering occurrence of multi feed during printing. When a large-volume feeding apparatus is connected to the upstream side of the printing apparatus 100, as shown in FIG. 23, the controller 205 permits the printing system 1000 to execute the recovery operation for an uncompleted job suffering occurrence of multi feed during printing.

This fine configuration can further enhance effects described in the embodiment.

The printing system 1000 according to the embodiment corresponds to the following exemplary configuration. The following configuration is common to all the above-described configurations.

The controller 205 can accept the printing execution request of a target job and the processing conditions of the job from the operator via the display unit of the UI unit of the printing apparatus 100 according to the embodiment. In the embodiment, the above-described control upon occurrence of multi feed can be executed for such a job. The controller 205 can accept the printing execution request of a target job and the processing conditions of the job from the operator via the display unit of the UI unit of the server PC 103 capable of transmitting data to the printing apparatus 100. The above-described control upon occurrence of multi feed can also be executed for even an external job.

This fine configuration can further enhance effects described in the embodiment.

The present invention is not limited to the above-described embodiments, and various modifications (including organic combinations of the embodiments) can be made without departing from the scope of the invention, and are not excluded from the scope of the invention. For example, in the embodiments, the controller 205 in the printing apparatus 100 mainly performs various control examples. For example, an external controller of a housing different from the printing apparatus 100 may also execute some or all of these control examples.

Various examples and embodiments of the present invention have been described. It is apparent to those skilled in the art that the spirit and scope of the invention are not limited to a specific description in the specification.

The present invention can build a user-friendly, convenient printing environment applicable not only to the office environment but also to the POD environment. The present invention can also meet needs on site in the printing environment such as the POD environment, including a need to operate the system at productivity as high as possible, and a need to reduce the work load on an operator as much as possible. Especially, the present invention obtains the following effects. For example, the present invention has an effect capable of providing a printing system, job processing method, storage medium, computer program, and printing apparatus capable of dealing with a variety of use cases and user needs associated with multi feed at high productivity and high operability in consideration of a printing environment such as the POD environment.

The present invention can build a convenient, flexible printing environment capable of coping with use cases and needs assumable in the POD environment in Description of the Related Art. The present invention can provide various mechanisms toward commercialization of a product.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-009588 filed Jan. 18, 2007, which is hereby incorporated by reference herein in its entirety.

What is claimed is:

1. A printing apparatus comprising:
a printing unit configured to print images onto sheets;
a detection unit configured to detect multi feed of a part of the sheets;
a control unit configured to perform control so as to discharge the part of sheets to a first discharging unit while discharging remaining sheets to a second discharging unit; and a reception unit configured to receive an instruction for interrupting execution of a print job when the detection unit detects the multi feed of sheets, the instruction being received before the execution of the print job is started;

wherein said control unit performs control so as to discharge the part of sheets to the first discharging unit and continue the execution of the print job in a case where the reception unit has not received the instruction when the detection unit detects the multi feed of sheets, and performs control so as to discharge the part of sheets to the first discharging unit and interrupt the execution of the print job in a case where the reception unit has received the instruction.

2. The printing apparatus according to claim 1, further comprising a notification unit configured to, when the control unit interrupts the execution of the print job, notify a user that the sheets have been multi-fed during the execution of the print job.

3. The printing apparatus according to claim 1, further comprising:

a first instruction unit configured to instruct so as to resume the execution of the print job in accordance with a user instruction, wherein the control unit, while the execution of the print job is being interrupted, resumes the execution of the print job responsive to the instruction by the first instruction unit so as to resume the execution of the print job.

4. The printing apparatus according to claim 1, further comprising:

a second instruction unit configured to instruct so as to terminate the execution of the print job in accordance with a user instruction, wherein the control unit, while the execution of the print job is being interrupted, terminates the execution of the print job responsive to the instruction by the second instruction unit so as to terminate the execution of the print job.

5. The printing apparatus according to claim 1, wherein the control unit, when a paper jam occurs during the execution of the print job, interrupts the execution of the print job regardless of whether or not the reception unit receives the instruction.

6. The printing apparatus according to claim 1, further comprising:

a display unit configured to display print jobs so that a user can discriminate between a print job for which the execution of printing has been interrupted by the control unit and a print job for which the execution of printing has not been interrupted by the control unit.

7. A method for controlling a printing apparatus comprising the steps of:

printing images onto sheets;

detecting multi feed of a part of the sheets;

performing control so as to discharge the part of sheets to a first discharging unit while discharging remaining sheets to a second discharging unit; and receiving an instruction for interrupting execution of a print job when the multi feed of sheets is detected, the instruction being received before the execution of the print job is started;

wherein control is performed so as to discharge the part of sheets to the first discharging unit and continue the execution of the print job in a case where the instruction has not been received when the multi feed of sheets is detected, and control is performed so as to discharge the part of sheets to the first discharging unit and interrupt the execution of the print job in a case where the instruction has been received.

8. A non-transitory computer-readable storage medium storing a program for causing a computer to execute a method for controlling a printing apparatus according to claim 7.

* * * * *